(12) United States Patent
Hartman et al.

(10) Patent No.: US 12,514,633 B2
(45) Date of Patent: Jan. 6, 2026

(54) VESSEL MODIFICATION USING HEAT THERAPY

(71) Applicant: Medtronic Vascular, Inc., Santa Rosa, CA (US)

(72) Inventors: Christopher P. Hartman, Rohnert Park, CA (US); Stefan S. Tunev, Santa Rosa, CA (US); Carlos H. Lima, Santa Rosa, CA (US); Richard J. Bliss, Cloverdale, CA (US)

(73) Assignee: Medtronic Vascular, Inc., Santa Rosa, CA (US)

( * ) Notice: Subject to any disclaimer, the term of this patent is extended or adjusted under 35 U.S.C. 154(b) by 562 days.

(21) Appl. No.: 18/051,356

(22) Filed: Oct. 31, 2022

(65) Prior Publication Data

US 2023/0165633 A1 Jun. 1, 2023

Related U.S. Application Data

(60) Provisional application No. 63/284,414, filed on Nov. 30, 2021.

(51) Int. Cl.
*A61B 18/14* (2006.01)
*A61B 18/00* (2006.01)

(52) U.S. Cl.
CPC .. *A61B 18/1492* (2013.01); *A61B 2018/0022* (2013.01); *A61B 2018/00285* (2013.01);
(Continued)

(58) Field of Classification Search
CPC ........ A61B 18/1492; A61B 2018/0022; A61B 2018/00285; A61B 2018/00345;
(Continued)

(56) References Cited

U.S. PATENT DOCUMENTS

| 6,080,171 A | 6/2000 | Keith et al. |
|---|---|---|
| 6,939,345 B2 | 9/2005 | KenKnight et al. |

(Continued)

FOREIGN PATENT DOCUMENTS

WO 2017040371 A1 3/2017

OTHER PUBLICATIONS

Qiao et al., "Can Interventional Ablation be Applied to the Treatment of Arterial Aneurysm?," Medical Hypotheses, vol. 80, No. 4, Apr. 2013, pp. 373-375.

(Continued)

*Primary Examiner* — Linda C Dvorak
*Assistant Examiner* — Abigail Bock
(74) *Attorney, Agent, or Firm* — Shumaker & Sieffert, P.A.

(57) ABSTRACT

A system includes an intravascular medical device and a therapeutic medical device. The intravascular medical device includes a heat therapy assembly and an elongated member coupled to the heat therapy assembly. The heat therapy assembly is configured to contract a wall of a vessel and deliver energy to the wall of the contracted vessel to heat the wall of the vessel. The therapeutic medical device is communicatively coupled to the heat therapy assembly and configured to control the heat therapy assembly to deliver the energy to ablate smooth muscle cells of the wall of the vessel and substantially denature one or more structural proteins of the wall of the vessel.

23 Claims, 19 Drawing Sheets

(52) U.S. Cl.
CPC ............... *A61B 2018/00345* (2013.01); *A61B 2018/00577* (2013.01); *A61B 2018/00672* (2013.01); *A61B 2018/00678* (2013.01); *A61B 2018/00714* (2013.01); *A61B 2218/007* (2013.01)

(58) Field of Classification Search
CPC .......... A61B 2018/00577; A61B 2018/00672; A61B 2018/00678; A61B 2018/00714; A61B 2218/007
See application file for complete search history.

(56) References Cited

U.S. PATENT DOCUMENTS

| | | |
|---|---|---|
| 7,344,490 B2 | 3/2008 | Shaw et al. |
| 8,048,067 B2 | 11/2011 | Davalos et al. |
| 8,911,430 B2 | 12/2014 | Joey et al. |
| 9,598,691 B2 | 3/2017 | Davalos |
| 9,615,878 B2 | 4/2017 | Nair |
| 9,999,461 B2 | 6/2018 | Azamian et al. |
| 10,085,802 B2 | 10/2018 | Neuberger |
| 2002/0173784 A1 | 11/2002 | Sliwa et al. |
| 2011/0257641 A1 | 10/2011 | Hastings et al. |
| 2012/0065554 A1 | 3/2012 | Pikus |
| 2013/0190748 A1 | 7/2013 | Coe et al. |
| 2013/0197555 A1* | 8/2013 | Schaer .................. A61N 7/022 606/170 |
| 2015/0282858 A1* | 10/2015 | Baust ..................... A61B 18/02 606/34 |
| 2016/0317625 A1* | 11/2016 | Dicosmo ............... A61L 15/425 |
| 2018/0353239 A1 | 12/2018 | Stone et al. |
| 2019/0117301 A1 | 4/2019 | Steinke et al. |
| 2019/0224484 A1 | 7/2019 | Pierce et al. |
| 2020/0015886 A1 | 1/2020 | Whayne et al. |
| 2020/0179045 A1 | 6/2020 | Levin et al. |

OTHER PUBLICATIONS

U.S. Appl. No. 18/051,272, filed Oct. 31, 2022, naming inventors Hartman et al.
U.S. Appl. No. 18/051,310, filed Oct. 31, 2022, naming inventors Tunev et al.

* cited by examiner

VESSEL MODIFICATION USING HEAT THERAPY

This application claims the benefit of U.S. Provisional Application No. 63/284,414, filed on Nov. 30, 2021, and entitled, "VESSEL MODIFICATION USING HEAT THERAPY," which is incorporated by reference herein in its entirety.

TECHNICAL FIELD

The present technology is related to intravascular medical devices, such as ablative medical devices.

BACKGROUND

Balloon angioplasty may be used to treat cardiovascular diseases involving abnormal constriction or enlargement of blood vessels, such as cerebrovascular disease, coronary heart disease, and peripheral arterial disease. These abnormal constrictions or enlargements may be caused by underlying tissue morphology near smooth muscle tissue lining the blood vessel wall, such as fatty plaques.

SUMMARY

The present disclosure describes devices and systems configured to deliver heat therapy to a vessel, such as a constricted or enlarged vessel, to modify a structure of the vessel, such as by enlarging a constricted vessel, constricting an enlarged vessel, increasing a rigidity of the vessel, or stabilizing plaques within the vessel. The present disclosure also describes methods for such delivery of heat therapy.

In examples described herein, an intravascular medical device, such as a catheter, is configured to be positioned within a constricted vessel, such as a vessel that includes a build-up of plaque or growth of tissue over a previously placed stent. A distal portion of the intravascular medical device includes a heat therapy assembly configured to expand the wall of the vessel and heat the wall of the vessel to fix the wall of the vessel at or near the expanded size (e.g., an expanded diameter). In some examples, the intravascular medical device includes an expansion device, such as a balloon, a basket, a net, or other expansive structure, that may aid in modifying the structure of the vessel prior to or during heat therapy. For example, the expansion device may be configured to expand from a delivery configuration to a deployed configuration to increase the inner diameter of the vessel while or before the heat therapy assembly heats the vessel.

A medical device coupled to the intravascular medical device is configured to control the amount of heat delivered by the intravascular medical device to ablate smooth muscle cells of the wall of the vessel and substantially denature one or more structural proteins, such as elastin or collagen, in the wall of the vessel. After heat therapy, the smooth muscle cells may no longer provide a relatively high constricting force on an inner layer of the wall of the vessel, such that the vessel may have an increased cross-sectional size (e.g., referred to primarily herein as a diameter, although the vessel may have a non-circular shape in cross-section, the cross-section taken orthogonal to a longitudinal axis of the vessel and/or a direction of blood flow) and reduced rebounding. The denatured structural proteins of the wall of the vessel may cross-link to fix the structural proteins in place and form a rigid scaffold to support the vessel and maintain patency of the vessel, e.g., at or near the larger diameter. In this way, a constricted vessel may be expanded and fixed for a relatively long period of time without the use of additional long-term support devices or substances, such as stents or drugs.

In some examples, the intravascular medical device is configured to use an existing stent or other intravascular support structure to deliver heat therapy to the wall of the vessel, such as to treat restenosis in the existing stent. The intravascular medical device may expand a lumen of the vessel through the stent prior to heating. Once the constricted lumen is expanded, the intravascular medical device heats the previously placed stent to kill tissue and denature proteins localized to the stent and fix the tissue in the lumen into the expanded position, thereby increasing the inner diameter of the lumen through the stent. For example, the intravascular medical device may use the stent as an antenna to generate heat or as a Faraday cage to contain an area of heat application. The therapeutic medical device may control an amount of heat applied to the wall of the vessel by the intravascular medical device via the stent, such as to kill or fix tissue local to the stent, thereby preserving an endothelial lining and reducing further constriction of the vessel, or to kill and fix all tissue internal to the stent, including the endothelial lining, thereby initiating regeneration of the endothelial lining and increasing an inner diameter of the vessel.

In some examples described herein, the intravascular medical device is configured to be positioned within a target site of an enlarged vessel. The heat therapy assembly is configured to expand to a desired diameter of the target site of the vessel. The distal end of the intravascular medical device includes a vacuum assembly configured to seal the target site and contract the wall of the vessel to a smaller diameter. The medical device coupled to the intravascular medical device is configured to control the amount of heat delivered by the intravascular medical device to ablate smooth muscle cells of the wall of the vessel and substantially denature one or more structural proteins, such as elastin or collagen, in the wall of the vessel. After heat therapy, the denatured structural proteins of the wall of the vessel may cross-link to fix the structural proteins in place and form a rigid scaffold to support the vessel and maintain the smaller diameter of the vessel. In this way, an enlarged vessel may be contracted and fixed for a relatively long period of time without the use of additional long-term support devices or substances, such as stents or drugs.

In some examples, the disclosure describes a system that includes an intravascular medical device and a therapeutic medical device. The intravascular medical device includes a heat therapy assembly and an elongated member coupled to the heat therapy assembly. The heat therapy assembly is configured to contract a wall of a vessel and deliver energy to the wall of the contracted vessel to heat the wall of the vessel. The therapeutic medical device is communicatively coupled to the heat therapy assembly and configured to control the heat therapy assembly to deliver the energy to ablate smooth muscle cells of the wall of the vessel and substantially denature one or more structural proteins of the wall of the vessel.

In some examples, the disclosure describes a method that includes contracting a wall of a vessel. The wall of the vessel includes smooth muscle cells and one or more structural proteins. The method includes heating the wall of the contracted vessel to ablate the smooth muscle cells and substantially denature the one or more structural proteins.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

Reference is made to the attached drawings, wherein elements having the same reference numeral designations represent similar elements throughout and wherein.

DETAILED DESCRIPTION

Figure 1:
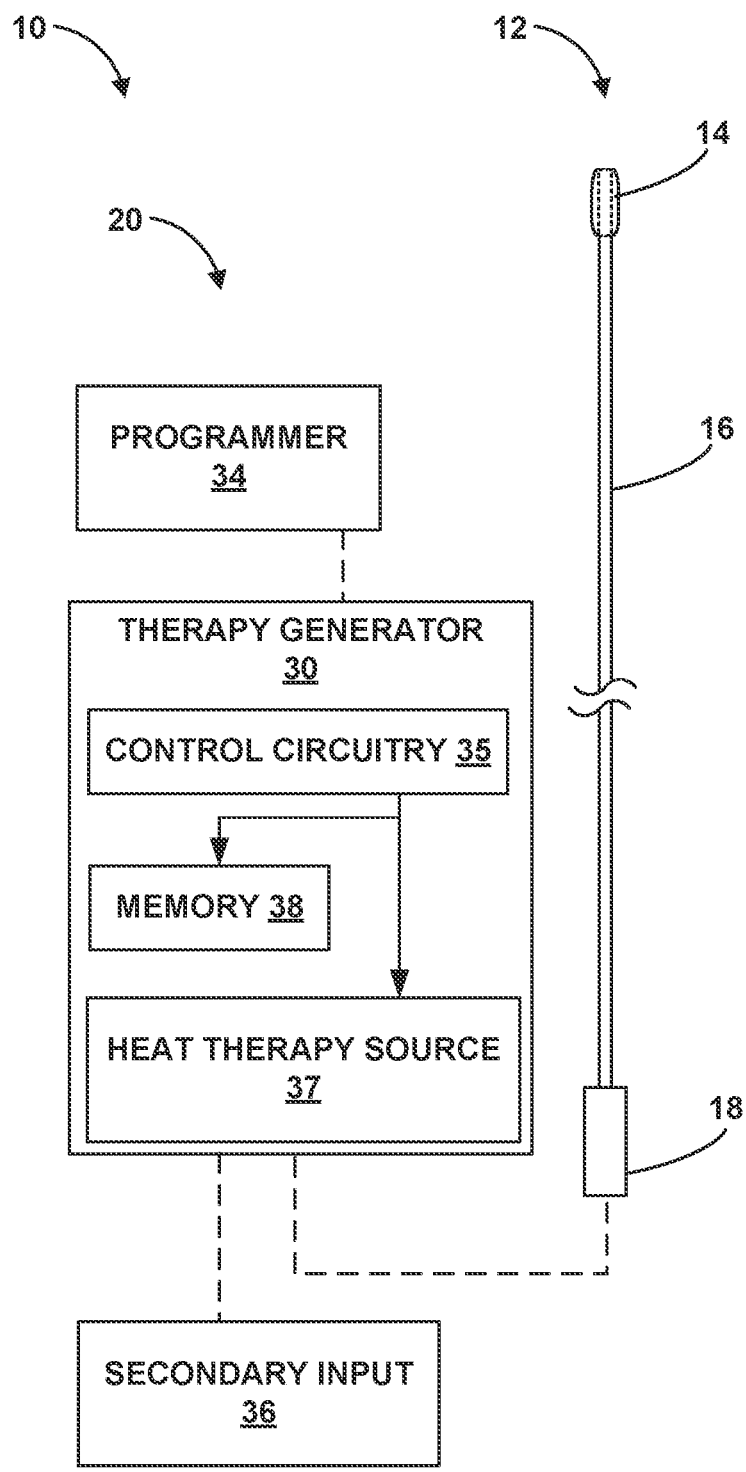
FIG. 1 is a partially schematic illustration of a vascular heat therapy system that includes an example intravascular medical device, in accordance with some examples of the present disclosure.

The present technology is directed to devices, systems, and methods for thermal ablation of a vessel having a defect, such as a constricted vessel or an expanded vessel.

As used herein, the terms "distal" and "proximal" define a position or direction with respect to the treating clinician or clinician's control device (e.g., a handle assembly). "Distal" or "distally" can refer to a position distant from or in a direction away from the clinician or clinician's control device. "Proximal" and "proximally" can refer to a position near or in a direction toward the clinician or clinician's control device.

Balloon angioplasty may be used to treat cardiovascular diseases involving abnormal constriction of blood vessels. Two techniques to treat abnormal constrictions include plain old balloon angioplasty (POBA) and drug-coated balloon (DCB) angioplasty. In these techniques, a balloon catheter may be positioned in a vessel and expanded to widen the vessel. After deflation and removal of the balloon catheter, the blocked vessel may contract and reduce flow, as the plaques may remain on the walls of the vessel. In addition, after the pressure from the balloon is released, the muscle tissue of the vessel wall may rebound and the blood vessel may narrow relative to the expanded size. This may be referred to as elastic recoil. To support the widened vessel, one or more additional treatment devices or substances may be applied to the walls of the vessel to maintain the widened vessel. As one example, a support structure (e.g., a stent) may be positioned in the widened vessel to help prevent constriction of the vessel. As another example, a drug may be impregnated into the wall of the vessel to inhibit healing of the tissues in the wall of the vessel following balloon expansion. The support structure and/or drugs may result in certain complications, such as by creating a blockage, triggering an adverse reaction, or requiring complex procedures for supporting the vessel.

Catheter-based therapies may be used to treat cardiovascular diseases or other conditions involving abnormal enlargement of blood vessels. A technique to treat abnormal enlargements includes flow diversion using a graft stent. In this technique, a balloon or delivery catheter may be positioned in a vessel and expanded or retracted to deploy a stent graft or other support structure. After deployment of the stent graft in the vessel, the blood may flow through the stent and plaque may remain outside the stent. However, eventually tissues or deposits may build up on the stent, resulting in reduced blood flow or increased likelihood of thrombosis.

In accordance with examples of the current disclosure, a vascular heat therapy system includes an intravascular medical device configured to deliver heat therapy to a wall of a vessel to increase or protect blood flow through a vessel without additional treatment devices or substances. The heat therapy can be referred to as thermal ablation in some cases. The heat therapy delivered by the intravascular medical device is configured to heat the wall of the vessel to increase the temperature of tissues in the wall of the vessel. These tissues include living cells, such as smooth muscle cells and endothelial cells, that provide rigidity to the wall of the vessel, and structural proteins, such as elastin and collagen fibers, that provide elasticity and plasticity to the wall of the vessel when intact and rigidity to the wall of the vessel when denatured and cross-linked. The temperature may be sufficiently high to ablate the smooth muscle cells and endothelial cells and substantially denature the structural proteins. For example, a majority of the structural proteins (e.g., 50%-100%, such as 90% or more) in the portion of the vessel wall that is treated may be denatured. The denatured structural proteins may cross-link to form a rigid scaffold.

Prior to or during heat therapy, the intravascular medical device may modify a size of the vessel, such that the heat therapy fixes the vessel at a different size. As one example, the intravascular medical device may expand a constricted vessel to an increased cross-sectional size (e.g., an increased diameter) and apply the heat therapy to the wall of the vessel. The wall of the vessel may remain expanded with an increased cross-sectional area to the extent permitted by the continued support provided by the structural proteins. Thus, the heat therapy described herein may help maintain vessel patency without the use of a chronic implanted device (e.g., a stent). A cross-sectional dimension of a vessel is primarily referred to as a diameter herein, although the vessel may have a non-circular shape in cross-section, the cross-section being taken orthogonal to a longitudinal axis of the vessel and/or a direction of blood flow.

As another example of how the intravascular medical device may modify a size of the vessel, the intravascular medical device may contract an expanded vessel to a decreased diameter and apply the heat therapy to the wall of the vessel. The wall of the vessel may remain contracted with a decreased cross-sectional area to the extent permitted by the continued support provided by the structural proteins. Eventually the endothelial cells will grow back to the increased or decreased cross-sectional area. The structural proteins can, for example, function as scaffolding for the growth of the endothelial cells. The resulting vessel may have reduced elastic recoil and/or modified flow without the use of support structures or drugs.

FIG. 1 is a partial schematic illustration of an example vascular heat therapy system 10 that includes an example therapy-applying intravascular medical device 12 and therapy-generating therapeutic medical device 20, in accordance with some examples of the present disclosure. Intravascular medical device 12 includes an elongated member 16 defining a longitudinal axis and configured to be positioned within vasculature of a patient. In some examples, intravascular medical device 12 includes a hub 18 coupled to a proximal portion of elongated member 16. Elongated member 16 and hub 18 are described in further detail below.

Elongated member 16 is configured to be navigated through vasculature of the patient, for example, to position a heat therapy assembly 14 adjacent a target treatment site of a vessel of the patient. For example, elongated member 16 may be used to access relatively distal vasculature locations in a patient or other relatively distal tissue sites (e.g., relative to a vasculature access point). Example vasculature locations may include, for example, locations in a coronary artery, peripheral vasculature (e.g., carotid, iliac, or femoral artery, or a vein), or cerebral vasculature. In some examples, elongated member 16 is structurally configured to be relatively flexible, pushable, and relatively kink- and buckle-resistant, so that it may resist buckling when a pushing force is applied to a relatively proximal portion of intravascular medical device 12 to advance elongated member 16 distally through vasculature, and so that it may resist kinking when traversing around a tight turn in the vasculature. Elongated member 16 may have any suitable shape, such as a tubular body or a paddle-like shape. Elongated member 16 may be constructed using any suitable materials. In some examples, elongated member 16 may include one or more polymeric materials, for example, polyamide, polyimide, polyether block amide copolymer sold under the trademark PEBAX, polyethylene terephthalate (PET), polypropylene, aliphatic, polycarbonate-based thermoplastic polyurethane, or a polyether ether ketone (PEEK) polymer that provides elongated member 16 with a predetermined flexibility. The polymeric materials may be extruded as one or more solid or hollow tubes to form elongated member 16.

In some examples, a support structure or shape member may be included within or about elongated member 16, for example, being disposed about, within, or between one or more polymeric layers used to form elongated member 16. The support structure or shape member may be used to impart a predetermined strength, flexibility, shape, or geometric qualities to elongated member 16. The support structure or shape member may be formed using any suitable materials including, for example, metal, alloy, or polymer-based wires used to form coils or braids, a hypotube, shape memory materials, for example, nickel-titanium (nitinol), shape memory polymers, electro-active polymers, or the like. The support structure or shape member may be cut using a laser, electrical discharge machining (EDM), electrochemical grinding (ECG), or other suitable means to achieve a desired finished component length, apertures, and geometry. In some examples, the support structure or shape member may be arranged in a single or dual-layer configuration, and manufactured with a selected tension, compression, torque and pitch direction.

Elongated member 16 may also include one or more radiopaque markers which may help a clinician determine the positioning of elongated member 16, e.g., heat therapy assembly 14 or a distal end of elongated member 16, relative to relative to the target treatment site using ultrasound or other suitable technique. For example, one or more radiopaque markers may be positioned along elongated member 16 such as near a distal end, adjacent to heat therapy assembly 14 or the like.

In some examples, at least a portion of an outer surface of elongated member 16 may include one or more coatings, such as, but not limited to, an anti-thrombogenic coating, which may help reduce the formation of thrombi in vitro, an anti-microbial coating, and/or a lubricious coating. In some examples, the entire working length of elongated member 16 may be coated with the hydrophilic coating. In other examples, only a portion of the working length of elongated member 16 coated with the hydrophilic coating. This may provide a length of elongated member 16 distal to hub 18 with which the clinician may grip elongated member 16, e.g., to rotate elongated member 16 or push elongated member 16 through vasculature. In some examples, the entire working length of elongated member 16 or portions thereof may include a lubricious outer surface, e.g., a lubricious coating. The lubricating coating may be configured to reduce static friction and/or kinetic friction at a surface of elongated member 16 as elongated member 16 is advanced through the vasculature.

The proximal portion of elongated member 16 may be received within hub 18 and can be mechanically connected to hub 18 via an adhesive, welding, or another suitable technique or combination of techniques. Hub 18 may serve as a handle for intravascular medical device 12 allowing the clinician to grasp intravascular medical device 12 at hub 18 and advance elongated member 16 through vasculature of a patient. In some examples, intravascular medical device 12 can include another structure in addition or instead of hub 18. For example, intravascular medical device 12 or hub 18 may include one or more luers or other mechanisms (e.g., access ports) for establishing connections between intravascular medical device 12 and other devices. Additionally, or alternatively, intravascular medical device 12 may include a strain relief body (not shown), which may be a part of hub 18 or may be separate from hub 18 to alleviate potential strain of kinking of elongated member 16 near its proximal end.

Intravascular medical device 12 includes heat therapy assembly 14. Heat therapy assembly 14 is mechanically connected to and carried by elongated member 16. In some examples, such as illustrated in FIG. 1, heat therapy assembly 14 is positioned at a distal portion of elongated member 16; in other examples, heat therapy assembly 14 may be positioned elsewhere on elongated member 16, such as more proximal to the distal end than the position shown in FIG. 1. Heat therapy assembly 14 is configured to position within a vessel and deliver heat therapy to the vessel, such as a constricted or enlarged vessel, by delivering energy to the wall of the vessel to heat the wall of the vessel. As will be described further in FIGS. 2A-2E, 5A-5E, and 6A-6E, this heat therapy may be used to modify a structure of the vessel. Heat therapy assembly 14 may heat the vessel using any of a variety of heating mechanisms.

Figure 6A:
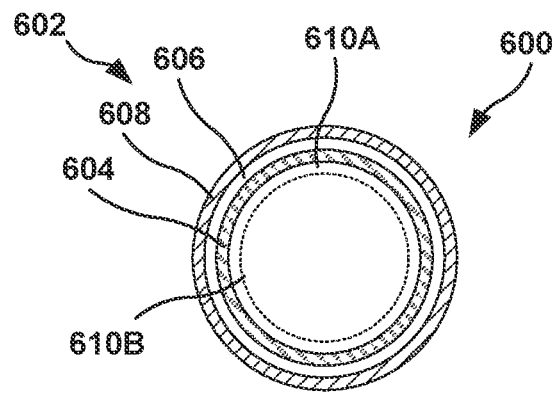
FIG. 6A is a cross-sectional illustration of an example artery.
Figure 6B:
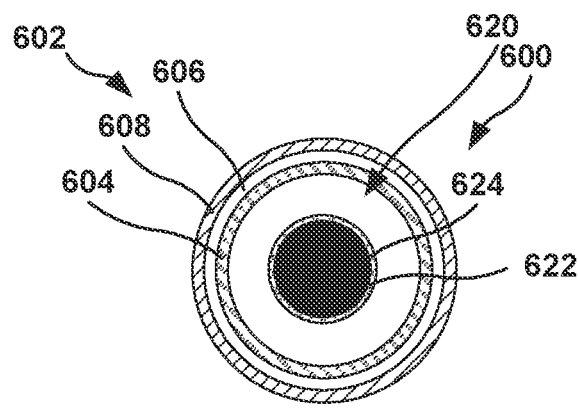
FIG. 6B is a cross-sectional illustration of the artery of FIG. 6A with an intravascular medical device, in accordance with some examples of the present disclosure.
Figure 6C:
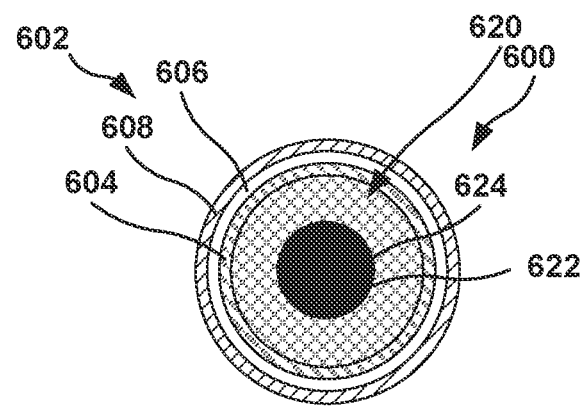
FIG. 6C is a cross-sectional illustration of the artery of FIG. 6A an intravascular medical device in a first deployed configuration, in accordance with some examples of the present disclosure.

In some examples, heat therapy assembly 14 is configured to heat the vessel by delivering thermal energy to the wall of the vessel. In some examples, such as illustrated in FIGS. 6A-6B, heat therapy assembly 14 defines a cavity configured to contain a thermal medium, such as a heating fluid or exothermic reactants and/or products. In some examples, such as illustrated in FIG. 6C, heat therapy assembly 14 includes one or more therapeutic elements configured to contact the wall of the vessel and change temperature in response to an electric current, such as by one or more thermoelectric elements. The thermal medium and/or therapeutic elements may create a temperature differential between one or more surfaces of heat therapy assembly 14 and the wall of the vessel, such that thermal energy may transfer from the thermal medium and/or the one or more therapeutic elements to the wall of the vessel.

Figure 6D:
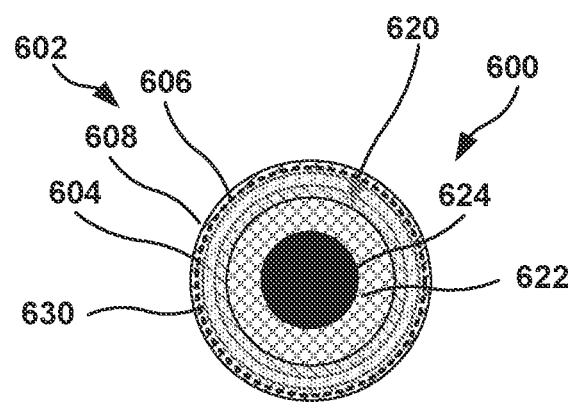
FIG. 6D is a cross-sectional illustration of the artery of FIG. 6A under heat therapy from an intravascular medical device in a second deployed configuration, in accordance with some examples of the present disclosure.

In some examples, heat therapy assembly 14 is configured to heat the vessel by delivering radiant or mechanical energy to tissues of the vessel, which may generate heat in the tissues of the vessel. In some examples, such as illustrated in FIG. 6D, heat therapy assembly 14 includes one or more therapeutic elements configured to deliver radiant, electrical, or mechanical energy to generate the heat, such as radiofrequency electrodes that generate resistive heating, microwave antennae that generate dielectric heating, ultrasound transducer that generate cavitation heating, and/or optical elements that generate radiative heating. The therapeutic elements may deliver the energy to the tissues to increase the temperature of the tissues near heat therapy assembly 14.

In some examples, heat therapy assembly 14 may heat the vessel by delivering thermal energy to a fluid, such as blood, within the vessel, which may transfer thermal energy to the wall of the vessel. For example, heat therapy assembly 14 may include one or more therapeutic elements, such as resistive heating elements, configured to generate thermal energy and heat blood or other fluid near the therapeutic elements. The heated blood may transfer the heat to the wall of the vessel through conduction and/or convection, thereby heating tissues in the wall of the vessel. In examples in which the fluid changes when heated (e.g., blood coagulation), the fluid may be removed when intravascular medical device 12 is removed from the vessel.

Figure 6E:
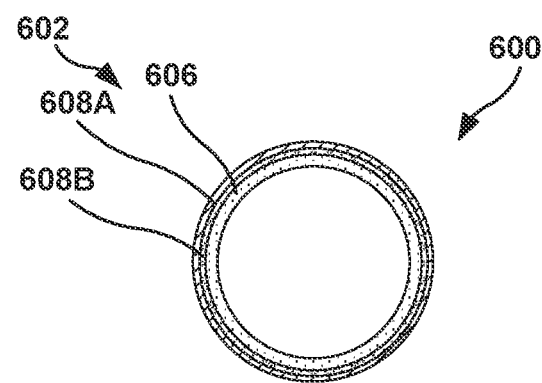
FIG. 6E is a cross-sectional illustration of the artery of FIG. 6A immediately after heat therapy from an intravascular medical device, in accordance with some examples of the present disclosure.

In some examples, heat therapy assembly 14 may heat the vessel by delivering radiant or electrical energy to an existing structure in the vessel, which may generate and deliver thermal energy to the wall of the vessel. In some examples, such as illustrated in FIG. 6E, heat therapy assembly 14 includes one or more therapeutic elements configured to deliver radiant or electrical energy to generate heat in a support structure (e.g., a stent) contacting the wall of the vessel, such as microwave antennae that generate dielectric heating and/or electrical contacts that generate resistive heating.

Any of the configurations and techniques described herein for heating the vessel can be used in combination with each other. Thus, heat therapy assembly 14 can have any suitable configuration to deliver the particular one or more forms of energy to a wall of a vessel to a heat the wall.

Intravascular medical device 12 is configured to modify a size of the vessel prior to or during delivery of heat therapy. Intravascular medical device 12 may include an expansion device, such as heat therapy assembly 14 or an expansion device separate from or mechanically coupled to heat therapy assembly 14, to expand to a diameter at which the vessel may be fixed through heat therapy. For example, heat therapy assembly 14 may include, or be coupled to, an expansion structure configured to expand from a radially collapsed delivery configuration to a radially expanded deployed configuration. In the deployed configuration, one or more surfaces of heat therapy assembly 14 may contact the wall of the vessel.

In some examples, heat therapy assembly 14 and/or an expansion structure coupled to heat therapy assembly 14 may be configured to expand beyond an initial diameter of the vessel. The initial diameter can be, for example, a diameter prior to any treatment of the vessel to treat the defect or a diameter prior to a current heat therapy procedure. For example, the expansion device may expand a constricted vessel to an increased size (e.g., diameter) that permits increased blood flow, and heat therapy assembly 14 may apply heat therapy to substantially fix the previously constricted vessel at or near the increased size. The increased size can be, for example, a diameter that is greater than the initial diameter.

In some examples, heat therapy assembly 14 and/or a vacuum assembly coupled to heat therapy assembly 14 may be configured to contract the vessel to a smaller diameter that is less than the initial diameter of the vessel. For example, heat therapy assembly 14 may expand within an enlarged vessel to a diameter that is less than an initial diameter of the enlarged vessel and permits reduced flow. The vacuum assembly may contract the inner surface of the enlarged vessel onto heat therapy assembly 14, and heat therapy assembly 14 may apply heat therapy to substantially fix the previously enlarged vessel at the decreased size (e.g., diameter).

Therapeutic medical device 20 includes a therapy generator 30 configured to be coupled to heat therapy assembly 14, such as through hub 18. Therapy generator 30 is configured to control heat therapy assembly 14 to heat the wall of the vessel to ablate smooth muscle cells of the wall of the vessel and substantially denature one or more structural proteins (e.g., such as elastin and/or collagen fibers) of the wall of the vessel. Structural proteins, such as elastin or collagen, are wavy fibers that can straighten under small loads, allowing large extension of the tissue at low stress. Denaturation of structural proteins may include an initial reduction in certain structural properties, such as elasticity or plasticity, of the structural proteins, such as due to degradation or fragmentation. However, subsequent cross-linking of denatured structural proteins may increase a rigidity of the structural proteins and fix the structural proteins at a particular diameter. Substantial denaturation of the structural proteins may involve denaturation beyond natural processes (e.g., due to elastase or collagenase), and may result in greater than about 50% of structural proteins in a volume of tissue (e.g., one or more layers of the wall of the vessel) degrading or fragmenting. On the other hand, not substantially denaturing structural proteins may result in less than about 50% by volume of structural proteins in a volume of tissue degrading of fragmenting, such as less than about 10%.

Smooth muscle cells are living cells that maintain a diameter of a vessel. Ablation of smooth muscle cells may include reduction in structural properties, such as rigidity, of the smooth muscle cells, such as due to lysis or rupture of the smooth muscle cells. Substantial ablation of the smooth muscle cells may involve ablation beyond natural processes (e.g., due to cell replacement), and may result in greater than about 50% of smooth muscle cells in a volume of tissue (e.g., one or more layers of the wall of the vessel) lysing or rupturing, such as greater than about 90%. In some examples, denaturation of structural proteins and/or ablation of smooth muscle cells may be measured by a change in thickness of one or more layers of the wall of the vessel having the structural proteins and/or smooth muscle cells. Effects of heat therapy on ablation of smooth muscle cells and denaturation of structural proteins will be described further in FIGS. 2A-2E, FIGS. 5A-5E, and FIGS. 6A-6E below.

Therapy generator 30 includes a heat therapy source 37 configured to cause heat therapy assembly 14 to deliver heat therapy that may provide therapeutic benefits to a patient. In some examples, such as examples in which heat therapy assembly 14 includes one or more therapeutic elements, heat therapy source 37 includes an electrical energy source and circuitry configured to apply an electrical current to the therapeutic elements to increase a temperature of the wall of the vessel, such as by increasing a temperature of the therapeutic elements, delivering energy to the tissues in the wall of the vessel, or increasing a temperature of a structure in the vessel. In some examples, such as examples in which heat therapy assembly 14 defines a cavity configured to contain a thermal medium, heat therapy source 37 includes a fluid source configured to deliver the thermal medium to the cavity of heat therapy assembly 14. In such examples, generator 30 may be configured to generate a selected rate and/or magnitude of heat therapy delivered by heat therapy source 37 to the target treatment site via heat therapy assembly 14. For example, generator 30 may include control circuitry 35 configured to control a flow rate, amount, temperature, and/or pressure of fluid delivered by heat therapy source 37, an amount of voltage applied by heat therapy source 37, or a frequency of current applied by heat therapy source 37.

Generator 30 may include a memory 38. Memory 38 includes computer-readable instructions that, when executed by control circuitry 35, causes generator 30 to perform various functions. Control circuitry 35 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to control circuitry 35 herein may be embodied as software, firmware, hardware or any combination thereof. Memory 38 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Memory 38 may store any suitable information, including patient identification information, and information for selecting the rate and/or magnitude of heat therapy which generator 30 generates and delivers to a patient via heat therapy assembly 14. Memory 38 may also store operating instructions with which control circuitry 35 controls the operation of generator 30.

System 10 may include a programmer 34, which includes circuitry configured to communicate with generator 30 and control an operation of generator 30. For example, generator 30 can be configured to receive one or more heat therapy parameter values with which generator 30 generates and delivers fluid and/or power to heat therapy assembly 14 via programmer 34. In some examples, generator 30 or programmer 34 may include one or more evaluation or feedback modules to provide feedback to the clinician before, during, and/or after heat therapy, such as lights, a display, sound generating circuitry, or the like or combination thereof. Generator 30 or programmer 34 may include a user interface configured to receive user input from a user, e.g., one or more heat therapy parameter values with which control circuitry 35 controls heat therapy source 37, input to control when (e.g., on/off/pause control) generator 30 is applying heat therapy to heat therapy assembly 14, or the like.

In some examples, one or more sensors (not shown) configured to sense a parameter related to the heat therapy, such as one or more temperature (for example, thermocouple, thermistor, or the like), impedance, pressure, optical, flow, chemical or other sensors, may be located proximate to or within heat therapy assembly 14 and connected to one or more electrical conductors (not shown) within elongated member 16. Generator 30 may be part of a device or monitor that may include processing circuitry, such as a microprocessor, and a display. Control circuitry 35 or control circuitry of another device, such as programmer 34, may receive one or more signals indicative of the one or more sensed parameters and control heat therapy source 37 based on the signal.

In some examples, functions described with reference to generator 30 may be performed by programmer 34. Thus, in some examples, programmer 34 may include a memory (for example, in generator 30 or programmer 34), and control circuitry coupled to the memory.

A secondary input 36, such as a foot pedal, may be connected (e.g., pneumatically connected or electrically connected) to generator 30 to enable the clinician to initiate, terminate and, optionally, adjust various operational characteristics of generator 30, including, but not limited to, fluid delivery or power delivery. System 10 may also include a remote control device (not shown) that can be positioned in a sterile field and operably coupled to one or both of intravascular medical device 12 or generator 30. In other examples, the remote control device may be built into hub 18.

Figure 2A:
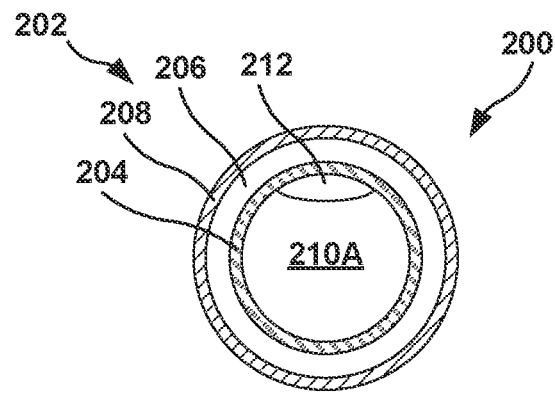
FIG. 2A is a cross-sectional illustration of an example artery.

Heat therapy systems described herein may be used to apply heat therapy for treatment of any of a variety of conditions for which heat therapy delivered to a wall of a vessel may provide therapeutic benefits. Such heat therapy may be particularly beneficial for treating constricted vessels. For example, a vessel, such as an artery, may be narrowed or otherwise constricted due to build-up of plaque or other tissue in the vessel. FIG. 2A is a cross-sectional illustration of an example artery 200. Artery 200 includes an artery wall 202 defining an artery lumen 210A. Artery wall 202 includes various layers, including an inner tunica intima 204, an intermediate tunica media 206, and an outer tunica adventitia 208. Tunica intima 204 includes endothelial cells and, in certain arteries, an elastic sheath and/or smooth muscle cells. The endothelial cells may form an interface between wall 202 and blood flowing in lumen 210A. Tunica media 206 includes smooth muscle cells and structural proteins, such as elastin and collagen fibers. The smooth muscle cells may provide rigid support to wall 202 and assist in regulation of blood flow and pressure, and the structural proteins may provide plasticity and elasticity to wall 202. Tunica adventitia 208 also includes structural proteins, which may perform a similar function as structural proteins of tunica media 206.

Artery 200 may also include plaque 212 or fatty tissues deposited on an inner surface of wall 202. Plaque 212 may deposit over time and constrict a cross-sectional area of lumen 210A. In other examples, artery 200 (or other vessel) may not be constricted due to plaque 212 or another blockage, or such blockage may be unknown. For example, heat therapy may be provided to artery 200 as a preventative therapy, such as if an angiogram indicates an obstruction, but no clinical signs of blockage are detected, such that a clinician can deliver the heat therapy as a prophylactic measure.

Prior to heat therapy, a cross-sectional area of lumen 210A (taken in a plane orthogonal to a longitudinal axis of artery 200) may be a function of a structure of wall 202 and a presence of any deposits, such as plaque 212, on the inner surface of wall 202. Plaque 212 may be difficult to remove, and debris from plaque 212 may form clots downstream of plaque 212. Regenerative cells of wall 202, such as endothelial cells of tunica intima 204, and non- or less-regenerative cells of wall 202, such as smooth muscle cells of tunica media 206, may provide rigidity to wall 202, such as by resisting radially outward forces on an inner surface of wall 202 by blood flow and radially inward forces on an outer surface of wall 202 by adjacent tissues. Structural proteins of wall 202, such as structural proteins of tunica media 206 and tunica adventitia 208, may provide plasticity and elasticity to wall 202, such as by expanding in response to radially outward forces on an inner surface of wall 202 by blood flow in lumen 210A and conforming to a balance of radially inward and outward forces on walls 202.

Figure 2B:
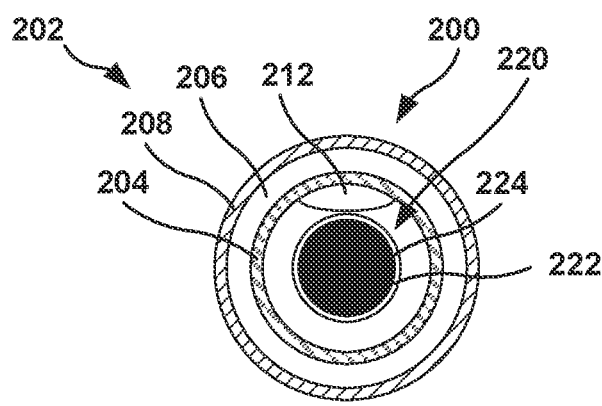
FIG. 2B is a cross-sectional illustration of the artery of FIG. 2A under expansion from an intravascular medical device, in accordance with some examples of the present disclosure.

FIG. 2B is a cross-sectional illustration of artery 200 of FIG. 2A including an intravascular medical device 220 at least partially positioned within artery 200, in accordance with some examples of the present disclosure. A distal portion of intravascular medical device 220 is positioned within artery 200 near a treatment site, such as a constricted section of artery 200 near plaque 212. The distal portion of intravascular medical device 220 includes a heat therapy assembly 222 and an elongated member 224. Intravascular medical device 220, heat therapy assembly 222, and elongated member 224 are examples of intravascular medical device 12, heat therapy assembly 14, and elongated member 16 of FIG. 1, respectively. In the example of FIG. 2B, heat therapy assembly 222 includes an expansion device, such as a balloon or an expandable basket, configured to expand and cause one or more surfaces of heat therapy assembly 222 to contact an inner surface of wall 202. However, in other examples, intravascular medical device 220 may include an expansion device separate from surfaces of heat therapy assembly 222 configured to contact wall 202.

Figure 2C:
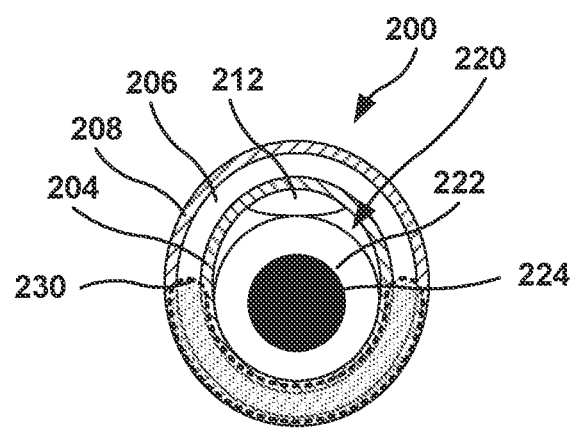
FIG. 2C is a cross-sectional illustration of the artery of FIG. 2A under heat therapy from an intravascular medical device, in accordance with some examples of the present disclosure.

FIG. 2C is a cross-sectional illustration of artery 200 of FIG. 2A receiving heat therapy from intravascular medical device 220, in accordance with some examples of the present disclosure. Intravascular medical device 220 is in a deployed configuration, such that one or more surfaces of heat therapy assembly 222 contact an inner surface of wall 202 and expand artery lumen 210A beyond an initial diameter. In the example of FIG. 2C, an outer surface of heat therapy assembly 222 is contacting about half (e.g., 40-60%, or 45-55%) of an inner surface of wall 202 and an inwardly-facing surface of plaque 212, and has expanded a perimeter of the inner surface of wall 202.

Heat therapy assembly 222 is configured to heat wall 202 to create a heat therapy region 230 of wall 202. Heat therapy region 230 may be a portion of wall 202 that includes tissues having a temperature in a target therapy temperature range. As will be described further below, a size and shape of heat therapy region 230 may depend on a variety of thermal properties of tissues of wall 202 and thermal parameters of heat therapy assembly 222, such as a distance of tissues or wall 202 from heat therapy assembly 222, a heat capacity of tissues of wall 202, a heating load delivered by heat therapy assembly 222, and/or other properties and parameters that may influence an amount of heat that is transferred to tissues of wall 202 from heat therapy assembly 222 or generated in tissues of wall 202 by heat therapy assembly 222.

In some examples, the therapy temperature range of tissues in heat therapy regions 230 includes a lower therapy threshold value at which living cells, such as endothelial cells and/or smooth muscle cells, substantially ablate (e.g., greater than about 90% of smooth muscle cells ablated) and structural proteins, such as elastin and collagen, substantially denature (e.g., greater than about 90% of elastin and collagen denatured). For example, without being limited to any particular theory, endothelial cells and smooth muscle cells exposed to temperatures above about 45° C. may undergo irreversible cell damage and begin to ablate. If temperatures of the tissues continue to increase, such as above about 100° C., then plasma or other fluids within the tissues may boil, which may lead to clot formation and/or reduced tissue heating. As such, a temperature at which fluids within the tissue boil may represent an upper therapy threshold value. Structural proteins, such as elastin and collagen, are not living cells and are less affected by temperatures at which living cells begin to ablate. However, collagen and other structural proteins may begin to denature at temperatures slightly above a temperature at which the smooth muscle cells begin to ablate, such as above about 60° C. As such, a temperature at which both smooth muscle cells begins to ablate and structural proteins such as collagen to denature may represent a lower therapy threshold.

When therapy generator 30 (FIG. 1) is connected to heat therapy assembly 222, control circuitry 35 may control heat therapy source 37 to deliver energy to heat therapy assembly 222 to maintain heat therapy region 230 at a temperature less than or equal to the upper therapy threshold value and greater than or equal to the lower therapy threshold value for a period of time sufficient to substantially ablate the living cells of wall 202, such as in tunica intima 204 and tunica media 206, and substantially denature the structural proteins of wall 202, such as in tunica media 206 and tunica adventitia 208. In some instances, heat therapy assembly 222 may also heat plaque 212A to further stabilize plaque 212 and/or support wall 202. For example, high temperatures may rigidize plaque 212A. In some examples, heat therapy region 230 is configured to limit heat therapy to other tissues outside artery 200. For example, a heating load applied to artery 200 from heat therapy assembly 222 may form heat therapy region 230 such that tissues adjacent to wall 202 of artery 200, such as nerves or other tissues, may not be substantially ablated (e.g., less than about 10% ablation) or be substantially heated (e.g., heated to less than about 45° C.).

Figure 2D:
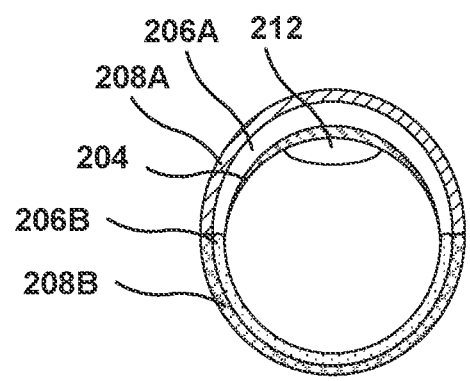
FIG. 2D is a cross-sectional illustration of the artery of FIG. 2A immediately after heat therapy from an intravascular medical device, in accordance with some examples of the present disclosure.

FIG. 2D is a cross-sectional illustration of artery 200 of FIG. 2A after (e.g., immediately after) heat therapy is delivered by intravascular medical device 220, in accordance with some examples of the present disclosure. As a result of ablation of endothelial cells of tunica intima 204, tunica intima 204 includes a partially intact endothelial lining. Tunica media 206 includes an intact portion 206A that was not subject to heat therapy region 230 and includes smooth muscle cells, and an ablated portion 206B that was subject to heat therapy region 230 in which smooth muscle cells are substantially ablated and collagen fibers are substantially denatured. The denatured collagen fibers may cross-link with other structural proteins (e.g., collagen, elastin, etc.) to coagulate the structural proteins and form a rigid scaffold. This rigid scaffold may be relatively fixed. As a result, ablated portion 206B of tunica media 206 may have reduced recoil due to the reduction or absence of smooth muscle cells and increased rigidity due to the denaturation and cross-linking of structural proteins. Tunica adventitia 208 includes an intact portion 208A that was not subject to heat therapy region 230 and includes intact structural proteins, and an ablated portion 208B that was subject to heat therapy region 230 in which collagen fibers are substantially denatured. As a result, ablated portion 208B of tunica adventitia 208 may have increased rigidity due to the denaturation and cross-linking of structural proteins.

Although plaque 212 is shown in FIG. 2D as having a similar configuration as that shown in FIG. 2A with respect to the pre-expanded state of artery 200, in some cases, the expansion of the expansion device may cause plaque 212 to move radially outwards. For example, plaque 212 may be compressed and heated to increase the rigidity of plaque 212. As a result, plaque 212 may also assist in maintaining a shape of wall 202, along with the scaffold created by the denatured and cross-linked structural proteins.

Figure 2E:
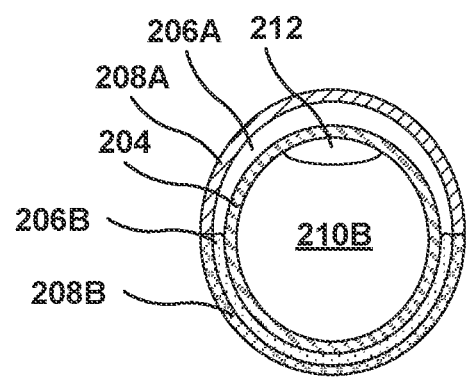
FIG. 2E is a cross-sectional illustration of the artery of FIG. 2A several weeks after heat therapy from an intravascular medical device, in accordance with some examples of the present disclosure.

FIG. 2E is a cross-sectional illustration of artery 200 of FIG. 2A several weeks after heat therapy from intravascular medical device 220, in accordance with some examples of the present disclosure. Endothelial cells of tunica intima 204 have grown back on an expanded ablated portion 206B of tunica media 206. As a result, lumen 210B may have a greater cross-sectional area after heat therapy than lumen 210A prior to the heat therapy.

Figure 3A:
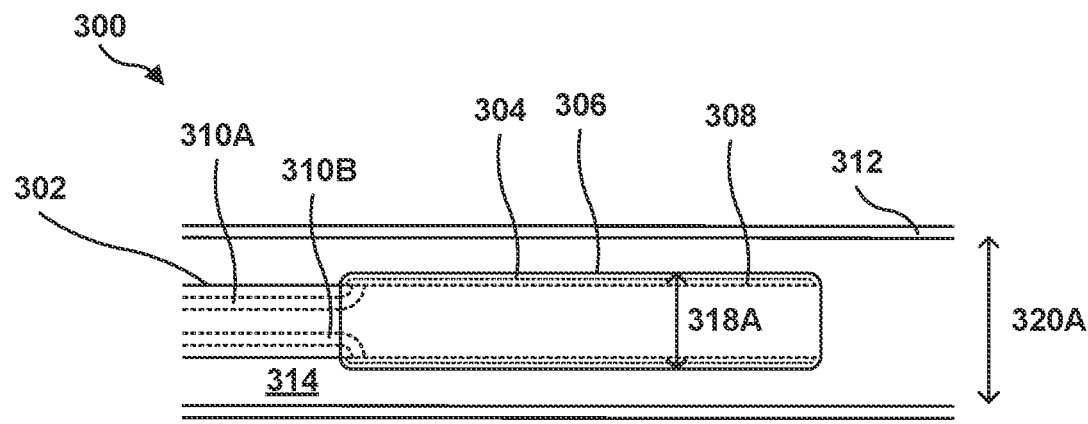
FIG. 3A is an expanded side view conceptual illustration of a distal portion of an example intravascular medical device positioned in a vessel in a delivery configuration.
Figure 3B:
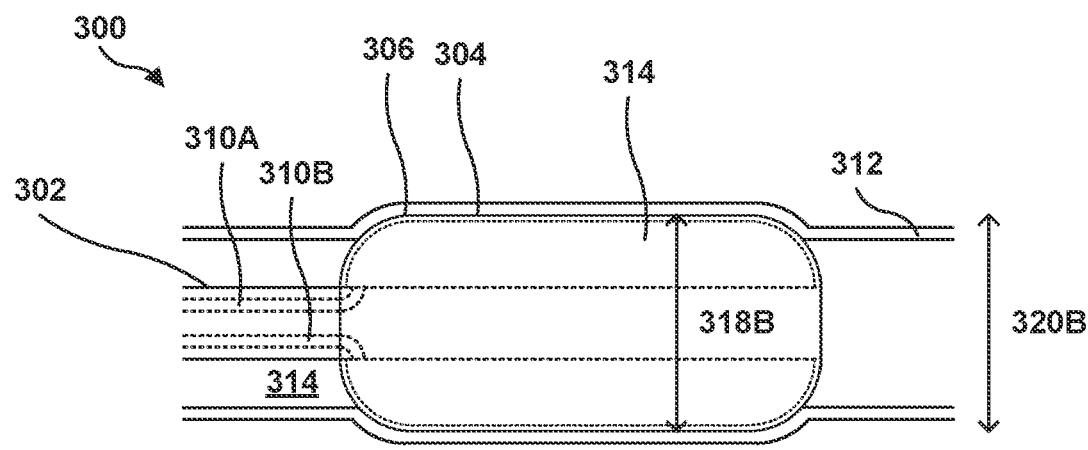
FIG. 3B is an expanded side view conceptual illustration of the distal portion of the example intravascular medical device of FIG. 3A positioned in the vessel in a deployed configuration.

Intravascular medical devices described herein, such as intravascular medical device 12 of FIG. 1, may include one or more of a variety of heat therapy assemblies having various mechanisms configured to expand a vessel and various mechanisms configured to deliver energy to the vessel. In some examples, such as the examples shown in FIGS. 3A-3B, a heat therapy assembly includes a closed expansion device having an expandable cavity, such as a balloon, configured to contain a thermal medium within the cavity. The thermal medium may deliver thermal energy from the thermal medium through one or more surfaces of the closed expansion device to the wall of the vessel. This bulk heat transfer may provide a relatively even amount of heat transfer to a large surface area of the vessel. FIGS. 3A-3B illustrate examples of intravascular medical device 12.

FIG. 3A is an expanded side view conceptual illustration of a distal portion of a heat therapy assembly 300 of an intravascular medical device positioned in a lumen 314 of a vessel 312 in a delivery configuration. Heat therapy assembly 300 includes a balloon 304 having an outer surface 306 and defining a cavity 308. Heat therapy assembly 300 is an example of Heat therapy assembly 14 of FIG. 1. When heat therapy assembly 300 is in a delivery configuration, such as illustrated in FIG. 3A, balloon 304 may be in a deflated, relatively low-profile configuration in which cavity 308 is empty or nearly empty, such that heat therapy assembly 300 may be navigated through vasculature and positioned within lumen 314 of vessel 312 proximate to a treatment site. For example, balloon 304 may have a diameter 318A that corresponds to or is slightly larger than a diameter of an elongated member 302 of intravascular medical device 302.

The intravascular medical device of FIGS. 3A and 3B includes heat therapy assembly 30 and elongated member 302, such as elongated member 16 of FIG. 1. Elongated member 302 includes one or more fluid channels 310A and 310B (individually and collectively "fluid channel 310" and "fluid channel 310," respectively). Each fluid channel 310 is configured to discharge a fluid into and/or discharge a fluid from cavity 308 of balloon 304. In the example of FIG. 3A, elongated member 302 includes a fluid inlet channel 310A configured to discharge a fluid into cavity 308 and a fluid outlet channel 310B configured to discharge the fluid from cavity 308; however, in other examples, elongated member 302 may include a single channel 310, additional channels 310, or channels 310 configured to discharge the fluid both to and from cavity 308. Fluid inlet channel 310A and fluid outlet channel 310B may each be in fluid communication with a fluid source through a port on a hub, such as hub 18 of FIG. 1.

FIG. 3B is an expanded side view conceptual illustration of a distal portion of example heat therapy assembly 300 of the intravascular medical device of FIG. 1 positioned in lumen 314 of vessel 312 in a first deployed configuration. Balloon 304 is configured to expand from the deflated configuration in the delivery configuration of intravascular medical device 300 to a relatively larger profile inflated configuration in the deployed configuration of intravascular medical device 300 in response to a pressure differential between an internal pressure within cavity 308 and an external pressure at outer surface 306, such that at least a portion of outer surface 306 of balloon 304 contacts and is in thermal communication with vessel 312. The internal pressure within cavity 308 may be sufficient such that at least a portion of outer surface 306 contacts a treatment site of vessel 312. In the example of FIG. 3B, balloon 304 is expanded to a final diameter 318B beyond an initial diameter 320A of vessel 312, resulting in vessel 312 having a larger final diameter 320B during delivery of heat therapy.

To increase an internal pressure within cavity 308 to expand balloon 304, cavity 308 is configured to receive and contain a pressurized fluid. In some examples, balloon 304 is configured to expand in response to cavity 308 being filled with the pressurized liquid. As one example, balloon 304 may be configured to receive a pressurized heating liquid through fluid inlet channel 310A that fills cavity 308 and expands to a particular pressure of the pressurized heating liquid. As another example, balloon 304 may be configured to receive a first reactant and generate heat as an exothermic reaction between the first reactant and a second reactant produces thermal energy. Various example mechanisms for expanding a balloon will be discussed further in FIGS. 8A-8B below. As a result of expansion of balloon 304, outer surface 306 of balloon 304 may contact an inner surface of a wall of vessel 312, such that outer surface 306 is in thermal communication with the wall of vessel 312.

Cavity 308 is configured to receive and contain a thermal medium to deliver thermal energy to vessel 312. The thermal medium may include the pressurized fluid used to expand balloon 304, or may be a different medium within cavity 308 in addition to the pressurized fluid. The thermal medium may include one or more solids or fluids configured to deliver thermal energy to balloon 304 and, as a result, heat a portion of vessel 312 in contact with outer surface 306 of balloon 304. A thickness of balloon 304 between outer surface 306 and cavity 308 may be sufficiently low that balloon 304 may have a relatively small temperature gradient between outer surface 306 and an inner surface of balloon 304 defining cavity 308. In some examples, balloon 304 includes one or more metallic elements configured to transfer heat from the wall of the vessel to the thermal medium. For example, balloon 304 may include thermally conductive particles dispersed in an elastomer, such that a wall of balloon 304 has increased thermal conductivity compared to balloons that do not include conductive thermally particles. As another example, balloon 304 may include one or more metallic elements on an inner or outer surface 306 of balloon 304 configured to aid in transfer of heat from outer surface 306 to the thermal medium in cavity 308, such as by increasing a thermal conductivity, and therefore heat flux, across the wall of balloon 304.

After the pressure from balloon 304 is released, vessel 312 may rebound to a larger diameter compared to a vessel that has not been expanded to an increased diameter prior to heat therapy. For example, the heat therapy delivered by heat therapy assembly 300 may fix vessel 312 at larger diameter 320B, and/or may otherwise fix vessel 312 at a diameter larger than initial diameter 320A (e.g., having a reduced amount of recoil). As a result, heat therapy may increase patency of vessel 312 and increase an amount of blood flow through vessel 312.

In some examples, such as FIGS. 4A-4E, a heat therapy assembly may include one or more discrete therapeutic elements coupled to or within an expansion device. The expansion device may be configured to radially expand to expand the wall of the vessel, such as to a particular diameter, and in some examples, radially extend the plurality of therapeutic elements to contact the wall of the vessel. The therapeutic elements may be configured to heat the wall of the vessel by delivering energy to the wall of the vessel, such as by transferring thermal energy or delivering radiant, mechanical, or electrical energy that generates thermal energy in tissues or structures in the wall of the vessel. This more localized heat removal may provide a configurable delivery of heat removal to surfaces of the vessel at particular axial and/or circumferential positions.

Figure 4A:
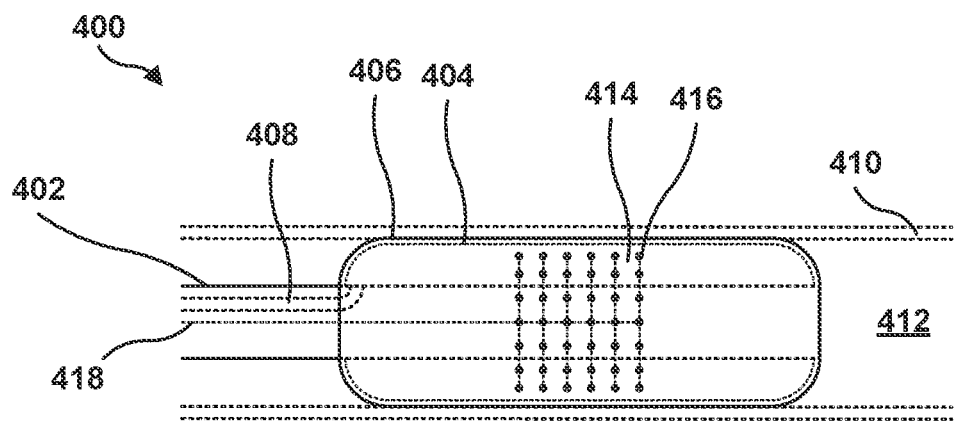
FIG. 4A is an expanded side view conceptual illustration of a distal portion of an example intravascular medical device configured to heat a vessel wall using therapeutic elements on a balloon structure, in accordance with some examples of the present disclosure.

In some examples, intravascular medical devices described herein may include a balloon or other closed expansion structure as an expansion device for positioning one or more therapeutic elements at or near a wall of a vessel, such as by contacting one or more therapeutic elements against the wall of the vessel or positioning one or more therapeutic elements within an energy delivery distance of the wall of the vessel. FIG. 4A is an expanded side view conceptual illustration of a distal portion of an example intravascular medical device 400 configured to heat a vessel 410 using therapeutic elements on a balloon 404, in accordance with some examples of the present disclosure. Intravascular medical device 400 is an example of intravascular medical device 12 of FIG. 1, and balloon 404 is an example of heat therapy assembly 14 of FIG. 1.

Intravascular medical device 400 includes balloon 404 coupled to an elongated member 402, such as elongated member 16 of intravascular medical device 12 of FIG. 1. Balloon 404 defines a longitudinal axis and is configured to be positioned within vessel 410 of a patient. Balloon 404 may be configured to switch between a delivery configuration, in which the expansion device 404 is deflated, to a deployed configuration as shown, in which balloon 404 is inflated and has a larger profile compared to the deflated configuration. In the deployed configuration, balloon 404 may define a perimeter that extends along an inner surface of vessel 410, such that one or more therapeutic elements 416 at an outer surface of balloon 404 may contact the inner surface of vessel 410. Balloon 404 may be configured to switch between the delivery configuration and the deployed configuration through inflation by a pressurized fluid through a fluid channel 408.

Intravascular medical device 400 includes therapeutic elements 416 arranged around the perimeter defined by balloon 404. In some examples (not shown), a plurality of temperature sensors may be arranged around the perimeter of balloon 404, such that intravascular medical device 400 may sense a temperature of an inner surface of vessel 410, e.g., with which control circuitry 35 (FIG. 1) may use to control operation of heat therapy source 37. Therapeutic elements 416 may have any suitable arrangement along balloon 404. For example, therapeutic elements 416 can be arranged on balloon 404 such that, when deployed, therapeutic element 416 may have an axial spacing along and a circumferential spacing around the axis.

Each of therapeutic elements 416 is configured to deliver heat therapy to a wall of vessel 410 to heat tissues within vessel 410. Therapeutic elements 416 may include any suitable therapeutic element configured to deliver energy to a wall of vessel 410, such as to another interface or fluid. In some examples, such as illustrated in FIG. 4A, therapeutic elements 416 are electrically-modulated therapeutic elements. Therapeutic elements 416 may be configured to receive electrical energy (e.g., an electrical current), such as from heat therapy source 37 under the control of control circuitry 35 (FIG. 1), and deliver energy to tissues of vessel 410 near therapeutic elements 416.

An amount and distribution of heat therapy may be controlled by controlling an electrical current supplied to particular therapeutic elements of therapeutic elements 416. In some examples, control circuitry 35 is configured to apply a voltage to all the therapeutic elements 416 simultaneously. In other examples, control circuitry 35 can select a subset of therapeutic elements 416 (less than all the available therapeutic elements 416) to deliver the heat therapy. For example, control circuitry 35 can control therapy source 37 to apply a particular voltage to particular electrical conductors 418 to deliver an amount (e.g., a heating load) of energy from one or more therapeutic elements 416 at particular axial and/or circumferential positions.

In some examples, the plurality of therapeutic element 416 includes one or more surfaces configured to contact the wall of vessel 410 and deliver thermal energy to the wall of vessel 410 to heat vessel 410. In some examples, therapeutic elements 416 include one or more thermoelectric elements, such as one or more Peltier devices. Thermoelectric elements may be configured to receive a voltage (e.g., from heat therapy source 37 under the control of control circuitry 35) and transfer heat to a surface of the thermoelectric element (e.g., hot junction) from another surface (e.g., cold junction) within intravascular medical device 400. As one example, the plurality of thermoelectric elements may include one or more Peltier devices that include a distal hot junction at a surface of the thermoelectric element, a proximal cold junction, and one or more channels within intravascular medical device 400 through which a heating liquid flows to heat the proximal cold junction, thereby reducing over-cooling of the cold junction of the plurality of thermoelectric elements.

In some examples, the plurality of therapeutic element 416 includes one or more surfaces configured to contact the wall of vessel 410 and deliver electrical energy to the wall of vessel 410 to generate heat in the wall of vessel 410. In some examples, therapeutic elements 416 include one or more electrodes configured to deliver radiofrequency electrical energy to the wall of vessel 410. The electrodes may be configured to receive an electrical current (e.g., from heat therapy source 37 under the control of control circuitry 35) and deliver the electrical current to the tissues of vessel 410. The electrical current generates resistive heating in the tissues, particularly in tissues close to the electrodes.

In some examples, therapeutic elements 416 includes one or more electrical contacts configured to deliver electrical energy (e.g., electrical current) to a structure positioned in the wall of vessel 410. For example, as will be illustrated in FIGS. 5A-5E and 8E below, a vessel may include a stent or other structure capable of receiving electrical current and generating thermal energy or radiant energy based on the electrical current. As one example, the structure may receive the electrical current, generate thermal energy through resistive heating of the structure, and deliver the thermal energy to the surrounding tissues. As another example, the structure may receive the electrical current and generate microwave energy, which generates thermal energy in surrounding tissues through dielectric heating of the tissues. Electrical contacts may be configured to receive an electrical current (e.g., from heat therapy source 37 under the control of control circuitry 35) and deliver the electrical current to the structure. In some examples, the structure may limit penetration of radiant energy. For example, the structure may be fabricated from a conductive material and configured to act as a Faraday cage to attenuate and/or block various frequencies of electromagnetic radiation, such as the radiant energy described below. As a result, heating generated by electromagnetic energy may be limited to tissues that are radially inward of the structure.

In some examples, one or more of therapeutic elements 416 are configured to deliver radiant energy to the wall of vessel 410 to generate heat in vessel 410. Radiant energy may include any energy transferred by electromagnetic radiation. Radiant energy may be capable of generating a more highly dispersed heat therapy region compared to, for example, thermal or electrical energy, which may require direct contact with vessel 410 and/or rely on conductive thermal properties of vessel 410 to disperse heat. In some examples, therapeutic elements 416 include a plurality of antennae configured to deliver microwave energy to the wall of vessel 410. Antennae may be configured to receive an electrical energy (e.g., electrical current from heat therapy source 37 under the control of control circuitry 35) and deliver microwave energy to the wall of vessel 410. The microwave energy may generate dielectric heating in tissues of the wall of vessel 410, thereby increasing a temperature of the tissues. In some examples, such as described above, therapeutic elements 416 includes electrical contacts configured to contact a structure and use the structure as an antenna to deliver microwave energy to vessel 410.

In some examples, therapeutic elements 416 include a plurality of optical elements configured to deliver optical energy, such as laser energy, to the wall of vessel 410. Optical elements may be configured to receive an electrical current (e.g., from heat therapy source 37 under the control of control circuitry 35) and deliver laser energy (or other optical energy) to one or more surfaces of the wall of vessel 410 to heat the wall of vessel 410.

In some examples, one or more of therapeutic elements 416 are configured to deliver mechanical energy to the wall of vessel 410 to generate heat in the wall of vessel 410. In some examples, therapeutic elements 416 includes one or more transducers configured to deliver ultrasound energy to the wall of vessel 410. Transducers may be configured to receive an electrical current (e.g., from heat therapy source 37 under the control of control circuitry 35) and generate high frequency sound waves to contact one or more surfaces of vessel 410, such as directly or through an intermediate surface (e.g., a balloon). The high frequency sound waves may generate cavitation heating in the tissues, thereby increasing the temperature of the tissues.

In examples in which therapeutic elements 416 are electrically-modulated therapeutic elements, intravascular medical device 400 includes at least one electrical conductor 418 within elongated member 402 and balloon 404 for electrically coupling therapeutic elements 416 to an electrical source, such as an electrical source of heat therapy source 37 of generator 30 of FIG. 1. In some examples, each therapeutic element 416 may be coupled to a respective electrical conductor 418; however, in other examples, two or more therapeutic elements 416 may be electrically coupled to the same electrical conductor 418, such as shown in FIG. 4A. Thus, intravascular medical device 400 is configured to receive one or more electrical signals from generator 30 and deliver heat therapy to the treatment site within vessel 410.

In some examples, the pressurized fluid delivered to inflate balloon 404 may include a thermal medium configured to deliver additional energy to vessel 410, such as described in FIGS. 3A-3B. For example, a thermal medium used to expand balloon 404 may deliver thermal energy to vessel 410 in a first stage of heating to apply heat therapy to large portion of vessel 410, while a plurality of therapeutic elements 416 may deliver energy to vessel 410 in a second stage of heating to apply heat therapy to smaller portions of vessel 410, such that a temperature of the portions of vessel 410 in contact with therapeutic elements may be higher than a temperature of the portions of vessel 410 that are in contact with an outer surface of balloon 404. In some examples, a heat flux from the thermal medium may be less than a heat flux from or created by therapeutic elements 416.

Figure 4B:
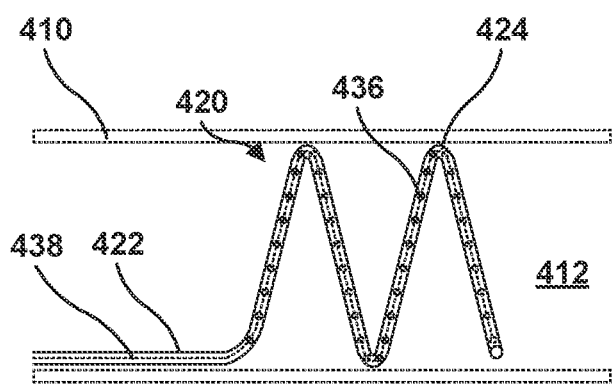
FIG. 4B is an expanded side view conceptual illustration of a distal portion of an example intravascular medical device configured to heat a vessel wall using therapeutic elements on a spiral structure, in accordance with some examples of the present disclosure.

In some examples, intravascular medical devices described herein may include a helical or a spiral structure as an expansion device that enables a plurality of therapeutic elements to contact a wall of a vessel. FIG. 4B is an expanded side view conceptual illustration of a distal portion of an example intravascular medical device 420 that is configured to deliver energy using therapeutic elements on a spiral expansion device 424, in accordance with some examples of the present disclosure. Intravascular medical device 420 include a plurality of therapeutic elements 436 electrically coupled to one or more electrical conductors 438, which may be similar to therapeutic elements 416 and electrical conductors 418 of FIG. 4A above. Intravascular medical device 420 is an example of intravascular medical device 12 of FIG. 1 and therapeutic elements 436 are an example of heat therapy assembly 300.

Intravascular medical device 420 includes spiral expansion device 424 coupled to an elongated member 422, such as elongated member 16 of intravascular medical device 12 of FIG. 1. Expansion device 424 defines a longitudinal axis and is configured to be positioned within vessel 410 of a patient. Expansion device 424 may be configured to switch between a delivery configuration, in which the expansion device 424 is relatively straight, to a deployed configuration as shown, in which expansion device 424 defines a spiral (or helix). In the deployed configuration, expansion device 424 defines a perimeter that can extend along an inner surface of vessel 410, such that a plurality of therapeutic elements 436 at an outer surface of expansion device 424 may contact the inner surface of vessel 410. Expansion device 424 may be configured to switch between the delivery configuration and the deployed configuration using any of a number of mechanisms, such as actuation of a shape memory member within expansion device 424, actuation of a pull or push wire within expansion device 424, use of a delivery catheter that constrains expansion device 424 to a lower profile configuration for delivery, or the like or combination thereof.

Although FIG. 4B illustrates the spiral defined by expansion device 424 extending to one side of elongated member 422, in other examples, elongated member 422 can be centered or more centered than that shown in FIG. 4B with a center of the spiral or helix defined by expansion device 424.

Figure 4C:
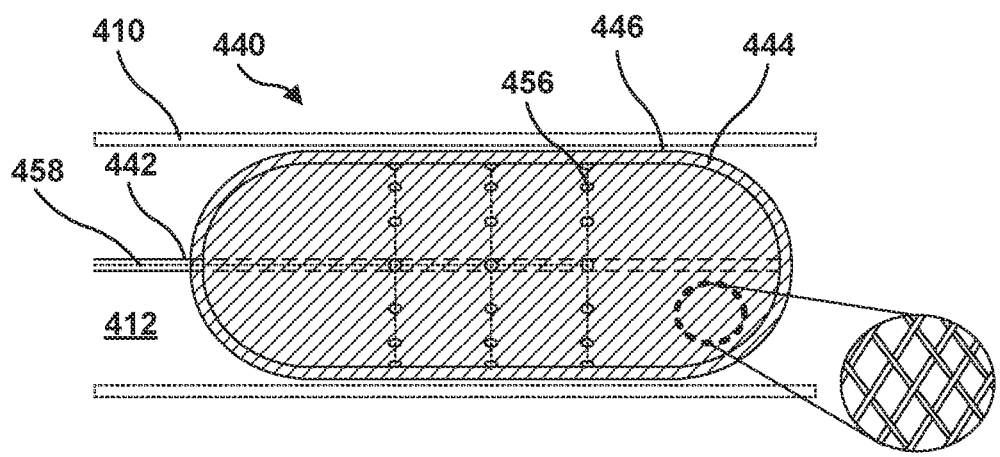
FIG. 4C is an expanded side view conceptual illustration of a distal portion of an example intravascular medical device configured to heat a vessel wall using therapeutic elements on a net structure, in accordance with some examples of the present disclosure.

In some examples, intravascular medical devices described herein may include a net or cage as an expansion device for contacting a plurality of therapeutic elements against a wall of a vessel. FIG. 4C is an expanded side view conceptual illustration of a distal portion of an example intravascular medical device 440 that is configured to deliver energy using therapeutic elements on a net structure, in accordance with some examples of the present disclosure. Intravascular medical device 440 include a plurality of therapeutic elements 456 electrically coupled to one or more electrical conductors 458, which may be similar to the plurality of therapeutic element 416 and electrical conductors 418 of FIG. 4A above. Intravascular medical device 440 is an example of intravascular medical device 12 of FIG. 1 and therapeutic elements 456 are an example of heat therapy assembly 300.

Intravascular medical device 440 includes a mesh expansion device 444 coupled to elongated member 442, defining a longitudinal axis, and configured to be positioned within vessel 410. In the example of FIG. 4C, expansion device 444 is an expandable mesh structure configured to expand to contact an inner surface of vessel 410. Other designs of expansion device 444 may include, but are not limited to, a hoop, a cage, a basket, and the like. In some examples, expansion device 444 may be self-expanding, while in other examples, expansion device 444 may be expanded by an actuator, such as a push or pull wire, or via withdrawal of a delivery catheter that constrains expansion device 444 to a lower profile configuration for delivery, or the like or combination thereof.

Figure 4D:
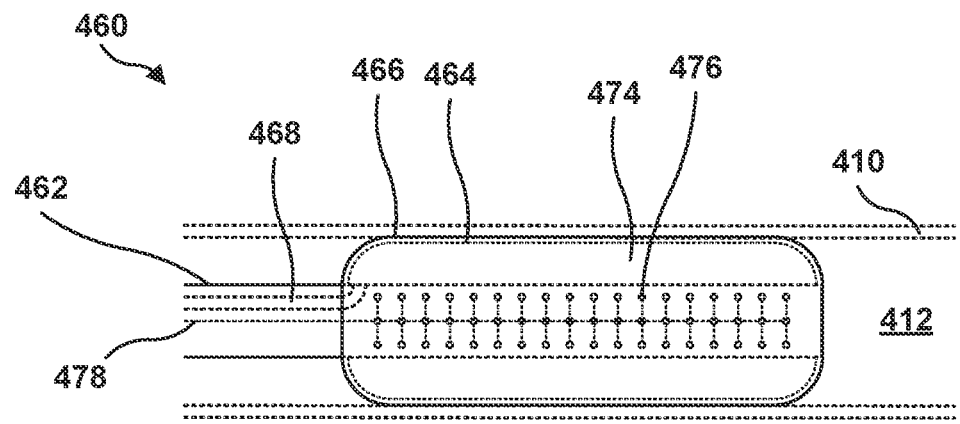
FIG. 4D is an expanded side view conceptual illustration of a distal portion of an example intravascular medical device configured to heat a vessel wall using therapeutic elements in a balloon structure, in accordance with some examples of the present disclosure.

In some examples, intravascular medical devices described herein may include therapeutic elements that deliver energy to a wall of a vessel without directly contacting the wall of the vessel. FIG. 4D is an expanded side view conceptual illustration of a distal portion of an example intravascular medical device 460 configured to heat a vessel wall using therapeutic elements in a balloon structure, in accordance with some examples of the present disclosure. Intravascular medical device 460 include a plurality of therapeutic elements 476 electrically coupled to one or more electrical conductors 478, which may be similar to the plurality of therapeutic element 416 and electrical conductors 418 of FIG. 4A above. Intravascular medical device 460 is an example of intravascular medical device 12 of FIG. 1 and therapeutic elements 476 are an example of heat therapy assembly 300.

Intravascular medical device 440 includes a balloon 464 coupled to elongated member 462, defining a longitudinal axis, and configured to be positioned within vessel 410. Balloon 464 may be configured to switch between a delivery configuration, in which balloon 464 is deflated, to a deployed configuration as shown, in which balloon 464 is inflated. In the deployed configuration, balloon 464 may define a perimeter that extends along an inner surface of vessel 410. Balloon 464 may be configured to switch between the delivery configuration and the deployed configuration through inflation by a pressurized fluid through a fluid channel 468.

The plurality of therapeutic elements 476 are positioned within cavity 474 of balloon 464, such as on elongated member 462 or within walls of balloon 464. The plurality of therapeutic elements 476 are configured to heat the wall of vessel 410 without directly contacting the wall of vessel 410. For example, the plurality of therapeutic elements 476 may deliver energy, such as radiant energy or mechanical energy, that does not require continuity between thermally or electrically conductive surfaces. In some examples, the plurality of therapeutic elements 476 may include a plurality of ultrasound transducers configured to generate sound waves.

Figure 4E:
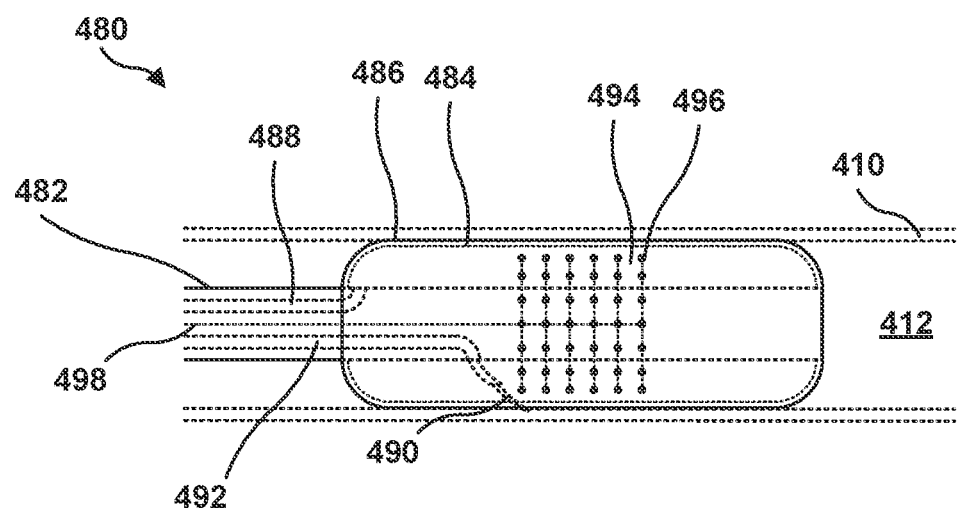
FIG. 4E is an expanded side view conceptual illustration of a distal portion of an example intravascular medical device configured to heat and deliver a chemical agent to a vessel wall using therapeutic elements on and within a balloon structure, in accordance with some examples of the present disclosure.

In some examples, intravascular medical devices described herein may include one or more supplemental mechanisms, in addition to heat therapy, to denature one or more structural proteins in a wall of a vessel. For example, while heat therapy may denature structural proteins, such as collagen, at relatively high temperatures, the structural proteins may denature through other biological mechanisms. In some examples, intravascular medical devices may include a chemical agent configured to assist in denaturing the structural proteins. FIG. 4E is an expanded side view conceptual illustration of a distal portion of an example intravascular medical device 480 configured to heat and deliver a chemical agent to a vessel wall using therapeutic elements on and within a balloon structure, in accordance with some examples of the present disclosure. Intravascular medical device 480 includes a plurality of therapeutic elements 496 electrically coupled to one or more electrical conductors 498, which may be similar to the plurality of therapeutic element 416 and electrical conductors 418 of FIG. 4A above. Intravascular medical device 480 is an example of intravascular medical device 12 of FIG. 1 and therapeutic elements 496 are an example of heat therapy assembly 300.

Intravascular medical device 480 includes a balloon 484 coupled to elongated member 482, defining a longitudinal axis, and configured to be positioned within vessel 410. Balloon 484 may be configured to switch between a delivery configuration, in which balloon 484 is deflated, to a deployed configuration as shown, in which balloon 484 is inflated, such as through inflation by a pressurized fluid through a fluid channel 488.

In the example of FIG. 4E, intravascular medical device 480 includes one or more needles 490 configured to inject a chemical agent into the wall of vessel 410 to denature the one or more structural proteins. For example, the chemical agent may include one or more enzymes configured to denature the structural proteins and/or one or more substances configured to assist in cross-linking denatured structural proteins. By incorporating heat therapy with chemical therapy, particular tissues may be more effectively treated. For example, intravascular medical device 480 may deliver heat therapy through the plurality of therapeutic elements 496 to ablate smooth muscle cells and denature structural proteins of the relatively close tunica media, and deliver chemical therapy through the one or more needles 490 to denature structural proteins of the relatively far tunica adventitia.

While intravascular medical device 480 is configured to inject the chemical agent, in other examples, the chemical agent may be present on or within an intravascular medical device and applied to the wall of vessel 410 in using other mechanisms. In some examples, the chemical agent may be present on a surface of an expansion device, such as a balloon, as a coating which may be impregnated into the wall of vessel 410. One or more surfaces of the expansion device may contact the wall of vessel 410, and a portion of the chemical agent from the coating may migrate into tissues in the wall of vessel 410 to denature at least a portion of the structural proteins. In some examples, the chemical agent may be present within a balloon as a fluid which may be impregnated into the wall of vessel 410 through a porous wall of the balloon. A saline solution may expand the balloon such that one or more surfaces of the balloon may contact the wall of vessel 410. The chemical agent may flow into the balloon, and a portion of the chemical agent from within the balloon may migrate through the wall of the balloon into tissues in the wall of vessel 410 to denature at least a portion of the structural proteins.

While the chemical agent has been described as an enzyme, any of a variety of chemical agents may be used to ablate or denature tissues using various mechanisms. In some examples, the chemical agent may have various chemical properties, such as pH or reactivity, selected to denature structural proteins in the tissues of the wall of vessel 410. For example, the chemical agent may include one or more reactants configured to react and produce heat within the tissues.

Figure 5A:
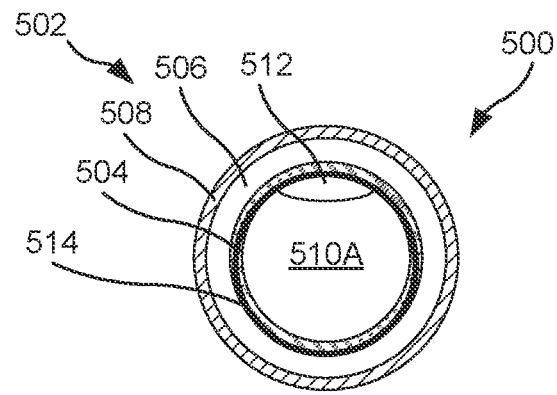
FIG. 5A is a cross-sectional illustration of an example artery that includes a stent.

In some examples, heat therapy systems described herein may be particularly beneficial for treating constricted vessels that result from restenosis. For example, a vessel, such as an artery, may be narrowed or otherwise constricted due to build-up of tissue on a structure positioned in the vessel, such as a stent. FIG. 5A is a cross-sectional illustration of an example artery 500 that includes an example stent 514. Artery 500 includes an artery wall 502 defining an artery lumen 510A. Artery wall 502 includes various layers, including an inner tunica intima 504, an intermediate tunica media 506, and an outer tunica adventitia 508, such as described in FIG. 2A with respect to artery wall 202 having tunica intima 204, tunica media 206, and tunica adventitia 208. However, artery wall 502 may include stent 514 within at least a portion of artery wall 502. Stent 514 may be positioned in artery 500 from a previous procedure, and various tissues, such as portions of tunica intima 504 or tunica media 506, have grown or migrated into stent 514, thereby reducing a diameter of artery lumen 510A. Artery 500 may also include plaque 512 or fatty tissues deposited on an inner surface of wall 510. Plaque 512 may deposit over time and constrict a cross-sectional area of lumen 510A.

Figure 5B:
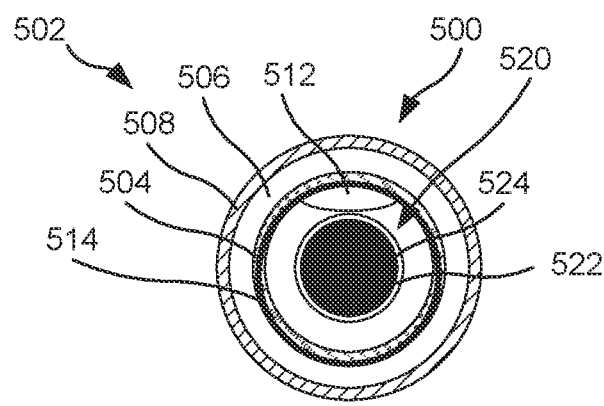
FIG. 5B is a cross-sectional illustration of the artery of FIG. 5A under expansion from an intravascular medical device, in accordance with some examples of the present disclosure.

FIG. 5B is a cross-sectional illustration of artery 500 of FIG. 5A including an intravascular medical device 520 at least partially positioned within artery 500 and stent 514, in accordance with some examples of the present disclosure. A distal portion of intravascular medical device 520 is positioned within artery 500 near a treatment site, such as a constricted section of artery 500 near stent 514. The distal portion of intravascular medical device 520 includes a heat therapy assembly 522 and an elongated member 524. Intravascular medical device 520, heat therapy assembly 522, and elongated member 524 are examples of intravascular medical device 12, heat therapy assembly 14, and elongated member 16 of FIG. 1, respectively. In the example of FIG. 5B, heat therapy assembly 522 includes an expansion device, such as a balloon or an expandable basket, configured to expand and cause one or more surfaces of heat therapy assembly 522 to contact an inner surface of wall 502. However, in other examples, intravascular medical device 520 may include an expansion device separate from surfaces of heat therapy assembly 522 configured to contact wall 502.

Figure 5C:
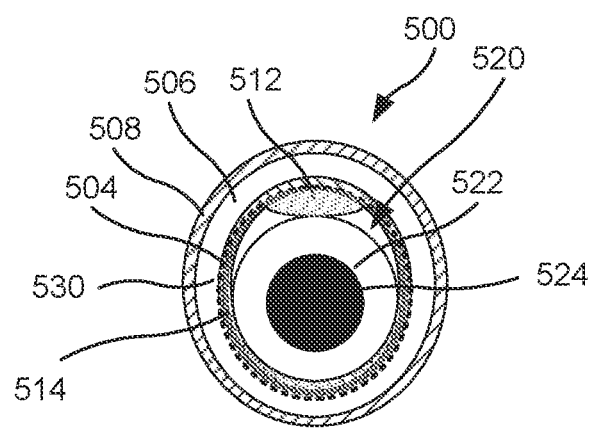
FIG. 5C is a cross-sectional illustration of the artery of FIG. 5A under heat therapy from an intravascular medical device using the stent, in accordance with some examples of the present disclosure.

FIG. 5C is a cross-sectional illustration of artery 500 of FIG. 5A receiving heat therapy from intravascular medical device 520, in accordance with some examples of the present disclosure. Intravascular medical device 520 is in a deployed configuration, such that one or more surfaces of heat therapy assembly 522 contact an inner surface of wall 502 and expand lumen 510A beyond an initial diameter.

In some examples, heat therapy assembly 522 is configured to deliver energy to stent 514 to cause stent 514 to deliver electromagnetic energy to surrounding tissues. For example, heat therapy assembly 522 may deliver electrical energy to stent 514 to generate radiant energy in stent 514. Stent 514 is configured to deliver the radiant energy to tissues within wall 502 to create a heat therapy region 530 of wall 502. Heat therapy region 530 may be a portion of wall 202 that includes tissues having a temperature in a target therapy temperature range, such as described in FIG. 2C with respect to heat therapy region 530. A size and shape of heat therapy region 530 may depend on a variety of thermal properties of tissues of wall 502, thermal properties of stent 514, and thermal parameters of heat therapy assembly 522, such as a distance of tissues or wall 502 from heat therapy assembly 522, a heat capacity of tissues of wall 502, a heating load delivered by heat therapy assembly 522, and/or other properties and parameters that may influence an amount of heat that is generated in stent 514 by heat therapy assembly 522 and transferred to tissues of wall 502 from stent 514. Control circuitry 35 of therapy generator 30 (FIG. 1) is configured to control heat therapy source 37 to maintain heat therapy region 530 at a temperature below an upper therapy threshold value and above a lower therapy threshold value for a period of time sufficient to substantially ablate the living cells of wall 502, such as in tunica intima 504 and tunica media 506, and substantially denature the structural proteins of wall 502, such as in tunica media 506 and tunica adventitia 508, such as described in FIG. 2C.

In some examples, heat therapy assembly 522 is configured to deliver energy primarily to tissues of wall 502 between stent 514 and heat therapy assembly 522. For example, stent 514 may be configured to block or attenuate various wavelengths of electromagnetic energy, such as based on a spacing and diameter of filaments of stent 514. As such, heat therapy assembly 522 may be configured to deliver electromagnetic energy to wall 502 such that stent 514 may limit heating of tissues radially outward from stent 514.

In some examples, heat therapy region 530 may be configured to ablate living cells and substantially denature structural proteins of portions of wall 502 that are proximate to stent 514. For example, a stent that is positioned within tunica media 506 may deliver thermal energy to tissues with tunica media 506, such as smooth muscle cells and structural proteins, to ablate the smooth muscle cells and denature the structural proteins without killing endothelial cells of tunica intima 504. Such local heat therapy may result in an expanded artery 500 that undergoes a lower amount of thermal damage.

In some examples, such as illustrated in FIG. 5C, heat therapy region 530 may be configured to ablate living cells and substantially denature structural proteins of portions of wall 502 that are further from stent 514. For example, stent 514 positioned within tunica intima 504 and tunica media 506 may deliver thermal energy to portions of wall 502 adjacent to stent 514 and/or between stent 514 and lumen 510A, to ablate smooth muscle cells and denature structural proteins of tunica media 506, as well as ablating endothelial cells of tunica intima 504. As will be described further below, the denatured and cross-linked structural proteins may form a rigid scaffold having an increased diameter on which the endothelial cells may regenerate.

Figure 5D:
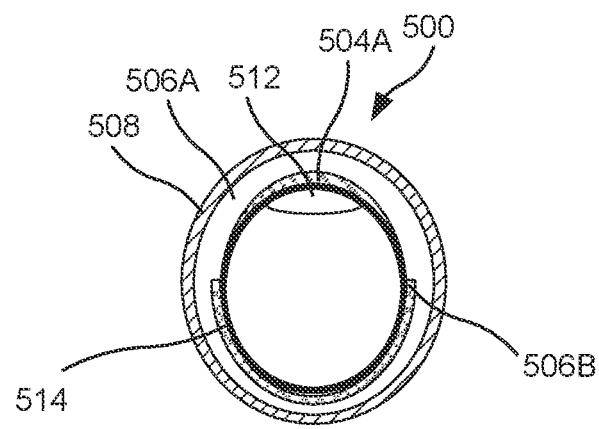
FIG. 5D is a cross-sectional illustration of the artery of FIG. 5A immediately after heat therapy from an intravascular medical device using the stent, in accordance with some examples of the present disclosure.

FIG. 5D is a cross-sectional illustration of artery 500 of FIG. 5A immediately after heat therapy from intravascular medical device 520 and stent 514, in accordance with some examples of the present disclosure. As a result of ablation of endothelial cells of tunica intima 504, tunica intima 504 includes a partially intact endothelial lining. Tunica media 506 includes an intact portion 506A that was not subject to heat therapy region 530 and includes smooth muscle cells, and an ablated portion 506B that was subject to heat therapy region 530 in which smooth muscle cells are substantially ablated and collagen fibers are substantially denatured to form cross-links with other structural proteins. As a result, ablated portion 206B of tunica media 206 may have reduced recoil due to the reduction or absence of smooth muscle cells and increased rigidity due to the denaturation and cross-linking of structural proteins.

While tunica adventitia 508 is illustrated in the example of FIG. 5D as outside of heat therapy region 530, in some examples, heat therapy applied through stent 514 may enable deeper delivery of therapy than heat therapy delivery from within lumen 510A. For example, stent 514 may be embedded into tunica media 506 or other internal layer of wall 502, such that stent 514 may be closer to tunica adventitia 508 than a conductive delivery device positioned at tunica intima 504. As a result, heat therapy may be applied to tunica adventitia at a lower level of power and/or lower surface temperature than the conductive heat delivery device positioned at tunica intima 504.

Figure 5E:
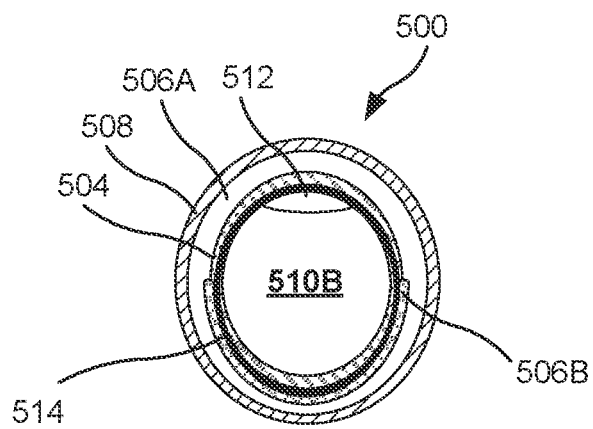
FIG. 5E is a cross-sectional illustration of the artery of FIG. 5A several weeks after heat therapy from an intravascular medical device using the stent, in accordance with some examples of the present disclosure.

FIG. 5E is a cross-sectional illustration of artery 500 of FIG. 5A several weeks after heat therapy from intravascular medical device 520, in accordance with some examples of the present disclosure. Endothelial cells of tunica intima 504 have grown back on an expanded ablated portion 506B of tunica media 506. For example, stent 514 and/or ablated portion 506B of tunica media 506 may act as a scaffold for the endothelial cells. As a result, lumen 510B may have a greater cross-sectional area after heat therapy than lumen 510A prior to heat therapy.

In some examples, heat therapy systems described herein may be particularly beneficial for treating enlarged vessels, such as aneurysms. For example, a vessel, such as an artery, may be enlarged due to narrowing of a wall of the artery. FIG. 6A is a cross-sectional illustration of an example artery 600, where the cross-section is taken in a direction orthogonal to a longitudinal axis of artery 600. Artery 600 includes an artery wall 602 defining an artery lumen 610A. Artery wall 602 includes various layers, including an inner tunica intima 604, an intermediate tunica media 606, and an outer tunica adventitia 608, such as described in FIG. 2A with respect to artery wall 202 having tunica intima 204, tunica media 206, and tunica adventitia 208. In the example shown in FIG. 6A, a diameter of artery lumen 610A is greater than a diameter of an initial lumen 610B. Initial lumen 610B can be, for example, a lumen size at some point prior to artery 600 forming the defect (e.g., an aneurysm) and/or an otherwise desirable lumen size.

FIG. 6B is a cross-sectional illustration of artery 600 of FIG. 6A including an intravascular medical device 620 at least partially positioned within artery 600, in accordance with some examples of the present disclosure. A distal portion of intravascular medical device 620 is positioned within artery 600 near a treatment site, such as an enlarged section of artery 600. The distal portion of intravascular medical device 620 includes a heat therapy assembly 622 and an elongated member 624. Intravascular medical device 620, heat therapy assembly 622, and elongated member 624 are examples of intravascular medical device 12, heat therapy assembly 14, and elongated member 16 of FIG. 1, respectively. In the example of FIG. 6B, intravascular medical device 620 includes a contraction assembly configured to contract wall 602 of artery 600, such as by sealing a local volume of the treatment site and creating a vacuum in the local volume using a balloon.

FIG. 6C is a cross-sectional illustration of artery 600 of FIG. 6A prior to contracting artery 600. Heat therapy assembly 622 is in a first deployed configuration, such that a local volume of the treatment site is isolated (e.g., fluidically sealed from the downstream and/or upstream regions of artery 600) and a volume of lumen 610A is occupied by heat therapy assembly 222.

FIG. 6D is a cross-sectional illustration of artery 600 of FIG. 6A receiving heat therapy from intravascular medical device 620, in accordance with some examples of the present disclosure. Heat therapy assembly 622 is in a second deployed configuration having a small diameter than the first deployed configured. As a result, heat therapy assembly may collapse wall 602, such that wall 602 has a smaller diameter. In some examples, one or more surfaces of heat therapy assembly 622 contact an inner surface of wall 602. In the example of FIG. 6D, an outer surface of heat therapy assembly 622 is contacting all of an inner surface of wall 602, and has contracted a perimeter of the inner surface of wall 602. In examples in which heat therapy assembly 622 includes different components for contracting wall 602 of artery 600 and delivering energy to wall 602, heat therapy assembly 622 may expand to a desired volume prior to contracting wall 602 (e.g., without the step shown in FIG. 6C). In some examples, heat therapy assembly 622 does not contact wall 602, or only partially contacts wall 602, and is positioned (e.g., within a distance) to deliver energy to wall 602. Heat therapy assembly 622 is configured to heat wall 602 to create a heat therapy region 630 of wall 602, such as described in FIGS. 2A-2E with respect to heat therapy region 230. In the example of FIG. 6D, heat therapy region 630 extends around a full circumference of artery 600 and extends into tunica adventitia 608.

FIG. 6E is a cross-sectional illustration of artery 600 of FIG. 6A immediately after heat therapy from intravascular medical device 620, in accordance with some examples of the present disclosure. As a result of ablation of endothelial cells of tunica intima 604, tunica intima 604 includes a fully ablated endothelial lining and is substantially absent from wall 602. Tunica media 606 includes smooth muscle cells that are substantially ablated and collagen fibers are substantially denatured. The denatured collagen fibers may cross-link with other structural proteins to coagulate the structural proteins and form a rigid scaffold that may be relatively fixed. Tunica adventitia 608 includes an intact portion 608A that was not subject to heat therapy region 630 and includes intact structural proteins, and an ablated portion 608B that was subject to heat therapy region 630 in which collagen fibers are substantially denatured. As a result, ablated portion 608B of tunica adventitia 608 may have increased rigidity due to the denaturation and cross-linking of structural proteins.

Figure 6F:
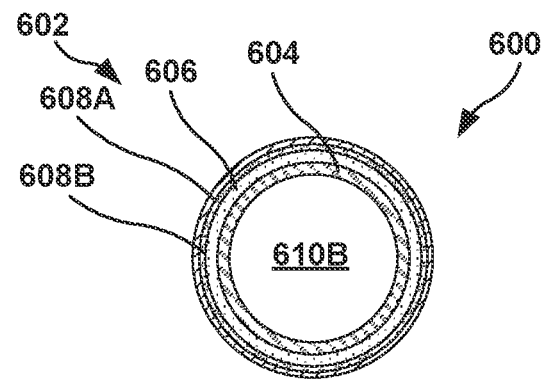
FIG. 6F is a cross-sectional illustration of the artery of FIG. 6A several weeks after heat therapy from an intravascular medical device, in accordance with some examples of the present disclosure.

FIG. 6F is a cross-sectional illustration of artery 600 of FIG. 6A several weeks after heat therapy from intravascular medical device 620, in accordance with some examples of the present disclosure. Endothelial cells of tunica intima 604 have grown back on an expanded ablated tunica media 606. As a result, lumen 610B may have a greater cross-sectional area after heat therapy than lumen 610A prior to heat therapy.

Intravascular medical devices described herein, such as intravascular medical device 12 of FIG. 1, may include one or more of a variety of heat therapy assemblies having various mechanisms for contracting a vessel and various mechanisms for delivering energy to the vessel. Contraction of a vessel may be desirable, for example, to treat an enlarged vessel. In some examples, such as FIGS. 7A-7D, a heat therapy assembly includes a contraction assembly having one or more expandable cavities, such as balloons, configured to contract the wall of the vessel by generating a local vacuum near a treatment site of the vessel. FIGS. 7A-7D illustrate examples of intravascular medical device 12.

Figure 7A:
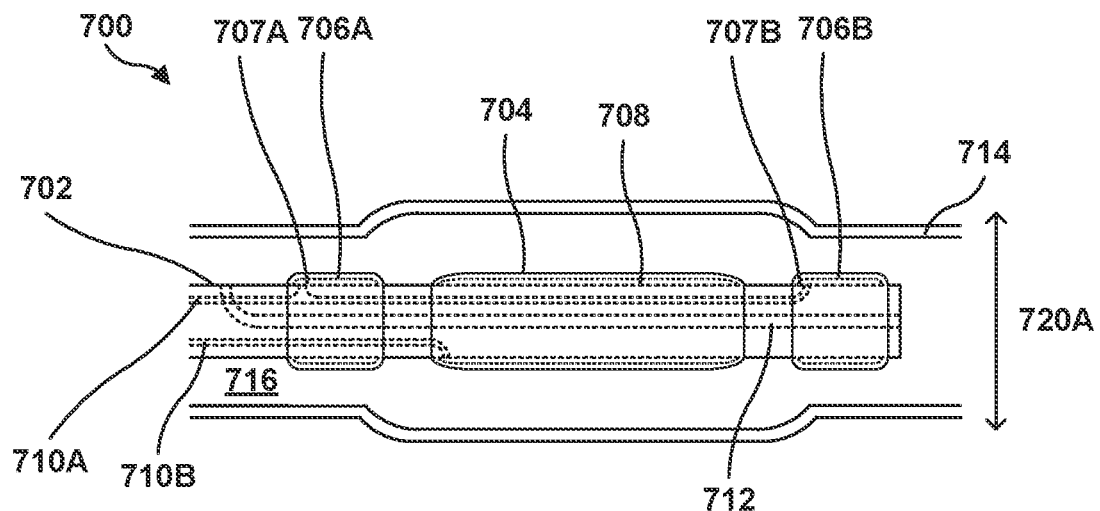
FIG. 7A is an expanded side view conceptual illustration of a distal portion of an example intravascular medical device positioned in a vessel in a delivery configuration.

FIG. 7A is an expanded side view conceptual illustration of a distal portion of an example intravascular medical device 700 positioned in a lumen 716 of a vessel 714 in a delivery configuration. Intravascular medical device 700 is an example of intravascular medical device 12 of FIG. 1. Intravascular medical device 700 includes a vacuum balloon 704 defining a cavity 708. Intravascular medical device 700 also includes a contraction assembly that includes a proximal balloon 706A defining a cavity 707A and a distal balloon 706B defining cavity 707B. When intravascular medical device 700 is in a delivery configuration, such as illustrated in FIG. 7A, balloons 704, 706A, and 706B may be in a deflated configuration in which cavities 708, 707A, and 707B are empty or nearly empty, such that the distal portion of intravascular medical device 700 may be navigated through vasculature and positioned within lumen 716 of vessel 714 proximate to the treatment site.

Intravascular medical device 700 includes elongated member 702, such as elongated member 16 of FIG. 1. Elongated member 702 includes one or more fluid channels 710A and 710B. Fluid channel 710A is configured to discharge a fluid into and/or discharge a fluid from cavity 707A of proximal balloon 706A and cavity 707B of distal balloon 706B. Fluid channel 710B is configured to discharge a fluid into and/or discharge a fluid from a cavity 708 of vacuum balloon 704. Fluid channel 710A is configured to discharge a fluid into and/or discharge a fluid from a cavity 708 of vacuum balloon 704. In other examples, balloons 706A, 706B may be fluidically coupled to separate fluid channels to enable more controlled expansion of the balloons during a medical procedure. Fluid channels 710 may each be in fluid communication with a fluid source through a port on a hub, such as hub 18 of FIG. 1. In some examples, fluid channel 710A may be in fluid communication with a fluid source configured to discharge a thermal medium into vacuum balloon 704.

In the example of FIG. 7A, intravascular medical device 700 includes a through-channel 712 in elongated member 702 with a distal opening distal to distal balloon 706B and a proximal opening proximal to proximal balloon 706A. Through-channel 712 is configured to permit fluid to flow through vessel 714 while proximal balloon 706A and distal balloon 706B are inflated.

Figure 7B:
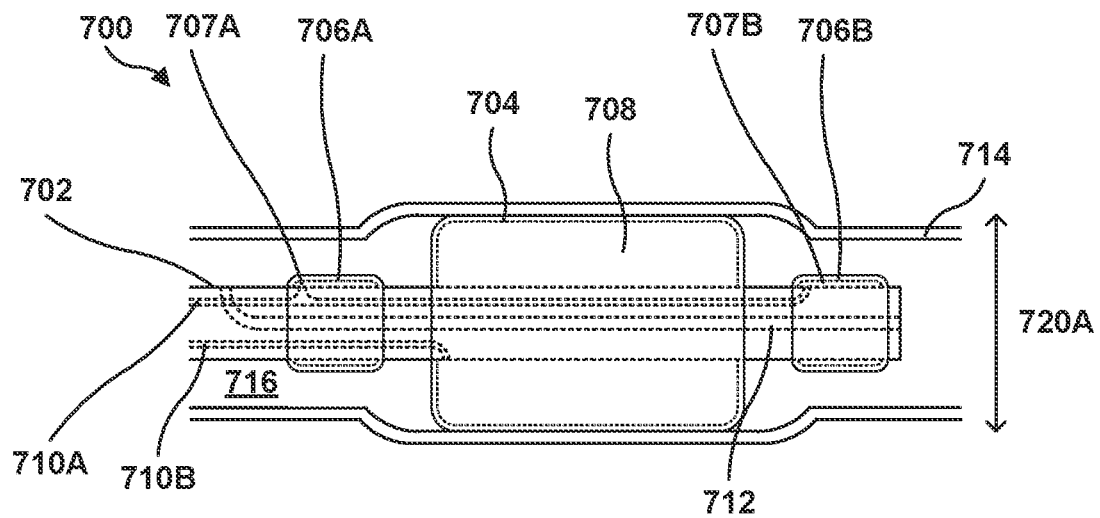
FIG. 7B is an expanded side view conceptual illustration of the distal portion of the example intravascular medical device of FIG. 7A positioned in the vessel in a partially deployed configuration.

Initially, vessel 714 may have a first diameter 720A at the treatment site. Intravascular medical device 700 is configured to contract vessel 714 at the treatment site to a reduced diameter and apply heat therapy to vessel 714 at the reduced diameter. To contract vessel 714, intravascular medical device 700, e.g., under the control of control circuitry (FIG. 1) is configured to generate a vacuum near the treatment site by removing fluid from a constriction volume near the treatment site. FIG. 7B is an expanded side view conceptual illustration of a distal portion of example intravascular medical device 700 of FIG. 7A positioned in lumen 716 of vessel 714 in a first deployed configuration of vacuum balloon 704. The first deployed configuration corresponds to a volume of fluid that may be removed once the constriction volume is defined and sealed.

To define this volume, balloon 704 is configured to expand from the deflated configuration in the delivery configuration of intravascular medical device 700 to an inflated configuration in the first deployed configuration of intravascular medical device 700 in response to a pressure differential between an internal pressure within cavity 708 and an external pressure at the outer surface. The internal pressure within cavity 708 may be sufficient such that balloon 704 takes up a substantial volume of lumen 716 adjacent to the treatment site of vessel 714. To increase an internal pressure within cavity 708 to expand balloon 704, cavity 708 is configured to receive and contain a pressurized fluid. For example, balloon 704 may receive a pressurized fluid into cavity 708 through fluid channel 710B. In the example of FIG. 7B, balloon 704 expands to contact a wall of vessel 714. For example, expanding balloon 704 to substantially fill the volume of lumen 716 adjacent the treatment site may increase an amount volume removed, and thus contraction, of vessel 714. However, in other examples, balloon 704 may expand without contacting a wall of vessel 714. For example, expanding balloon 704 to a lesser volume of lumen 716 may correspond to a desired diameter once balloon 704 is contracted.

Figure 7C:
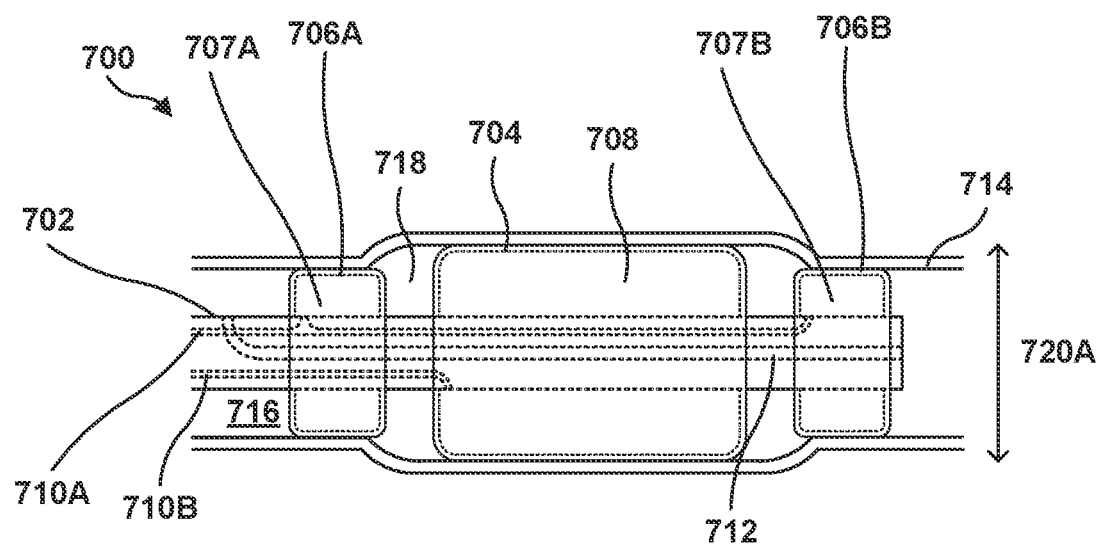
FIG. 7C is an expanded side view conceptual illustration of the distal portion of the example intravascular medical device of FIG. 7A positioned in the vessel in a partially deployed configuration.

FIG. 7C is an expanded side view conceptual illustration of the distal portion of the example intravascular medical device 700 of FIG. 7A positioned in vessel in a deployed configuration of the contraction assembly. The contraction assembly, including proximal balloon 706A and distal balloon 706B, is configured to define and seal a constriction volume 718 of vessel 714 adjacent to the treatment site. Proximal balloon 706A may be configured to inflate to seal a proximal end of constriction volume 718, while distal balloon 706B may be configured to inflate to seal a distal end of constriction volume 718. Thus, when balloons 706A, 706B are expanded, balloons 706A, 706B isolate constriction volume 718 and may fluidically isolate volume 718 from other parts of vessel 714.

Figure 7D:
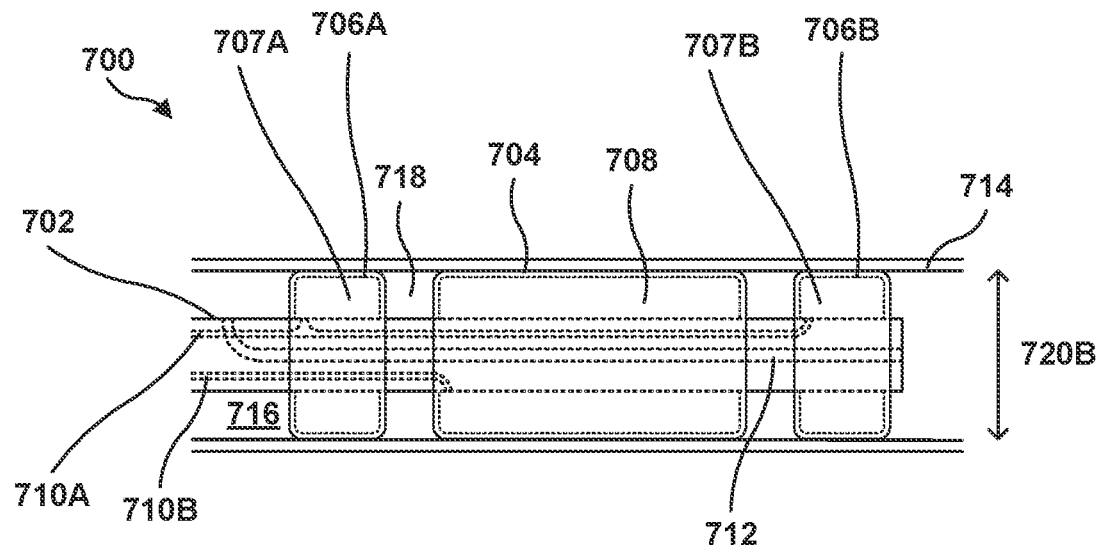
FIG. 7D is an expanded side view conceptual illustration of the distal portion of the example intravascular medical device of FIG. 7A positioned in the vessel in a fully deployed configuration and operating to contract the vessel.

FIG. 7D is an expanded side view conceptual illustration of the distal portion of the example intravascular medical device of FIG. 7A positioned in the vessel in a second deployed configuration of vacuum balloon 704. Intravascular medical device 700 is configured to create a vacuum in constriction volume 718. In the example of FIG. 7D, intravascular medical device 700 includes one or more openings, such as fluid channel 710A, configured to remove a fluid from constriction volume 718. Vacuum balloon 704 may be at least partially deflated to remove fluid from constricted volume 718. For example, fluid may be removed from cavity 708 through fluid channel 710A, such as by modulating an opening fluid channel 710A or operating a pump fluidically coupled to fluid channel 710A. The fluid removal may create a vacuum in constricted volume 718, exerting a radially inward force on vessel 714 and causing vessel 714 to constrict inward. An amount that vessel 714 constricts may be defined by an outer diameter of balloon 704. As such, the second deployed configuration of vacuum balloon 704 may correspond to a second diameter 720B at which vessel 714 may be fixed with heat therapy. Second diameter 720B may be selected to correct a previous enlargement or ensure good contact between vessel 714 and vacuum balloon 704.

Intravascular medical device 700 is configured to deliver energy to the wall of the vessel to heat the wall of the vessel and fix vessel 714 at a reduced diameter. In some examples, such as illustrated in FIGS. 7A-7D, intravascular medical device 700 is configured to deliver thermal energy to vessel 714 with a thermal fluid. For example, cavity 708 may be configured to receive and contain the thermal medium to deliver thermal energy to vessel 714. The thermal medium may include the pressurized fluid used to expand balloon 704, or may be a different medium within cavity 708 in addition to the pressurized fluid. The thermal medium may include one or more solids or fluids configured to deliver thermal energy to balloon 704 and, as a result, heat a portion of vessel 714 in contact with an outer surface of balloon 704. When balloon 704 is in the expanded configuration, the outer surface of balloon 704 includes one or more surfaces in contact with the wall of vessel 714 to transfer heat flux through a wall of balloon 704 from the thermal medium within cavity 708. A thickness of balloon 704 between the outer surface and cavity 708 may be sufficiently low that balloon 704 may have a relatively small temperature gradient between the outer surface and an inner surface of balloon 704 defining cavity 708.

In other examples, intravascular medical device 700 may be configured to deliver other types of energy to vessel 714. For example, such as illustrated in FIG. 4A, balloon 704 may include one or more therapeutic elements positioned on or within balloon 704. The therapeutic elements may be configured to deliver energy, such as thermal energy (e.g., thermoelectric elements), electrical energy (e.g., radiofrequency electrodes, electrical contacts), radiant energy (e.g., microwave antennae, optical elements such as lasers) or mechanical energy (e.g., ultrasound transducers), to vessel 714. Such other types of energy may be capable of heating vessel 714 without contacting a wall of vessel 714. For example, once contracted, balloon 714 may not contact, or may only partially contact, the wall of vessel 714. However, the energy may still be delivered to the wall of vessel 714 to heat the wall of vessel 714. For example, one or more therapeutic elements may deliver radiation energy (e.g., microwave energy from an antenna), mechanical energy (e.g., ultrasound energy from a transducer), or thermal energy (e.g., from a fluid heated by a resistive element) to the wall of vessel 714 or a fluid in vessel 714 to heat the wall of vessel 714.

While intravascular medical device 700 has been described as using vacuum balloon 704 to remove fluid from constriction volume 718, in other examples, other devices or systems may be used to remove fluid from constriction volume 718. In some examples, intravascular medical device 700 includes an opening directly exposed to constricted volume 718 and configured to receive fluid from constricted volume 718 to create the vacuum.

Intravascular medical devices of heat therapy systems described herein can be configured to deliver energy to a vessel using a variety of methods and/or mechanisms, including any method or mechanism capable of delivering energy from within a small area (e.g., cross-sectional area of a vessel) and increasing a temperature of tissues in the wall of the vessel above a temperature at which denaturation of structural proteins and ablation of the smooth muscle cells occur.

Figure 8A:
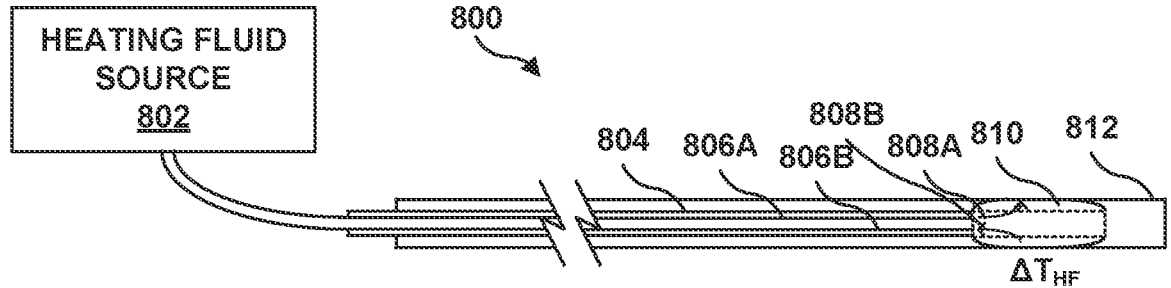
FIG. 8A is an expanded side view conceptual illustration of a distal portion of an example intravascular medical device configured to deliver heat to a vessel wall using a heating fluid in a balloon, in accordance with some examples of the present disclosure.

In some examples, a heat therapy system may apply heat therapy using a heating fluid. FIG. 8A is an expanded side view conceptual illustration of a distal portion of an example intravascular medical device 800 that is configured to deliver thermal energy using a heating fluid in a balloon 810, in accordance with some examples of the present disclosure. Balloon 810 is an example of heat therapy assembly 14 of FIG. 1. Intravascular medical device 800 includes balloon 810 coupled to an elongated member 804, a fluid inlet 808A configured to discharge heating fluid into balloon 810, and a fluid outlet configured to discharge heating fluid from balloon 810. Intravascular medical device 800 is fluidically coupled to heating fluid source 802 and configured to receive heating fluid from heating fluid source 802 via fluid inlet 808A and discharge heating fluid to heating fluid source 802 via fluid outlet 808B.

Balloon 810 is configured to receive and discharge a heating fluid as a thermal medium to deliver thermal energy to the wall of a vessel 812 and expand in response to a positive pressure differential of the heating fluid across balloon 810. For example, fluid inlet 808A may receive heating fluid at a first temperature and fluid outlet 808B may discharge heating fluid at a second, lower temperature. A variety of heating fluids may be used including, but not limited to, water, saline, or the like, or any combination thereof.

Heating fluid source 802 is configured to control a heating load of the heating fluid. For example, heating fluid source 802 can include therapy generator 30 of FIG. 1 and control circuitry 35 can perform one or more of the functions attributed to heating fluid source 802 herein. The heating load may be a function of a rate of heating fluid entering balloon 810, a temperature of heating fluid entering balloon 810, and an amount of time for which heating fluid enters balloon 810. In some examples, to control the heating load of the heating fluid, heating fluid source 802 is configured to control at least one of a flow rate of the heating fluid to balloon 810 or a temperature of the heating fluid. For example, heating fluid source 802 may include a pump or other fluid displacement device configured to deliver pressurized heating fluid to balloon 810 at a particular pressure or flow rate and/or a heat exchanger or other temperature control device configured to control a temperature of the heating fluid delivered to balloon 810. The heating fluid is conditioned (e.g., pumped at a particular rate or to a particular pressure and/or cooled to a particular temperature) to deliver heat to the wall of a vessel 812 and maintain a temperature gradient $\Delta T_{HF}$ between a temperature of the heating fluid and a temperature of the wall of vessel 812. For example, heating fluid source 802 may maintain a pressure within balloon 810 sufficient to ensure contact between an outer surface of balloon 810 and an inner surface of vessel 812, while also maintaining a sufficiently high flow rate and/or low temperature to provide a particular heating load to balloon 810.

Figure 8B:
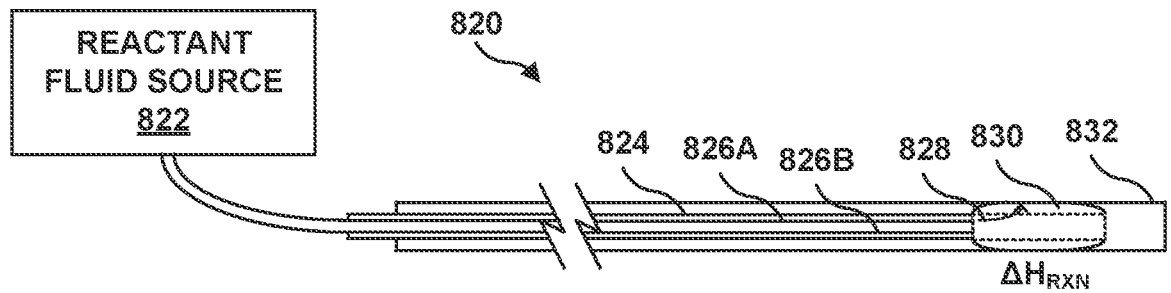
FIG. 8B is an expanded side view conceptual illustration of a distal portion of an example intravascular medical device configured to generate and deliver heat to a vessel wall using a chemical reaction in a balloon, in accordance with some examples of the present disclosure.

In some examples, a heat therapy system may apply heat therapy using an exothermic chemical reaction. FIG. 8B is an expanded side view conceptual illustration of a distal portion of an example intravascular medical device 820 that removes heat using a chemical reaction in balloon 830, in accordance with some examples of the present disclosure. Intravascular medical device 820 is an example of intravascular medical device 12 of FIG. 1, and balloon 830 is an example of heat therapy assembly 14 of FIG. 1. Intravascular medical device 820 includes balloon 830 coupled to an elongated member 824 and a fluid inlet 828 configured to discharge a reactant fluid into balloon 830. In some examples, intravascular medical device 820 may include a fluid outlet configured to discharge a reaction product from balloon 830, such as to manage a pressure within balloon 830. Intravascular medical device 820 is fluidically coupled to reactant fluid source 822 and configured to receive a reactant fluid from reactant fluid source 822 via fluid inlet 828 and, optionally, discharge reactant products to reactant fluid source 822 (or another system) via a fluid outlet.

Balloon 830 is configured to contain one or more reactant and/or product fluids as a thermal medium to generate and deliver thermal energy to the wall of a vessel 812 and expand in response to a positive pressure differential of the reactant fluid and/or reaction products. For example, an exothermic reaction may include any reaction between one or more reactants that removes heat from the system and delivers heat to the surroundings. Balloon 830 is configured to receive at least one reactant as a reactant fluid. At least one reactant may react with another reactant, such as a reactant introduced through fluid inlet 828 or already present within balloon 830, to generate heat and produce one or more products, at least one of which may be a gaseous product. The gaseous product may expand balloon 830 to contact vessel 832, such that heat delivered by the reactants and/or products may be delivered to vessel 832 via balloon 830. A variety of reactants may be used including, but not limited to, calcium chloride, and the like. For example, calcium chloride injected into balloon 830 may react with water in balloon 830 to produce heat.

Reactant fluid source 822 is configured to control a heating load of the exothermic chemical reaction within balloon 830. For example, reactant fluid source 822 can include therapy generator 30 of FIG. 1 and control circuitry 35 can perform one or more of the functions attributed to reactant fluid source 822 herein. The heating load may be a function of a composition of one or more reactants, a rate of reactant fluid entering balloon 830, a temperature of reactant fluid entering balloon 830, a pressure of reactant fluid entering balloon 830, an extent of the exothermic chemical reaction within balloon 830, and a concentration of the one or more reactants and/or one or more products. In some examples, to control the heating load of the exothermic chemical reaction within balloon 830, reactant fluid source 822 is configured to control a flow rate of at least one reactant of the exothermic chemical reaction to the cavity of balloon 830. Reactant fluid source 822 conditions the reactant fluid (e.g., pumps the fluid at a particular rate or in a particular concentration) to deliver heat to the wall of a vessel 832 as the exothermic reaction progresses and maintains a high temperature within balloon 830 by deliver heat to balloon 830 according to a heat of reaction $\Delta H_{RXN}$. For example, reactant fluid source 822 may maintain a rate of reaction that produces a pressure within balloon 830 sufficient to ensure contact between an outer surface of balloon 830 and an inner surface of vessel 832, while also maintaining a rate of reaction within balloon 830 to provide a particular heating load to balloon 830.

Figure 8C:
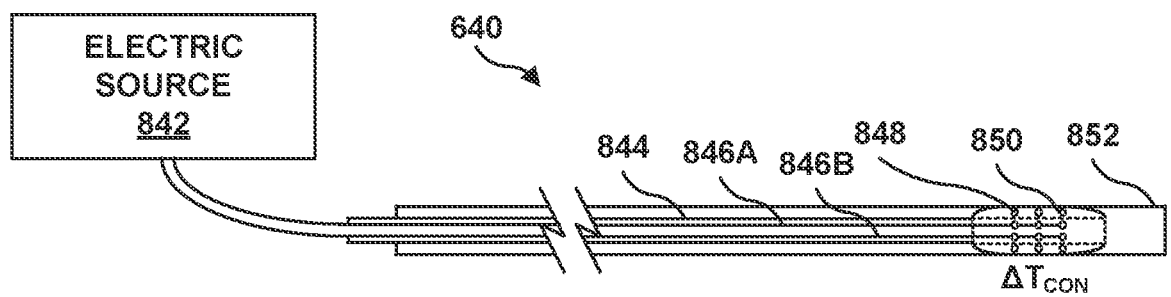
FIG. 8C is an expanded side view conceptual illustration of a distal portion of an example intravascular medical device configured to generate and deliver heat to a vessel wall using therapeutic elements on a balloon, in accordance with some examples of the present disclosure.

In some examples, a heat therapy system may apply heat therapy using one or more therapeutic elements configured to deliver thermal energy. FIG. 8C is an expanded side view conceptual illustration of a distal portion of an example intravascular medical device 840 that delivers thermal energy using therapeutic elements 848 on a balloon 850, in accordance with some examples of the present disclosure. Intravascular medical device 840 is an example of intravascular medical device 12 of FIG. 1, and thermoelectric elements 848 and balloon 850 are an example of heat therapy assembly 14 of FIG. 1. Intravascular medical device 840 includes balloon 850 coupled to an elongated member 844, a first electrical conductor 846A configured to deliver current to a first set of therapeutic elements 848 and a second electrical conductor 846B configured to deliver current to a second set of therapeutic elements 848, and one or more fluid inlets/outlets (not shown) configured to deliver and discharge a pressurized fluid from balloon 850. Balloon 850 is configured to receive and discharge a pressurized fluid and expand in response to a positive pressure differential of the pressurized fluid across balloon 850.

In the example of FIG. 8C, the therapeutic elements 848 include a plurality of thermoelectric elements configured to change temperature in response to an applied voltage. Intravascular medical device 840 is electrically coupled to electric source 842 and configured to receive electrical current from electric source 842 via electrical conductors 846A and 846B. For example, under the control of control circuitry, electrical conductor 846A may receive an electrical current at a first voltage and electrical conductor 846B may receive an electrical current at a second voltage. Electric source 842 is configured to control the electrical current to the plurality of thermoelectric elements. For example, electric source 842 can include therapy generator 30 of FIG. 1 and control circuitry 35 can perform one or more of the functions attributed to electric source 842 herein. Electric source 842 may be configured to control a voltage of the electrical current applied to the plurality of thermoelectric elements. Electric source 842 conditions the electrical current (e.g., delivers the current at a particular voltage) to control a temperature of the plurality of thermoelectric elements to cause the plurality of thermoelectric elements deliver heat to the wall of a vessel 852 and maintain a temperature gradient $\Delta T_{CON}$ between a temperature of the plurality of thermoelectric elements and a temperature of the wall of vessel 852. For example, a pressurized fluid source (not shown) may maintain a pressure within balloon 850 sufficient to ensure contact between the plurality of thermoelectric elements and an inner surface of vessel 852, while electric source 842 may maintain an applied voltage to the plurality of thermoelectric elements to provide a particular heating load to vessel 852. In some examples, electric source 842 is configured to apply a different voltage to particular thermoelectric elements of the plurality of thermoelectric elements. For example, electric source 842 may be configured to deliver electrical current at a first voltage to the first set of thermoelectric elements coupled to electrical conductor 846A corresponding to a first temperature of the first set of thermoelectric elements and deliver electrical current at a second voltage to the second set of thermoelectric elements coupled to electrical conductor 846B corresponding to a second, lower temperature of the second set of thermoelectric elements.

Figure 8D:
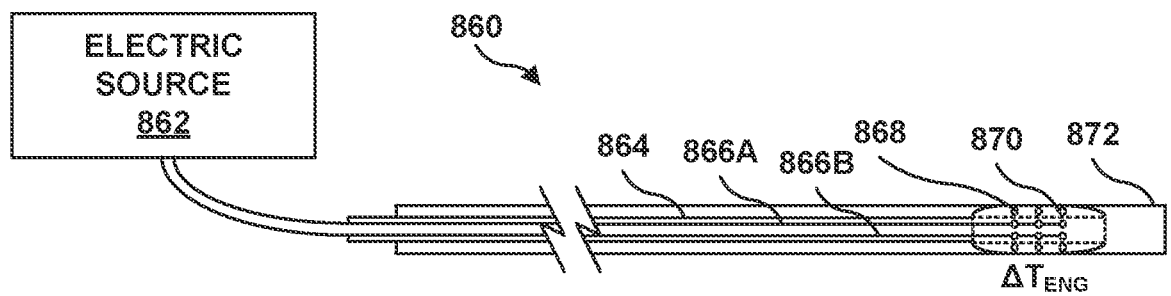
FIG. 8D is an expanded side view conceptual illustration of a distal portion of an example intravascular medical device configured to deliver energy to a vessel wall using therapeutic elements on a balloon to generate heat in the vessel wall, in accordance with some examples of the present disclosure.

In some examples, a heat therapy system may apply heat therapy using one or more therapeutic elements configured to deliver energy that generates thermal energy in tissues of a vessel. FIG. 8D is an expanded side view conceptual illustration of a distal portion of an example intravascular medical device 860 that delivers energy using therapeutic elements 868 on a balloon 870, in accordance with some examples of the present disclosure. Intravascular medical device 860 is an example of intravascular medical device 12 of FIG. 1, and therapeutic elements 868 and balloon 870 are an example of heat therapy assembly 14 of FIG. 1. Intravascular medical device 860 includes balloon 870 coupled to an elongated member 864, a first electrical conductor 866A configured to deliver current to a first set of therapeutic elements 868 and a second electrical conductor 866B configured to deliver current to a second set of therapeutic elements 868, and one or more fluid inlets/outlets (not shown) configured to deliver and discharge a pressurized fluid from balloon 870. Balloon 870 is configured to receive and discharge a pressurized fluid and expand in response to a positive pressure differential of the pressurized fluid across balloon 870.

Intravascular medical device 860 is electrically coupled to electric source 862 and configured to receive electrical current from electric source 862 via electrical conductors 866A and 866B. Electric source 842 can include therapy generator 30 of FIG. 1 and control circuitry 35 can perform one or more of the functions attributed to electric source 862 herein. Electric source 862 is configured to control the electrical current to the plurality of thermoelectric elements. Electric source 862 conditions the electrical current (e.g., delivers the current at a particular voltage, frequency, amplitude, etc.) to control the energy delivered from the plurality of therapeutic elements 868 to vessel 872 to generate heat in tissues of the wall of vessel 872 and a corresponding temperature increase $\Delta T_{ENG}$. For example, a pressurized fluid source and/or vacuum source (not shown) may maintain a pressure within balloon 870 sufficient to ensure expansion or contraction of vessel 872, while electric source 862 may maintain an applied electrical current to the plurality of therapeutic elements 868 to generate a particular heating load in vessel 872.

In some examples, electric source 862 is configured to apply an electric current having a different set of properties to particular therapeutic elements of the plurality of therapeutic elements 868 to generate different amounts of heat in portions of vessel 872. For example, under the control of control circuitry, electrical conductor 866A may receive an electrical current having a first set of parameters (e.g., frequency, voltage, etc.) and deliver the electrical current to a first set of therapeutic elements, while electrical conductor 866B may receive an electrical current having a second set of parameters and deliver the electrical current to a second set of therapeutic elements, thereby delivering energy having different characteristics and producing different amounts of heat in tissues adjacent to the first and second sets of therapeutic elements.

In some examples, the plurality of therapeutic elements 868 includes a plurality of radiofrequency electrodes configured to deliver electrical energy in a radiofrequency spectrum to generate resistive heating in tissues of vessel 872. Electric source 862 may be configured to control a frequency and magnitude of the electrical current applied to the plurality of radiofrequency electrodes. Electric source 862 conditions the electrical current (e.g., delivers the current at a particular frequency and/or amplitude) to control the electrical energy delivered to the wall of vessel 872 to generate resistive heating in the wall of vessel 872 and raise the temperature of tissues in the wall of vessel 872. For example, a pressurized fluid source (not shown) may maintain a pressure within balloon 870 sufficient to ensure contact between the plurality of radiofrequency electrodes and an inner surface of vessel 872, while electric source 862 may maintain an applied electrical current to the plurality of electrodes to generate a particular heating load in vessel 872.

In some examples, the plurality of therapeutic elements 868 includes a plurality of microwave antennae configured to deliver radiant energy in a microwave spectrum to generate dielectric heating in tissues of vessel 872. Electric source 862 may be configured to control a frequency and magnitude of the electrical current applied to the plurality of microwave antennae. Electric source 862 conditions the electrical current (e.g., delivers the current at a particular frequency and/or amplitude) to control the radiant energy delivered to the wall of vessel 872 to generate dielectric heating in the wall of vessel 872 and raise the temperature of tissues in the wall of vessel 872. For example, electric source 862 may maintain an applied electrical current to the plurality of microwave antennae to generate a particular heating load in vessel 872.

In some examples, the plurality of therapeutic elements 868 includes a plurality of optical elements, such as diodes, configured to deliver radiant energy in an infrared spectrum to generate radiative heating in tissues of vessel 872. Electric source 862 may be configured to control a frequency and magnitude of the electrical current applied to the plurality of optical elements. Electric source 862 conditions the electrical current (e.g., delivers the current at a particular frequency and/or amplitude) to control the radiant energy delivered to the wall of vessel 872 to generate radiative heating at the wall of vessel 872 and raise the temperature of tissues in the wall of vessel 872. For example, electric source 862 may maintain an applied electrical current to the plurality of optical elements to generate a particular heating load in vessel 872.

In some examples, the plurality of therapeutic elements 868 includes a plurality of ultrasound transducers configured to deliver mechanical energy as sound waves to generate cavitation heating in tissues of vessel 872. Electric source 862 may be configured to control a frequency and magnitude of the electrical current applied to the plurality of ultrasound transducers. Electric source 862 conditions the electrical current (e.g., delivers the current at a particular frequency and/or amplitude) to control the sound waves delivered to the wall of vessel 872 to generate cavitation heating in the wall of vessel 872 and raise the temperature of tissues in the wall of vessel 872. For example, electric source 862 may maintain an applied electrical current to the plurality of ultrasound transducers to generate a particular heating load in vessel 872.

Figure 8E:
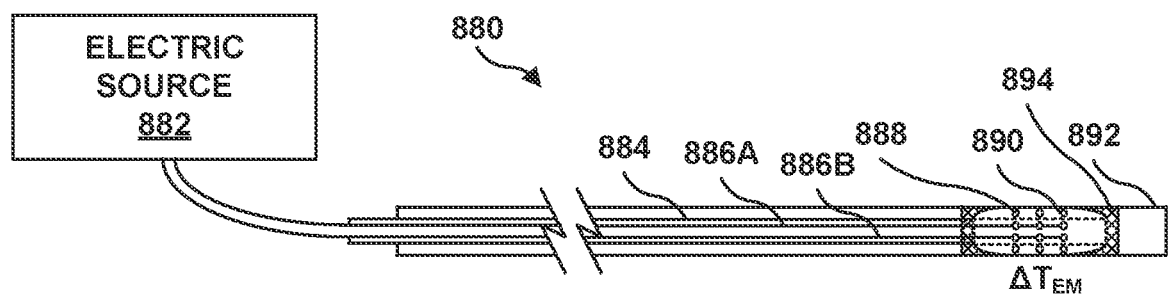
FIG. 8E is an expanded side view conceptual illustration of a distal portion of an example intravascular medical device configured to deliver energy to a stent contacting a vessel wall using therapeutic elements on a balloon to heat the vessel wall, in accordance with some examples of the present disclosure.

In some examples, a heat therapy system may apply heat therapy using one or more therapeutic elements configured to deliver energy to a structure positioned within a vessel to generate thermal energy in tissues of the vessel. FIG. 8E is an expanded side view conceptual illustration of a distal portion of an example intravascular medical device 860 that delivers energy using therapeutic elements 888 on a balloon 890, in accordance with some examples of the present disclosure. Intravascular medical device 880 is an example of intravascular medical device 12 of FIG. 1, and therapeutic elements 888 and balloon 890 are an example of heat therapy assembly 14 of FIG. 1. Elongated member 884, first electrical conductor 886A, second electrical conductor 886B, the plurality of therapeutic elements 888, balloon 890, and electric source 882 may be similar to elongated member 864, first electrical conductor 866A, second electrical conductor 866B, the plurality of therapeutic elements 868, balloon 860, and electric source 862 of FIG. 8D above.

In the example of FIG. 8E, vessel 892 includes stent 894 positioned within vessel 892. Stent 894 may be capable of receiving electrical energy at a particular frequency and converting or reflect at least a portion of the electrical energy to electromagnetic radiation at the particular frequency. For example, stent 894 may be electrically conductive. In some examples, stent 894 may be capable of attenuating particular frequencies of electromagnetic radiation. For example, stent 894 may include filaments or other spaced structures that have a spacing and/or thickness that blocks or attenuates particular frequencies, such as higher frequencies. While illustrated as a stent 894, in other examples, another structure may be positioned in vessel 892, such as a metallic support structure.

In some examples, the plurality of therapeutic elements 888 includes a plurality of electrical contacts configured to deliver electrical energy to stent 894 and generate radiant energy from stent 894. Stent 894 may deliver the radiant energy in a microwave spectrum to tissues of vessel 872. Electric source 882 may be configured to control a frequency and magnitude of the electrical current applied to the plurality of electrical contacts to generate radiant energy having particular properties, such as frequency or amplitude. Electric source 882 conditions the electrical current (e.g., delivers the current at a particular frequency and/or amplitude) to control the electrical energy delivered to stent 894. In response to receiving the electrical energy, stent 894 generates radiant energy in the microwave spectrum and delivers the radiant energy to the wall of vessel 872 to generate dielectric heating in the wall of vessel 872 and raise the temperature of tissues in the wall of vessel 872.

In some examples, the plurality of therapeutic elements 888 includes a plurality of microwave antennae or other radiant energy source configured to deliver radiant energy in an electromagnetic spectrum to generate heating in tissues of vessel 872. Stent 894 may be configured to attenuate various frequencies of the electromagnetic spectrum, thereby reducing penetration of the radiant energy through stent 894 and substantially limiting heat produced by the radiant energy to tissues of vessel 892 between intravascular medical device 880 and stent 894. Electric source 862 may be configured to control a frequency and magnitude of the electrical current applied to the plurality of therapeutic elements 888, such that the radiant energy may not substantially penetrate stent 894. Electric source 862 conditions the electrical current (e.g., delivers the current at a particular frequency and/or amplitude) to control the radiant energy delivered to the wall of vessel 872 to generate dielectric heating in the wall of vessel 872 between intravascular medical device 880 and stent 894 and raise the temperature of these tissues in the wall of vessel 872.

Figure 9:
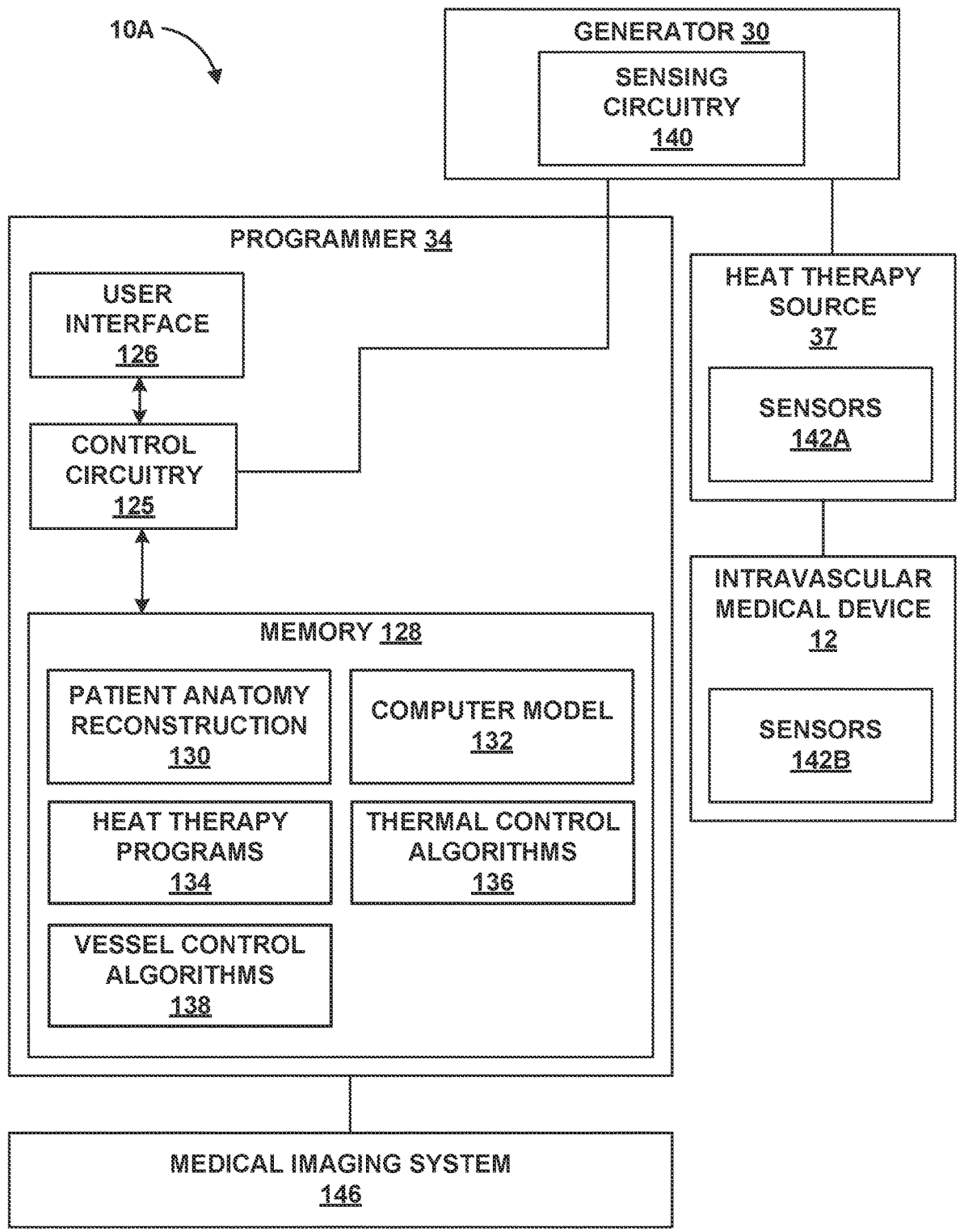
FIG. 9 is a schematic and conceptual illustration of an example programmer coupled to an imaging system and an example intravascular medical device, in accordance with some examples of the present disclosure.

FIG. 9 is a schematic and conceptual illustration of an example programmer 34 coupled to a medical imaging system 146 and an example intravascular medical device 12, in accordance with some examples of the present disclosure. In some examples, system 10A is similar to system 10 described with reference to FIG. 1. Instead of, or in addition to, control circuitry 35 and memory 38 in heat therapy generator 30, system 10A may include programmer 34 including a control circuitry 125, a user interface 126, and a memory 128. In some examples, control circuitry 35 and memory 38 in heat therapy generator 30 may perform functions described with reference to control circuitry 125 and memory 128.

Memory 128 includes computer-readable instructions that, when executed by control circuitry 125, causes programmer 34 to perform various functions. Control circuitry 125 may include any one or more microprocessors, controllers, DSPs, ASICs, FPGAs, or equivalent discrete or integrated digital or analog logic circuitry, and the functions attributed to control circuitry 125 herein may be embodied as software, firmware, hardware or any combination thereof. Memory 128 may include any volatile, non-volatile, magnetic, optical, or electrical media, such as RAM, ROM, NVRAM, EEPROM, flash memory, or any other digital media. Memory 128 may store any suitable information, including patient identification information, and information for generating one or more heat therapy programs with which generator 30 generates and delivers heat therapy to a patient to expand a constricted vessel. For example, memory 128 may store one or more of patient anatomy digital reconstruction 130, computer model 132, heat therapy programs 134, thermal control algorithms 136, vessel control algorithms 138, and operating instructions in separate memories within memory 128 or separate areas within memory 128. Memory 128 may also store operating instructions with which control circuitry 125 controls the operation of programmer 34, and may include instructions for determining placement and orientation of heat therapy assembly 14 along the vessel.

In examples in which system 10A includes programmer 34, generator 30 can be configured to receive one or more heat therapy parameter values with which generator 30 generates and deliver vascular therapy via programmer 34. In some examples, generator 30 or programmer 34 may include one or more evaluation or feedback modules to provide feedback to the clinician before, during, and/or after vascular therapy.

In some examples, functions described elsewhere with reference to programmer 34 may be performed by generator 30, and system 10A may not include a separate programmer.

Thus, system 10A may include a memory (for example, in generator 30 or programmer 34) configured to store one or more tissue characteristics of tissue proximate a vessel of a patient, and control circuitry coupled to the memory. The control circuitry is configured to determine one or more tissue characteristics of tissue proximate a vessel and generate, based on the one or more tissue characteristics, an estimated volume of influence (e.g., temperatures below an ablation temperature of the tissue) of vascular therapy delivered by intravascular medical device 12 disposed within the vessel. The control circuitry is configured to generate a GUI that provides information to a clinician to help visualize vascular therapy, and determine the effects of different therapy delivery parameters. In some examples, the GUI includes a graphical representation of the tissue proximate the vessel and a graphical representation of the estimated volume of influence.

In some examples, the functioning of intravascular medical device 12 and generator 30 may be controlled by programmer 34 or other control circuitry described herein based on an estimated heating load of heat therapy for modifying a structure of a vessel by substantially ablating smooth muscle cells of a vessel and substantially denaturing structural proteins of the vessel. For example, programmer 34 may determine one or more therapy parameters for a heat therapy program for achieving predetermined levels of ablation of smooth muscle cells and denaturation of structural proteins in a target region of a vessel of a patient. The clinician, generator 30, or programmer 34, optionally may choose which therapeutic elements are used for heat therapy delivery in order to form customized treatment regions within the vessel having a variety of predetermined shapes or patterns. The selection of the particular therapeutic elements with which a heat therapy application is delivered to tissue is one example of a therapy delivery parameter value that programmer 34 can determine using the computer modeling techniques described herein.

In some examples, programmer 34 may generate or use therapy programs 134 for determining therapy parameters. Therapy parameters may include any measured or controlled parameter related to delivering heat therapy to a constricted or enlarged vessel, such as parameters for measuring and/or controlling a heating load delivered to the vessel (e.g., via heat therapy assembly 14) or parameters for measuring and/or controlling expansion or contraction of the vessel (e.g., via an expansion device and/or a vacuum assembly). For example, each therapy program 134 defines a particular program of heat therapy in terms of respective values for heat therapy parameters, such as measured parameters of heat therapy assembly 14, such as temperature of one or more surfaces of heat therapy assembly 14; control parameters of a fluid delivered to heat therapy assembly 14, such as a temperature of the fluid, a pressure of the fluid, or a flow rate of the fluid; control parameters of one or more therapeutic elements of heat therapy assembly 14, such as a voltage or frequency delivered to heat therapy assembly 14 or one or more therapeutic elements, a current or voltage amplitude, and/or frequency; control parameters of an expansion device to expand the vessel, such as a diameter of heat therapy assembly 14, an outward force exerted by heat therapy assembly 14, or a degree of deployment of heat therapy assembly 14; control parameters of a vacuum assembly to contract the vessel, such as a pressure of an expansion fluid of sealing balloons or a pressure within a vacuum cavity defined by the sealing balloons; or any combination thereof.

Generator 30 is configured to receive one or more heat therapy programs 134 from programmer 34, and, under the control of control circuitry 35, apply the heat therapy parameter values specified by the received one or more heat therapy programs 134, such as temperature of one or more surfaces of heat therapy assembly 14, temperature of one or more therapeutic elements of heat therapy assembly 14, energy delivered from one or more therapeutic elements of heat therapy assembly 14, pressure of heat therapy assembly 14, temperature of fluid, flow rate of fluid, diameter of heat therapy assembly 14, pressure near a target site of the vessel, and other controllable parameters that may affect a heating load delivered by heat therapy assembly 14 or a diameter of heat therapy assembly 14, or a combination of parameters. For example, generator 30 may control heat therapy source 37 (FIG. 1) to generate a distribution of heat therapy according to a particular therapy program, and deliver the heat therapy via intravascular medical device 12.

Heat therapy source 37 may be configured to deliver a particular distribution of heat therapy. For example, in examples in which heat therapy source 37 includes electrical current or other electrical energy delivery circuitry, heat therapy source 37 may be electrically coupled to the one or more conductors of intravascular medical device 12 using any suitable technique. For example, generator 30 may include switching circuitry configured to switch the electrical current generated by heat therapy source 37 across different therapeutic elements or heat therapy source 37 may include multiple energy sources to deliver energy to one or more therapeutic elements at one time.

In some examples, generator 30 includes sensing circuitry 140 coupled to intravascular medical device 12 and/or heat therapy source 37, for example, to receive electrical measurements, feedback, or signals, for example, temperature, which control circuitry 35 of generator 30 may automatically control the delivery of heat therapy via intravascular medical device 12, in a closed-loop or pseudo closed-loop manner. In some examples, sensing circuitry 140 may be communicatively coupled to one or more sensors 142A in heat therapy source 37 and/or one or more sensors 142B in intravascular medical device 12.

A user, either a clinician or patient, may interact with control circuitry 125 through user interface 126. User interface 126 may include a display, such as a liquid crystal display (LCD), light-emitting diode (LED) display, or other screen, to present information related to stimulation therapy, and buttons or a pad to provide input to programmer 34. In examples in which user interface 126 requires a 3D environment, the user interface may support 3D environments such as a holographic display, a stereoscopic display, an autostereoscopic display, a head-mounted 3D display, or any other display that is capable of presenting a 3D image to the user. Buttons of user interface 126 may include an on/off switch, plus and minus buttons to zoom in or out or navigate through options, a select button to pick or store an input, and pointing device, e.g., a mouse, trackball, or stylus. Other input devices may be a wheel to scroll through options or a touch pad to move a pointing device on the display. In some examples, the display may be a touch screen that enables the user to select options directly from the display screen.

In some examples, programmer 34 includes a telemetry module configured to support wired or wireless communication between programmer 34 and generator 30 or another computing device under the control of control circuitry 125. A clinician or another user may interact with programmer 34 to generate and/or select therapy programs 134 for delivery via intravascular medical device 12. In some examples, programmer 34 may allow a clinician to define target regions, such as heat therapy regions 230 of FIG. 2C, and generate appropriate heat therapy delivery parameter values to achieve the desired heat therapy regions 230. Programmer 34 may be used to present anatomical regions to the clinician via user interface 126, select therapy programs 134, generate new therapy programs 134 by manipulating a computer model 132 or estimated heat therapy regions 230 presented on a GUI on user interface 126, and communicate the selected therapy programs 134 to the generator 30.

Programmer 34 may include a power source for delivering operating power to the components of programmer 34. The power source may include at least one battery and a power generation circuit to produce the operating power. In some examples, the battery may be rechargeable to allow extended operation. Recharging may be accomplished through proximal inductive interaction, or electrical contact with circuitry of a base or recharging station. In other examples, primary batteries (e.g., nickel cadmium or lithium ion batteries) may be used. In addition, programmer 34 may be directly coupled to an alternating current source, such would be the case with some computing devices, such as personal computers. The power source may include circuitry to monitor power remaining within a battery. In this manner, user interface 126 may provide a current battery level indicator or low battery level indicator when the battery needs to be replaced or recharged. In some cases, the power source may be capable of estimating the remaining time of operation using the current battery.

In some examples, programmer 34 may be communicatively coupled to medical imaging system 146, or may otherwise receive one or more medical images of a patient from medical imaging system 146. Medical imaging system 146 may be configured to generate a medical image of a region of a patient that includes a target vessel (e.g., intended to be modified). One or more medical images generated by medical imaging system 146 may be stored by programmer 34 in memory 128, or otherwise used by control circuitry 125, to generate patient anatomy digital reconstruction 130. The medical image can be any medical image that provides sufficient resolution for identifying the tissue regions to avoid (for example, particular muscles, lymph nodes, other blood vessels veins/arteries, or other anatomical features or tissue).

In some cases, memory 128 of programmer 34 or another device (e.g., a remote device) may store a plurality of medical images of a patient, which can be, for example, a plurality of medical images of the same or nearly the same region of the patient. In some cases, if there has been a relatively large gap of time between heat therapy sessions (e.g., on the order of weeks, months, or even years), a clinician may elect to use medical imaging system 146 to generate one or more updated medical images of the patient or otherwise obtain updated medical images of the patient, and update the one or more therapy programs used by generator 30 based on the one or more updated medical images. In some examples, the plurality of medical images may include any suitable available medical images of the patient region, for example, images obtained of the patient region obtained for a therapy other than heat therapy. There may be changes to a particular patient's anatomy and/or tissue characteristics over time, such as due to weight gain, weight loss, or the like.

In some examples, medical imaging system 146 includes at least one of a fluoroscopy system, a computer aided tomography (CAT) scan system, a magnetic resonance imaging (MRI) system, a positron emission tomography (PET) scan system, an electrical impedance tomography (EIT) system, an ultrasound system, or an optical imaging system. In some examples, control circuitry 125 is configured to develop computer model 132 based on patient anatomy digital reconstruction 130. In some examples, computer model 132 includes a finite element model. In some examples, digital reconstruction 130 includes a three-dimensional (3D) reconstruction. Control circuitry 125 may use one or both of digital reconstruction 130 or computer model 132 to determine an estimated volume of influence of heat therapy, such as based on an anticipated heating load for achieving a temperature of smooth muscle cells within a particular therapy range, and determine one or more therapy programs 134 based on the estimated volume of influence, such as therapy programs 134 that include parameters related to achieving a target temperature at a surface of heat therapy assembly 14, a target temperature at an inner surface of the vessel (e.g., based on data from sensors 142B), and/or a target amount of time for which heat therapy is applied to the vessel. Control circuitry 125 may further also be used to deliver and monitor delivery of heat therapy by generator 30 based on therapy programs 134, as described with reference to FIGS. 7A-7C below.

Figure 10A:
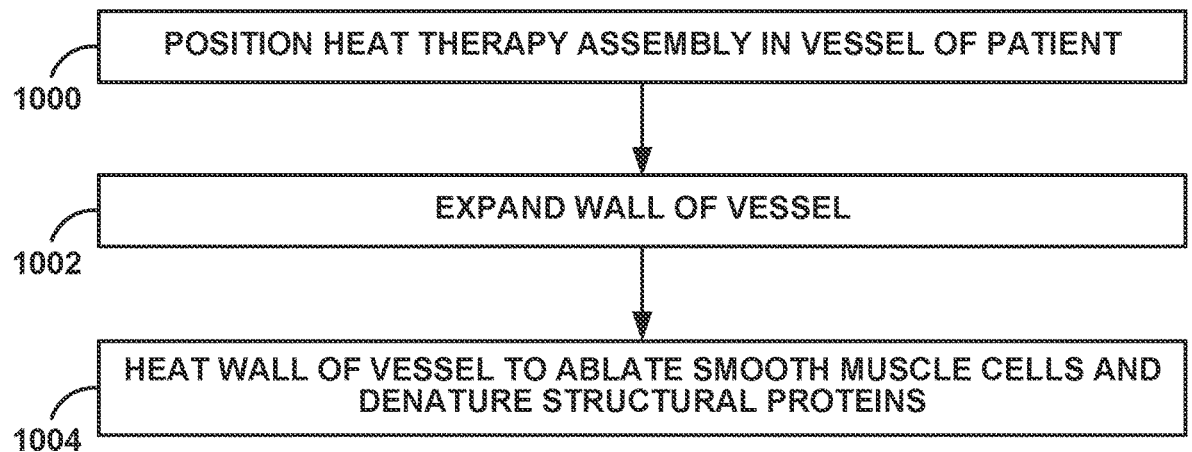
FIG. 10A is a flow diagram of an example method of applying heat therapy to a wall of a constricted vessel, in accordance with some examples of the present disclosure.

FIG. 10A is a flow diagram of an example method for applying a heat therapy to a wall of a vessel, in accordance with some examples of the present disclosure. FIG. 10A will be described with respect to system 10 of FIG. 1 and artery 200 of FIGS. 2A-2E, but applies to other examples systems, devices, and target hollow anatomical structures of a patient. The method of FIG. 10A includes positioning heat therapy assembly 14 in a vessel of a patient (1000). For example, a clinician may manipulate hub 18 or other handle and advance a distal end of intravascular medical device 12 to a target treatment site of a wall of the vessel of the patient, such that heat therapy assembly 14 is positioned proximate the target treatment site. With the aid a medical imaging system 146, the clinician may confirm a position of heat therapy assembly 14 in the vessel. As described in FIG. 2A, a wall of the vessel includes smooth muscle cells and one or more structural proteins, such as elastin and collagen.

The method of FIG. 10A includes expanding the wall of the vessel with one or more surfaces of heat therapy assembly 14 (1002). As described in FIGS. 3A-3B and 4A-4E, heat therapy assembly 14 may include an expansion device configured to expand such that one or more surfaces of heat therapy assembly 14 contact the wall of the vessel at the target treatment site and expand the expansion device beyond an initial diameter of the vessel. For example, the clinician may operate hub 18 or heat therapy source 37 to deliver a pressurized fluid to the expansion device (e.g., a balloon) to radially expand the expansion device, operate an actuation mechanism to radially expand the expansion device, or the like. In some examples, heat therapy assembly 14 may expand to a target diameter such that, after delivery of heat therapy and healing of the vessel, the vessel may have a predetermined diameter.

The method of FIG. 10A includes heating the wall of the vessel to ablate the smooth muscle cells and substantially denature the one or more structural proteins (1004). To heat the wall of the vessel, control circuitry 35 of therapy generator 30 may be configured to control a heating load delivered to heat therapy assembly 14. For example, control circuitry 35 may receive various parameters, such as input by the clinician via secondary input 36, associated with an amount of heat therapy to be delivered to the target treatment site. To ablate the smooth muscle cells and substantially denature the one or more structural proteins, energy is delivered to the wall of the vessel to achieve and/or maintain a temperature of the smooth muscle cells associated with ablation of the smooth muscle cells and a temperature of the one or more structural proteins associated with denaturation of the structural proteins. For example, the temperature of the smooth muscle cells may be maintained within a target temperature range for a target therapy time range that corresponds to the heating load. The target therapy time range can be, for example, stored in a memory of generator 30 or another device, such as a programmer 34 (FIG. 9). In some examples, the target temperature range is defined by a lower temperature threshold value associated with death of the smooth muscle cells and denaturation of collagen, and an upper temperature threshold value associated with boiling of plasma in the tissues of the vessel. In some examples, the upper temperature threshold value is less than about 100° C., while the lower temperature threshold value is greater than about 60° C., such as between about 65° C. and about 90° C.

Figure 10B:
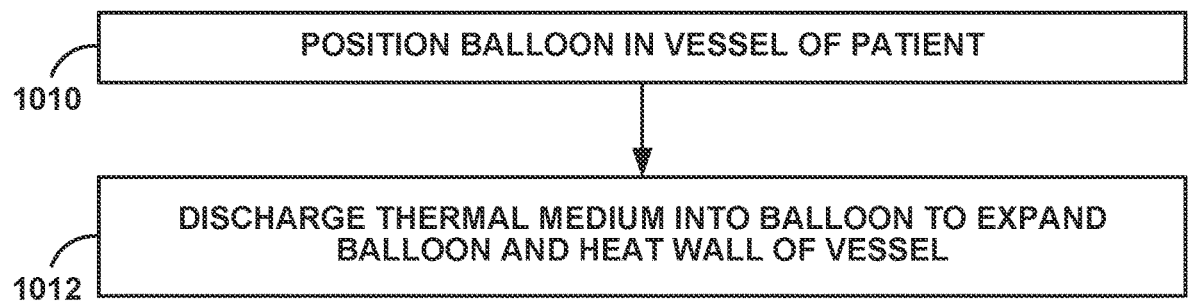
FIG. 10B is a flow diagram of an example method of applying heat therapy to a wall of a vessel using a thermal medium within a balloon, in accordance with some examples of the present disclosure.

In some examples, a heat therapy assembly includes a balloon including a cavity configured to contain a thermal medium, in which delivering heat to the wall of the vessel includes transmitting the heat from the thermal medium to the wall of the vessel. FIG. 10B is a flow diagram of an example method for applying a heat therapy to a wall of a vessel using a thermal medium within a balloon, in accordance with some examples of the present disclosure. The method of FIG. 10B will be described with respect to FIGS. 3A-3B and 8A-8B, but can be used with other devices and systems described herein. The method of FIG. 10B include positioning a balloon, such as balloon 810 or 830 of FIGS. 8A-8B, in a respective vessel 812 or 832 of a patient, such as described in step 1000 of FIG. 10A above (1010). The method of FIG. 10B includes discharging a thermal medium into a cavity of balloons 810 or 830 to expand the respective balloon and deliver thermal energy from the thermal medium to the wall of a vessel 812 or 832, or 552 (1012). For example, a clinician may interact with user interface 126 of programmer 34 or of therapy generator 30 or another device, and cause the fluid source 802 or 822 to deliver the thermal medium to the cavity of the respective balloon.

In examples in which the thermal medium includes a heating fluid, such as described in FIG. 8A, to expand balloon 810 and deliver heat to the wall of vessel 812, the method includes controlling, by control circuitry 35, a heating load delivered by the heating fluid. For example, control circuitry of heating fluid source 802 (an example of therapy generator 30) may control a heating load delivered to balloon 810, such as based on parameters received by the clinician or determined by generator 30 or programmer 34 of FIG. 1 or 9. In some examples, to control the heating load of the heating fluid, the method may include controlling, by control circuitry, at least one of a flow rate of the heating fluid to balloon 810 or a temperature of the heating fluid. For example, control circuitry of heating fluid source 802 may control a flow rate of the heating fluid to balloon 810 or a temperature of the heating fluid delivered to balloon 810, such that smooth muscle cells at the target treatment site of vessel 812 may be substantially ablated and structural proteins may be substantially denatured.

In examples in which the thermal medium includes a reactant and/or product of an exothermic chemical reaction, to deliver heat to the wall of the vessel, the method includes controlling a heating load of the exothermic chemical reaction. For example, reactant fluid source 822 (an example of therapy generator 30) may control a heating load delivered to balloon 830, such as based on parameters received by the clinician or determined by generator 30 or programmer 34 of FIG. 1 or 9. In some examples, to control the heating load of the exothermic chemical reaction, the method includes controlling, by control circuitry, a flow rate of at least one reactant of the exothermic chemical reaction to the cavity to control a rate of reaction of the exothermic chemical reaction and, correspondingly, a rate of heat transfer to balloon 830. For example, control circuitry of reactant fluid source 822 may control a flow rate of a reactant fluid to react with another reactant, such as a reactant delivered by reactant fluid source 822 or present in balloon 830, thereby producing a gaseous product to expand balloon 550 and transfer heat to balloon 830 as the reaction progresses.

Figure 10C:
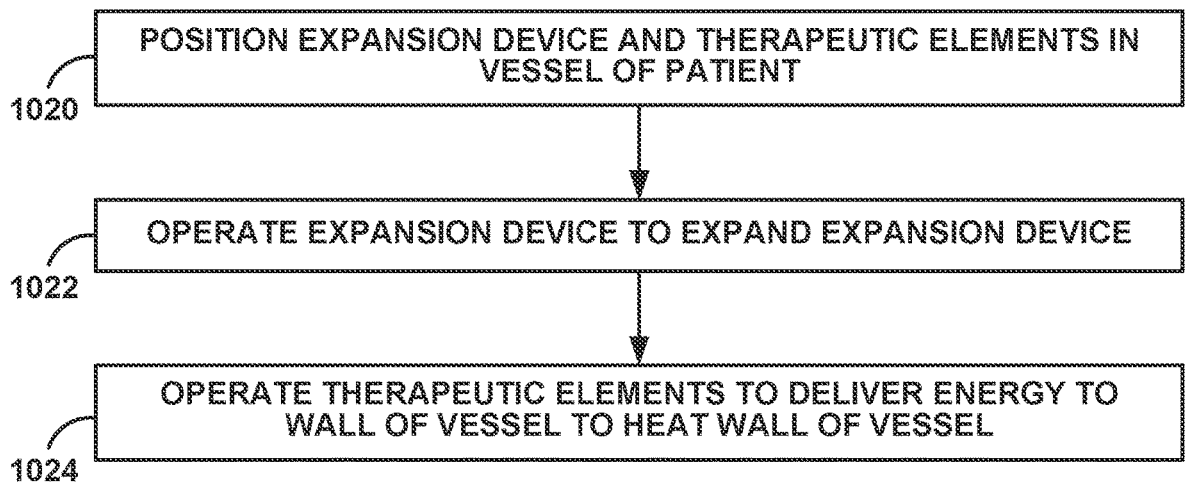
FIG. 10C is a flow diagram of an example method of applying heat therapy to a wall of a vessel using a plurality of therapeutic elements on or within an expansion device, in accordance with some examples of the present disclosure.

In some examples, a heat therapy assembly includes an expansion device and a plurality of therapeutic elements, in which heating the wall of the vessel includes delivering energy from the plurality of therapeutic elements to the wall of the vessel. FIG. 10C is a flow diagram of an example method for applying a heat therapy to a wall of a vessel using a plurality of therapeutic elements on an expansion device, in accordance with some examples of the present disclosure. The method of FIG. 10C will be described with respect to FIGS. 4A-4E and 8C-8D, but can be used with other devices and systems described herein. The method of FIG. 10C include positioning a heat therapy assembly that includes an expansion device and a plurality of therapeutic elements, such as balloon 850 or 870 and therapeutic elements 848 or 868, in vessel 852 or 872 of a patient, such as described in step 1000 of FIG. 10A above (1020).

To expand the wall of vessel 852 or 872, the method includes operating the expansion device to expand the expansion device and radially extend one or more surfaces of the expansion device to contact the wall of vessel 852 or 872 (1022). In examples in which the expansion device includes balloon 850 or 870 configured to transform from a deflated delivery configuration to an inflated deployed configuration, such as illustrated in FIGS. 4A and 4D, operating the expansion device may include inflating the balloon, such as balloon 404 or balloon 464. In examples in which the expansion device includes a spiral expansion device configured to transform from an elongated delivery configuration to a spiral deployed configuration, such as illustrated in FIG. 4B, operating the expansion device may include actuating spiral expansion device 424 to coil spiral expansion device 424. In examples in which the expansion device includes a mesh or basket expansion device configured to transform from a collapsed delivery configuration to an expanded delivery configuration, such as illustrated in FIG. 4C, operating the expansion device may include actuating the mesh expansion device 444 to expand mesh expansion device 444 or permit mesh expansion device 44 to self-expand.

The method of FIG. 10C includes operating the plurality of therapeutic elements 848 or 868 to deliver energy to the wall of vessel 852 or 872 to heat the wall of vessel 852 or 872 (1024). In some examples, such as illustrated in FIG. 8C, the plurality of therapeutic elements 848 may be operated to deliver thermal energy to the wall of vessel 852. In examples in which the plurality of therapeutic elements 848 includes a plurality of thermoelectric elements, the method includes controlling, by control circuitry, the applied voltage to the plurality of thermoelectric elements. For example, control circuitry of electric source 842 (an example of therapy generator 30) may control a heating load delivered to the thermoelectric elements, such as based on parameters received by the clinician or determined by generator 30 or programmer 34 of FIG. 1 or 9. In some examples, to control the heating load of the plurality of thermoelectric elements, the method may include controlling, by control circuitry (e.g., control circuitry 35), an applied voltage delivered to the plurality of thermoelectric elements to change a temperature of the plurality of thermoelectric elements. For example, control circuitry of electric source 842 may control a voltage of an electrical current delivered to the plurality of thermoelectric elements, such that smooth muscle cells at the target treatment site of vessel 852 may be substantially ablated and structural proteins at the target treatment site of vessel 852 may be substantially denatured.

In some examples, such as illustrated in FIG. 8D, the plurality of therapeutic elements 868 may be operated to deliver energy to the wall of vessel 872 to generate heat in tissues of vessel 872. For example, electric source 862 may control an electrical current delivered to the plurality of therapeutic elements 868 to deliver energy to tissues of vessel 872 having particular properties (e.g., voltage, frequency, amplitude, duty cycle, and the like), such that smooth muscle cells at the target treatment site of vessel 872 may be substantially ablated and structural proteins at the target treatment site of vessel 872 may be substantially denatured.

In examples in which the plurality of therapeutic elements 868 includes a plurality of radiofrequency electrodes, the method includes controlling, by control circuitry, the electrical current to the plurality of thermoelectric elements, such as by controlling an amplitude or frequency of the electrical current. For example, control circuitry of electric source 862 (an example of therapy generator 30) may control a heating load delivered to the radiofrequency electrodes, such as based on parameters received by the clinician or determined by generator 30 or programmer 34 of FIG. 1 or 9. In some examples, to control the heating load of the plurality of radiofrequency electrodes, the method includes controlling, by the control circuitry, an amplitude and frequency delivered to the plurality of radiofrequency electrodes to change the electrical current delivered from the radiofrequency electrodes.

In examples in which the plurality of therapeutic elements 868 includes a plurality of microwave antennae, the method includes controlling, by control circuitry, the electrical current to the plurality of microwave antennae, such as by controlling an amplitude or frequency of the electrical current. For example, control circuitry of electric source 862 (an example of therapy generator 30) may control a heating load delivered by the microwave antennae, such as based on parameters received by the clinician or determined by generator 30 or programmer 34 of FIG. 1 or 9. In some examples, to control the heating load of the plurality of microwave antennae, the method includes controlling, by the control circuitry, an amplitude and frequency delivered to the plurality of microwave antennae to change the electromagnetic energy delivered from the microwave antennae.

In examples in which the plurality of therapeutic elements 868 includes a plurality of optical elements, the method includes controlling, by control circuitry, the electrical current to the plurality of optical elements, such as by controlling an amplitude or frequency of the electrical current. For example, control circuitry of electric source 862 (an example of therapy generator 30) may control a heating load delivered by the optical elements, such as based on parameters received by the clinician or determined by generator 30 or programmer 34 of FIG. 1 or 9. In some examples, to control the heating load of the plurality of optical elements, the method includes controlling, by the control circuitry, an amplitude and frequency delivered to the plurality of optical elements to change the radiative energy delivered from the optical elements.

In examples in which the plurality of therapeutic elements 868 includes a plurality of ultrasound transducers, the method includes controlling, by control circuitry, the electrical current to the plurality of ultrasound transducers, such as by controlling an amplitude or frequency of the electrical current. For example, control circuitry of electric source 862 (an example of therapy generator 30) may control a heating load delivered by the ultrasound transducers, such as based on parameters received by the clinician or determined by generator 30 or programmer 34 of FIG. 1 or 9. In some examples, to control the heating load of the plurality of ultrasound transducers, the method includes controlling, by control circuitry, an amplitude and frequency delivered to the plurality of ultrasound transducers to change the sound waves delivered from the ultrasound transducers.

Figure 10D:
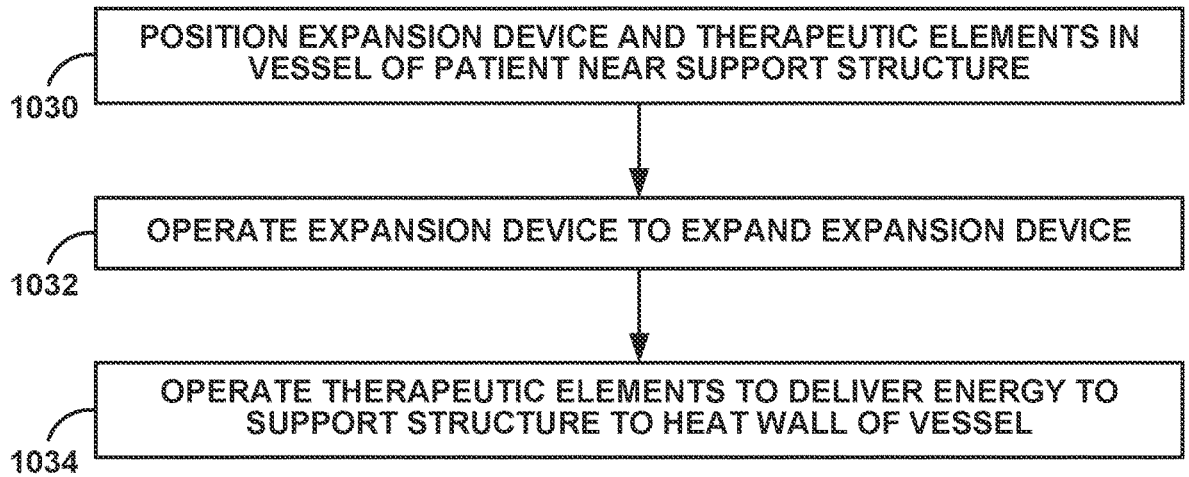
FIG. 10D is a flow diagram of an example method of applying heat therapy to a wall of a vessel using a plurality of therapeutic elements on or within an expansion device and a stent contacting the wall of the vessel, in accordance with some examples of the present disclosure.

In some examples, a heat therapy assembly includes an expansion device and a plurality of therapeutic elements, in which heating the wall of the vessel includes delivering energy from the plurality of therapeutic elements to a structure positioned in the wall of the vessel. FIG. 10D is a flow diagram of an example method for applying a heat therapy to a wall of a vessel using a plurality of therapeutic elements on an expansion device, in accordance with some examples of the present disclosure. The method of FIG. 10D will be described with respect to FIG. 8E, but can be used with other devices and systems described herein. The method of FIG. 10D include positioning a heat therapy assembly that includes an expansion device and a plurality of therapeutic elements, such as balloon 890 and therapeutic elements 888, in vessel 892 of a patient, such as described in step 1020 of FIG. 10C above (1030). The method includes operating the expansion device to expand the expansion device and radially extend one or more surfaces of the expansion device to contact the wall of vessel 892, such as described in step 1022 of FIG. 10C above (1032).

The method of FIG. 10C includes operating the plurality of therapeutic elements 888 deliver energy to a structure, such as stent 894, to heat the wall of vessel 892 (1034). For example, under the control of control circuitry 35, the plurality of therapeutic elements 888 may be operated to deliver electrical energy to stent 894. In examples in which the plurality of therapeutic elements 888 includes a plurality of electrical contacts, the method includes electrically connecting the plurality of electrical contacts to stent 894. For example, the plurality of electrical contacts may be extended from elongated member 884 to electrical connect to one or more portions of stent 894, such that stent 894 may receive electrical current from the plurality of electrical contacts. The method includes controlling, by control circuitry, the electrical current to the plurality of electrical contacts. For example, control circuitry of electric source 882 (an example of therapy generator 30) may control an electrical current that is received by stent 894 via the plurality of electrical contacts to control a heating load delivered by stent 894, such as based on parameters received by the clinician or determined by generator 30 or programmer 34 of FIG. 1 or 9. In some examples, to control the heating load delivered by stent 894, the method may include controlling an amplitude and frequency of the electrical current delivered to the plurality of electrical contacts to change various properties of electromagnetic energy delivered by stent 894. For example, electric source 882 may control microwave energy delivered by stent 894, such that smooth muscle cells at the target treatment site of vessel 892 may be substantially ablated and structural proteins at the target treatment site of vessel 892 may be substantially denatured.

Figure 11:
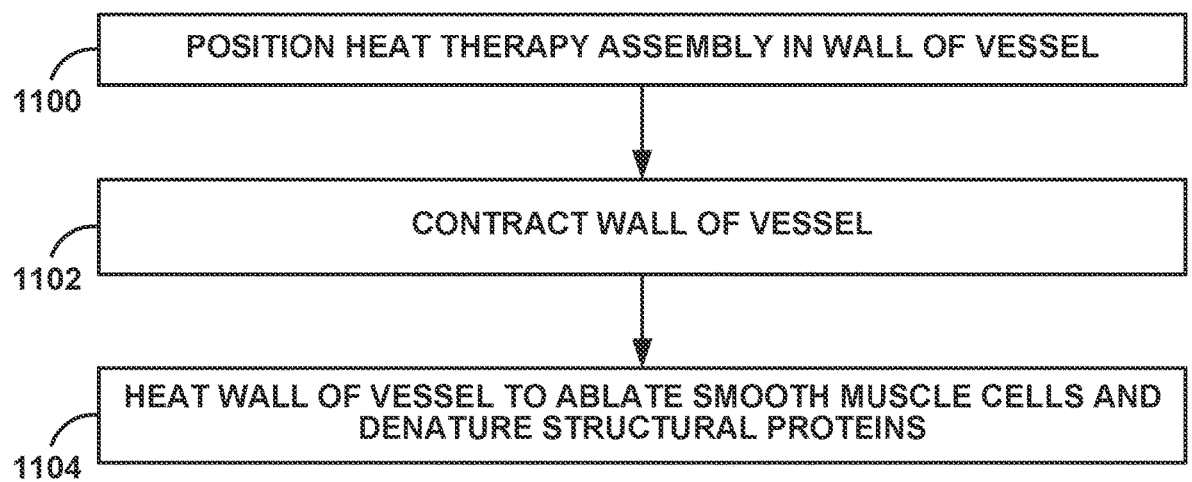
FIG. 11 is a flow diagram of an example method of applying heat therapy to a wall of an enlarged vessel, in accordance with some examples of the present disclosure.

FIG. 11 is a flow diagram of an example method for applying a heat therapy to a wall of an enlarged vessel, in accordance with some examples of the present disclosure. FIG. 11 will be described with respect to system 10 of FIG. 1 and artery 600 of FIGS. 6A-6E, but applies to other examples systems, devices, and target hollow anatomical structures of a patient. The method of FIG. 11 includes positioning heat therapy assembly 14 in a vessel of a patient (1100). For example, a clinician may manipulate hub 18 or other handle and advance a distal end of intravascular medical device 12 to a target treatment site of a wall of the vessel of the patient, such that heat therapy assembly 14 is positioned proximate the target treatment site. With the aid a medical imaging device, the clinician may confirm a position of heat therapy assembly 14 in the vessel. As described in FIG. 6A, a wall of the vessel includes smooth muscle cells and one or more structural proteins, such as elastin and collagen.

The method of FIG. 11 includes contracting the wall of the vessel (1002). As described in FIGS. 7A-7D, heat therapy assembly 14 may include a contraction assembly configured to contract the vessel to a reduced diameter of the vessel such that one or more surfaces of heat therapy assembly 14 may be positioned to deliver energy to the target treatment site, such as by contacting the wall of the vessel at the target treatment site or being positioned sufficiently close to the wall of the vessel to deliver the energy to the wall of the vessel at the target treatment site. For example, the clinician may operate hub 18 or heat therapy source 37 to operate an actuation mechanism to seal a constriction volume of the vessel adjacent to the treatment site. In the example of FIGS. 7A-7D, operating the contraction assembly includes inflating proximal balloon 706A to seal a proximal end of constriction volume 718 and inflating distal balloon 706B to seal a distal end of constriction volume 718.

In some examples, contracting the wall of the vessel includes creating a vacuum in the constriction volume. For example, the clinician may operate hub 18 or heat therapy source 37 to operate an actuation mechanism to remove a fluid from constriction volume 718 through one or more openings to create the vacuum, such as by operating a vacuum source fluidically coupled to constriction volume 718 or modulating one or more valves coupled to a vacuum source. In the example of FIGS. 7A-7D, creating a vacuum includes inflating balloon 704 to fill a volume prior to creating constriction volume 718 and deflating balloon 704 after creating constriction volume 718. In some examples, heat therapy assembly 14 may expand to a target diameter such that, after constriction of the vessel onto heat therapy assembly 14, the vessel may have a predetermined diameter. This predetermined diameter may correspond to a desired diameter for maintaining the enlarged vessel.

The method of FIG. 10A includes heating the wall of the vessel to ablate the smooth muscle cells and denature one or more structural proteins (1104). To heat the wall of the vessel, control circuitry 35 of therapy generator 30 may be configured to control a heating load delivered to heat therapy assembly 14. For example, therapy generator 30 may receive various parameters, such as input by the clinician via secondary input 36, associated with an amount of heat therapy to be delivered to the target treatment site. To ablate the smooth muscle cells and substantially denature the one or more structural proteins, energy is delivered to the wall of the vessel to achieve and/or maintain a temperature of the smooth muscle cells associated with ablation of the smooth muscle cells and a temperature of the one or more structural proteins associated with denaturation of the structural proteins. For example, the temperature of the smooth muscle cells may be maintained within a target temperature range for a target therapy time range that corresponds to the heating load. The target therapy time range can be, for example, stored in a memory of generator 30 or another device, such as a programmer 34 (FIG. 9). In some examples, the target temperature range is defined by a lower temperature threshold value associated with death of the smooth muscle cells and denaturation of collagen, and an upper temperature threshold value associated with boiling of plasma in the tissues of the vessel. In some examples, the upper temperature threshold value is less than about 100° C., while the lower temperature threshold value is greater than about 60° C., such as between about 65° C. and about 90° C.

Figure 12A:
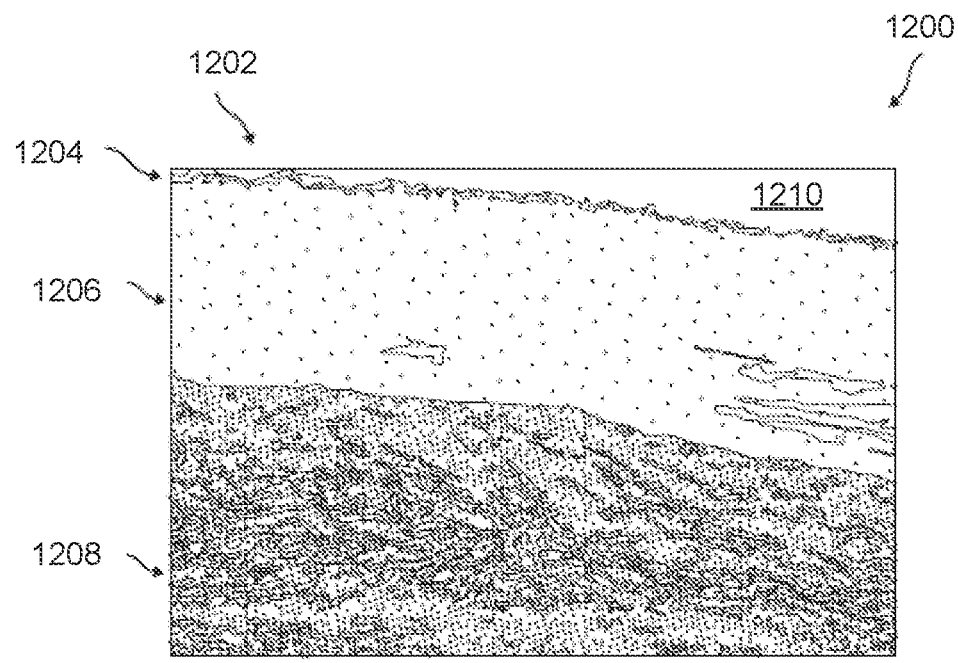
FIG. 12A is a micrograph of a cross-sectional view of a wall of an artery prior to heat therapy.
Figure 12B:
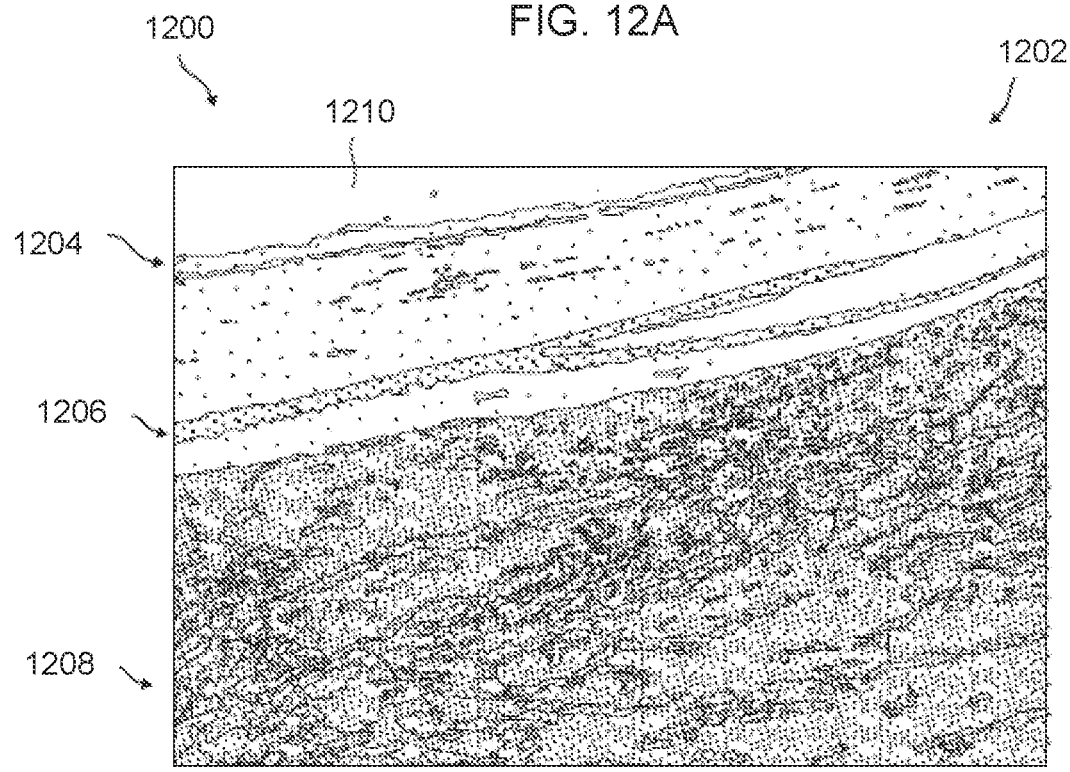
FIG. 12B is a micrograph of a cross-sectional view of the wall of the artery of FIG. 9A after heat therapy, in accordance with some examples of the present disclosure.

Heat therapy systems described herein may be used to modify the wall of a constricted or enlarged vessel in a patient. FIG. 12A is a micrograph of a cross-sectional view of a wall of an artery prior to heat therapy. Wall 1202 defines a lumen 1210, and includes a tunica intima 1204, a tunica media 1206, and a tunica adventitia 1208. Prior to heat therapy, tunica media 1206 includes both smooth muscle cells (e.g., oval structures) and structural proteins (e.g., wavy structures). FIG. 12B is a micrograph of a cross-sectional view of the wall of the artery of FIG. 12A after heat therapy using radiofrequency energy, in accordance with some examples of the present disclosure. As seen in FIG. 12B, tunica media 1206 includes smooth muscle cells and structural proteins that are homogeneous with distinct thermal damage. Structural proteins in tunica media 1208 appear flat, indicating that vessel wall 1202 has lost plasticity and elasticity. Collagen fibers in tunica adventitia 1208 appear swollen and homogeneous with distinct thermal damage, indicating that tunica adventitia 1208 has lost plasticity and elasticity.

The techniques described in this disclosure, including those attributed to therapy generator 30, programmer 34, heat therapy source 37, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry. The term "processor," "processing circuitry," "controller," or "control circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed to support one or more aspects of the functionality described in this disclosure.

The above detailed descriptions of examples of the technology are not intended to be exhaustive or to limit the technology to the precise form disclosed above. Although specific examples of the technology are described above for illustrative purposes, various equivalent modifications are possible within the scope of the technology, as those skilled in the relevant art will recognize. For example, while steps are presented in a given order, alternative examples may perform steps in a different order. The various examples described herein may also be combined to provide further examples. All references cited herein are incorporated by reference as if fully set forth herein.

From the foregoing, it will be appreciated that specific examples of the present disclosure have been described herein for purposes of illustration, but that various modifications may be made without deviating from the present disclosure. For example, while particular features of the intravascular medical device were described as being part of a single device, in other examples, these features can be included on one or more separate devices that can be positioned adjacent to and/or used in tandem with the intravascular medical device to perform similar functions to those described herein.

Certain aspects of the present disclosure described in the context of particular examples may be combined or eliminated in other examples. Further, while advantages associated with certain examples have been described in the context of those examples, other examples may also exhibit such advantages, and not all examples need necessarily exhibit such advantages to fall within the scope of the present disclosure. Accordingly, the present disclosure and associated technology can encompass other examples not expressly shown or described herein.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "about" or "approximately," when preceding a value, should be interpreted to mean plus or minus 10% of the value, unless otherwise indicated. Additionally, the term "comprising" is used throughout to mean including at least the recited feature(s) such that any greater number of the same feature and/or additional types of other features are not precluded.

The scope of the present disclosure includes the following non-limiting examples.

Example 1: A system includes an intravascular medical device includes a heat therapy assembly configured to: contract a wall of a vessel; and deliver energy to the wall of the contracted vessel to heat the wall of the vessel; an elongated member coupled to the heat therapy assembly; and a therapeutic medical device communicatively coupled to the heat therapy assembly and configured to control the heat therapy assembly to deliver the energy to: ablate smooth muscle cells of the wall of the vessel; and substantially denature one or more structural proteins of the wall of the vessel.

Example 2: The system of example 1, wherein the one or more structural proteins comprise elastin and collagen.

Example 3: The system of any of examples 1 and 2, wherein after substantial denaturation, the one or more structural proteins cross-link to form a scaffold.

Example 4: The system of any of examples 1 through 3, wherein, to ablate the smooth muscle cells and substantially denature the one or more structural proteins, the therapeutic medical device is configured to control the heat therapy assembly to maintain a temperature of the smooth muscle cells within a target temperature range.

Example 5: The system of example 4, wherein the target temperature range is defined by a lower temperature threshold value associated with death of the smooth muscle cells and denaturation of the one or more structural proteins.

Example 6: The system of example 5, wherein the lower temperature threshold value is greater than about 60° C.

Example 7: The system of any of examples 5 and 6, wherein the target temperature range is defined by an upper temperature threshold value associated with bubble formation of one or more fluids in the wall of the vessel.

Example 8: The system of example 7, wherein the upper temperature threshold is less than about 100° C.

Example 9: The system of any of examples 1 through 8, wherein the heat therapy assembly comprises a contraction assembly configured to isolate a constriction volume of the vessel adjacent to a treatment site.

Example 10: The system of example 9, wherein the contraction assembly comprises: a proximal balloon configured to inflate to seal a proximal end of the constriction volume; and a distal balloon configured to inflate to seal a distal end of the constriction volume.

Example 11: The system of any of examples 9 and 10, wherein the heat therapy assembly is configured to create a vacuum in the constriction volume.

Example 12: The system of example 11, wherein the heat therapy assembly includes one or more openings configured to remove a fluid from the constriction volume to create the vacuum.

Example 13: The system of any of examples 11 and 12, wherein the heat therapy assembly comprises a vacuum balloon configured to deflate in the constriction volume to create the vacuum.

Example 14: The system of example 13, wherein the vacuum balloon is configured to deliver the energy to the wall of the vessel.

Example 15: The system of any of examples 1 through 14, wherein the heat therapy assembly comprises a balloon comprising a cavity configured to contain a thermal medium, the balloon defining one or more surfaces configured to contact the wall of the vessel, and wherein the one or more surfaces are configured to deliver the energy from the thermal medium to the wall of the vessel.

Example 16: The system of example 15, wherein the thermal medium comprises a heating fluid, and wherein the therapeutic medical device is configured to control a heating load of the heating fluid.

Example 17: The system of any of examples 15 and 16, wherein the thermal medium comprises a product of an exothermic chemical reaction, and wherein the therapeutic medical device is configured to control a heating load of the exothermic chemical reaction.

Example 18: The system of any of examples 1 through 17, wherein the heat therapy assembly comprises one or more therapeutic elements configured to deliver the energy to the wall of the vessel.

Example 19: The system of example 18, wherein the one or more therapeutic elements include one or more surfaces configured to contact the wall of the vessel, and wherein the one or more therapeutic elements are configured to deliver thermal energy to the wall of the vessel to heat the wall of the vessel.

Example 20: The system of any of examples 18 and 19, wherein the one or more therapeutic elements comprise at least one thermoelectric element, and wherein the therapeutic medical device is configured to control an electrical current to at least one thermoelectric element.

Example 21: The system of example 20, wherein at least one thermoelectric element comprises a plurality of Peltier devices.

Example 22: The system of any of examples 20 and 21, wherein the heat therapy assembly comprises one or more channels configured to transport a heating fluid to heat the plurality of thermoelectric elements.

Example 23: The system of any of examples 18 through 22, wherein the one or more therapeutic elements include one or more surfaces configured to contact the wall of the vessel, and wherein the one or more therapeutic elements are configured to deliver electrical energy to the wall of the vessel to generate heat in the wall of the vessel.

Example 24: The system of any of examples 18 through 23, wherein the one or more therapeutic elements comprise at least one electrode configured to deliver the energy to the wall of the vessel, and wherein the therapeutic medical device is configured to control an electrical current to at least one electrode.

Example 25: The system of any of examples 18 through 24, wherein the one or more therapeutic elements are configured to deliver radiant energy to the wall of the vessel to generate heat in the wall of the vessel.

Example 26: The system of any of examples 18 through 25, wherein the one or more therapeutic elements comprise at least one antenna configured to deliver the energy to the wall of the vessel, and wherein the therapeutic medical device is configured to control an electrical current to at least one antenna.

Example 27: The system of any of examples 18 through 26, wherein the one or more therapeutic elements comprise at least one optical element configured to deliver the energy to the wall of the vessel, and wherein the therapeutic medical device is configured to control an electrical current to at least one optical element.

Example 28: The system of any of examples 18 through 27, wherein the one or more therapeutic elements are configured to deliver mechanical energy to the wall of the vessel to generate heat in the wall of the vessel.

Example 29: The system of any of examples 18 through 28, wherein the one or more therapeutic elements comprise at least one transducer configured to deliver the energy to the wall of the vessel, and wherein the therapeutic medical device is configured to control an electrical current to at least one transducer.

Example 30: The system of any of examples 1 through 29, wherein the heat therapy assembly comprises one or more therapeutic elements configured to deliver energy to a fluid in the vessel to heat the fluid in the vessel.

Example 31: The system of example 30, wherein the one or more therapeutic elements include one or more surfaces configured to contact the fluid in the vessel, and wherein the one or more therapeutic elements are configured to deliver thermal energy to the fluid in the vessel to heat the wall of the vessel.

Example 32: The system of any of examples 30 and 31, wherein the one or more therapeutic elements comprise at least one resistive element, and wherein the therapeutic medical device is configured to control an electrical current to at least one resistive element.

Example 33: The system of any of examples 18 through 32, wherein the one or more therapeutic elements are configured to heat the wall of the vessel without contacting the wall of the vessel.

Example 34: The system of any of examples 1 through 33, wherein the intravascular medical device further comprises one or more needles configured to inject a chemical agent into the wall of the vessel to denature the one or more structural proteins.

Example 35: The system of any of examples 18 through 34, wherein the heat therapy assembly comprises an expansion device, and wherein the expansion device is configured to radially expand to expand the wall of the vessel.

Example 36: The system of example 35, wherein the therapeutic medical device is configured to control the expansion device to expand the wall of the vessel to a particular diameter.

Example 37: The system of any of examples 35 and 36, wherein the expansion device is configured to radially extend the plurality of therapeutic elements to contact the wall of the vessel.

Example 38: The system of any of examples 35 through 37, wherein the expansion device comprises a balloon configured to transform from a deflated delivery configuration to an inflated deployed configuration.

Example 39: The system of any of examples 35 through 38, wherein the expansion device comprises a spiral expansion device configured to transform from an elongated delivery configuration to a spiral deployed configuration.

Example 40: The system of any of examples 35 through 39, wherein the expansion device comprises a net expansion device configured to transform from a collapsed delivery configuration to an expanded delivery configuration.

Example 41: A method includes contracting a wall of a vessel, wherein the wall of the vessel includes smooth muscle cells and one or more structural proteins; and heating the wall of the contracted vessel to ablate the smooth muscle cells and substantially denature the one or more structural proteins.

Example 42: The method of example 41, wherein the one or more structural proteins comprise elastin and collagen.

Example 43: The method of any of examples 41 and 42, wherein after substantial denaturation, the one or more structural proteins cross-link to form a scaffold.

Example 44: The method of any of examples 41 through 43, wherein, to ablate the smooth muscle cells and substantially denature the one or more structural proteins, the method includes controlling a heat therapy assembly to maintain a temperature of the smooth muscle cells within a target temperature range.

Example 45: The method of example 44, wherein the target temperature range is defined by a lower temperature threshold value associated with death of the smooth muscle cells and denaturation of the one or more structural proteins.

Example 46: The method of example 45, wherein the lower temperature threshold value is greater than about 60° C.

Example 47: The method of any of examples 45 and 46, wherein the target temperature range is defined by an upper temperature threshold value associated with boiling of one or more fluids in the wall of the vessel.

Example 48: The method of example 47, wherein the upper temperature threshold is less than about 100° C.

Example 49: The method of any of examples 41 through 48, wherein the heat therapy assembly comprises a contraction assembly, and wherein contracting the wall of the vessel comprises operating the contraction assembly to seal a constriction volume of the vessel adjacent to the treatment site.

Example 50: The method of example 49, wherein the contraction assembly comprises: a proximal balloon configured to inflate to seal a proximal end of the constriction volume; and a distal balloon configured to inflate to seal a distal end of the constriction volume.

Example 51: The method of any of examples 49 and 50, wherein contracting the wall of the vessel comprises creating a vacuum in the constriction volume.

Example 52: The method of example 51, wherein the heat therapy assembly includes one or more openings configured to remove a fluid from the constriction volume to create the vacuum.

Example 53: The method of any of examples 51 and 52, wherein the heat therapy assembly comprises a vacuum balloon, and wherein creating the vacuum comprises deflating the vacuum balloon in the constriction volume.

Example 54: The method of any of examples 50 through 53, wherein delivering energy to the wall of the vessel comprises delivering energy to the wall of the vessel from one or more therapeutic elements coupled to the vacuum balloon.

Example 55: The method of any of examples 50 through 54, wherein delivering energy to the wall of the vessel comprises: contacting the wall of the vessel with the vacuum balloon; and delivering thermal energy to the wall of the vessel from the vacuum balloon.

Example 56: The method of any of examples 41 through 55, wherein the heat therapy assembly comprises a balloon comprising a cavity configured to contain a thermal medium, the balloon defining one or more surfaces configured to contact the wall of the vessel, and wherein delivering the energy to the wall of the vessel comprises delivering thermal energy from the thermal medium to the wall of the vessel.

Example 57: The method of example 56, wherein the thermal medium comprises a heating fluid, and wherein delivering the energy to the wall of the vessel comprises controlling, by control circuitry, a heating load of the heating fluid.

Example 58: The method of any of examples 56 and 57, wherein the thermal medium comprises a product of an exothermic chemical reaction, and wherein delivering the energy to the wall of the vessel comprises controlling, by control circuitry, a heating load of the exothermic chemical reaction.

Example 59: The method of any of examples 41 through 58, wherein the heat therapy assembly comprises one or more therapeutic elements configured to deliver the energy to the wall of the vessel.

Example 60: The method of example 59, wherein the one or more therapeutic elements include one or more surfaces configured to contact the wall of the vessel, and wherein delivering the energy to the wall of the vessel comprises delivering thermal energy to the wall of the vessel to heat the wall of the vessel.

Example 61: The method of any of examples 59 and 60, wherein the one or more therapeutic elements comprise at least one thermoelectric element, and wherein delivering the energy to the wall of the vessel comprises controlling, by control circuitry, an electrical current to at least one thermoelectric element.

Example 62: The method of example 61, wherein the plurality of thermoelectric elements comprise a plurality of Peltier devices.

Example 63: The method of any of examples 61 and 62, wherein the heat therapy assembly comprises one or more channels configured to transport a coolant to remove heat from the plurality of thermoelectric elements.

Example 64: The method of any of examples 59 through 63, wherein the one or more therapeutic elements include one or more surfaces configured to contact the wall of the vessel, and wherein delivering the energy to the wall of the vessel comprises delivering electrical energy to the wall of the vessel to heat the wall of the vessel.

Example 65: The method of any of examples 59 through 64, wherein the one or more therapeutic elements comprise at least one electrode configured to deliver the energy to the wall of the vessel, and wherein delivering the energy to the wall of the vessel comprises controlling, by control circuitry, an electrical current to at least one electrode.

Example 66: The method of any of examples 59 through 65, wherein delivering the energy to the wall of the vessel comprises delivering radiant energy to the wall of the vessel to generate heat in the wall of the vessel.

Example 67: The method of any of examples 59 through 66, wherein the one or more therapeutic elements comprise at least one antenna configured to deliver the energy to the wall of the vessel, and wherein delivering the energy to the wall of the vessel comprises controlling, by control circuitry, an electrical current to at least one antenna.

Example 68: The method of any of examples 59 through 67, wherein the one or more therapeutic elements comprise at least one optical element configured to deliver laser energy to the wall of the vessel, and wherein delivering the energy to the wall of the vessel comprises controlling, by control circuitry, an electrical current to at least one optical element.

Example 69: The method of any of examples 59 through 68, wherein delivering energy to the wall of the vessel comprises delivering mechanical energy to the wall of the vessel to generate heat in the wall of the vessel.

Example 70: The method of any of examples 59 through 69, wherein the one or more therapeutic elements comprise at least one transducer configured to deliver the energy to the wall of the vessel, and wherein delivering the energy to the wall of the vessel comprises controlling, by control circuitry, an electrical current to at least one transducer.

Example 71: The method of any of examples 41 through 70, wherein the heat therapy assembly comprises one or more therapeutic elements configured to deliver energy to a fluid in the vessel to heat the fluid in the vessel.

Example 72: The method of example 71, wherein the one or more therapeutic elements include one or more surfaces configured to contact the fluid in the vessel, and wherein delivering the energy to the wall of the vessel comprises delivering thermal energy to the fluid in the vessel to heat the wall of the vessel.

Example 73: The method of any of examples 71 and 72, wherein the one or more therapeutic elements comprise at least one resistive element, and wherein delivering the energy to the wall of the vessel comprises controlling, by control circuitry, an electrical current to at least one resistive element.

Example 74: The method of any of examples 41 through 73, wherein the one or more therapeutic elements heat the wall of the vessel without contacting the wall of the vessel.

Example 75: The method of any of examples 41 through 74, wherein the intravascular medical device further comprises one or more needles configured to inject a chemical agent into the wall of the vessel to denature the one or more structural proteins.

Example 76: The method of any of examples 59 through 75, wherein the heat therapy assembly comprises an expansion device, and wherein expanding the wall of the vessel comprises radially expanding the expansion device.

Example 77: The method of example 76, wherein expanding the wall of the vessel comprises expanding the wall of the vessel to a predetermined diameter.

Example 78: The method of examples 76, wherein the expansion device is configured to radially extend the one or more therapeutic elements to contact the wall of the vessel.

Example 79: The method of any of examples 76 through 78, wherein the expansion device comprises a balloon configured to transform from a deflated delivery configuration to an inflated deployed configuration.

Example 80: The method of any of examples 76 through 79, wherein the expansion device comprises a spiral expansion device configured to transform from an elongated delivery configuration to a spiral deployed configuration.

Example 81: The method of any of examples 76 through 80, wherein the expansion device comprises a net expansion device configured to transform from a collapsed delivery configuration to an expanded delivery configuration.

Various examples of the disclosure have been described. Any combination of the described systems, operations, or functions is contemplated. These and other examples are within the scope of the following claims.

What is claimed is:

1. A system, comprising:
an intravascular medical device comprising:
a heat therapy assembly configured to:
contract a wall of a vessel adjacent to a treatment site to a reduced diameter; and
deliver energy to the wall of the contracted vessel to heat the wall of the vessel; and
an elongated member coupled to the heat therapy assembly; and
a therapeutic medical device communicatively coupled to the heat therapy assembly and configured to control the heat therapy assembly to deliver the energy to:
ablate smooth muscle cells of the wall of the vessel; and
substantially denature one or more structural proteins of the wall of the vessel,
wherein, to contract the wall of the vessel, the heat therapy assembly comprises a contraction assembly configured to isolate a constriction volume of the vessel adjacent to the treatment site and create a vacuum in the constriction volume.

2. The system of claim 1, wherein the contraction assembly comprises:
a proximal balloon configured to inflate to seal a proximal end of the constriction volume; and
a distal balloon configured to inflate to seal a distal end of the constriction volume.

3. The system of claim 1, wherein the heat therapy assembly includes one or more openings configured to remove a fluid from the constriction volume to create the vacuum.

4. The system of claim 1,
wherein the heat therapy assembly comprises a balloon comprising a cavity configured to contain a thermal medium, the balloon defining one or more surfaces configured to contact the wall of the vessel, and wherein the one or more surfaces are configured to deliver the energy from the thermal medium to the wall of the vessel.

5. The system of claim 1, wherein the heat therapy assembly comprises one or more therapeutic elements configured to deliver the energy to the wall of the vessel.

6. The system of claim 1,
wherein the heat therapy assembly comprises an expansion device,
wherein the expansion device is configured to radially expand to expand the wall of the vessel, and
wherein the therapeutic medical device is configured to control the expansion device to expand the wall of the vessel to a particular diameter.

7. The system of claim 1,
wherein the one or more structural proteins comprise elastin and collagen, and
wherein after substantial denaturation, the one or more structural proteins cross-link to form a scaffold.

8. The system of claim 7, wherein greater than about 50% of structural proteins at the treatment site are denatured.

9. The system of claim 1, wherein, to ablate the smooth muscle cells and substantially denature the one or more structural proteins, the therapeutic medical device is configured to control the heat therapy assembly to maintain a temperature of the smooth muscle cells within a target temperature range.

10. The system of claim 9,
wherein the target temperature range is defined by a lower temperature threshold value associated with death of the smooth muscle cells and denaturation of the one or more structural proteins, and
wherein the lower temperature threshold value is greater than about 60° C.

11. The system of claim 9,
wherein the target temperature range is defined by an upper temperature threshold value associated with bubble formation of one or more fluids in the wall of the vessel, and
wherein the upper temperature threshold is less than about 100° C.

12. The system of claim 1, wherein the contraction assembly comprises a vacuum balloon configured to deflate in the constriction volume to create the vacuum.

13. The system of claim 12, wherein the vacuum balloon is configured to deliver the energy to the wall of the vessel.

14. A method comprising:
contracting a wall of a vessel adjacent to a treatment site to a reduced diameter, wherein the wall of the vessel includes smooth muscle cells and one or more structural proteins; and
heating the wall of the contracted vessel to ablate the smooth muscle cells and substantially denature the one or more structural proteins,
wherein contracting the wall of the vessel comprises sealing a constriction volume of the vessel adjacent to the treatment site and creating a vacuum in the constriction volume.

15. The method of claim 14,
wherein the one or more structural proteins comprise elastin and collagen, and
wherein after substantial denaturation, the one or more structural proteins cross-link to form a scaffold.

16. The method of claim 14, wherein sealing the constriction volume comprises:
inflating a proximal balloon to seal a proximal end of the constriction volume; and
inflating a distal balloon to seal a distal end of the constriction volume.

17. The method of claim 14, wherein contracting the wall of the vessel further comprises removing a fluid from the constriction volume to create the vacuum.

18. The system of claim 5,
wherein the one or more therapeutic elements comprise at least one thermoelectric element,
wherein the therapeutic medical device is configured to control an electrical current to at least one thermoelectric element, and
wherein at least one thermoelectric element comprises a plurality of Peltier devices.

19. The method of claim 14, wherein, to ablate the smooth muscle cells and substantially denature the one or more structural proteins, the method includes controlling a heat therapy assembly to maintain a temperature of the smooth muscle cells within a target temperature range.

20. The method of claim 19,
wherein the target temperature range is defined by a lower temperature threshold value associated with death of the smooth muscle cells and denaturation of the one or more structural proteins, and
wherein the lower temperature threshold value is greater than about 60° C.

21. The method of claim 19,
wherein the target temperature range is defined by an upper temperature threshold value associated with boiling of one or more fluids in the wall of the vessel, and
wherein the upper temperature threshold is less than about 100° C.

22. The method of claim 14,
wherein creating the vacuum comprises deflating a vacuum balloon in the constriction volume.

23. The method of claim 22, wherein delivering energy to the wall of the vessel comprises delivering energy to the wall of the vessel from the vacuum balloon.

* * * * *